US012650315B2

(12) United States Patent
Zhang et al.

(10) Patent No.: US 12,650,315 B2
(45) Date of Patent: Jun. 9, 2026

(54) ELECTRONIC MAP CORRECTION METHOD, NAVIGATION INFORMATION SETTING METHOD, NAVIGATION METHOD, AND APPARATUS

(71) Applicant: Shenzhen Yinwang Intelligent Technologies Co., Ltd., Shenzhen (CN)

(72) Inventors: Jing Zhang, Shenzhen (CN); Faping Wang, Shenzhen (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 275 days.

(21) Appl. No.: 18/348,159

(22) Filed: Jul. 6, 2023

(65) Prior Publication Data

US 2023/0349717 A1 Nov. 2, 2023

Related U.S. Application Data

(63) Continuation of application No. PCT/CN2021/132859, filed on Nov. 24, 2021.

(30) Foreign Application Priority Data

Jan. 6, 2021 (CN) .......................... 202110014894.X

(51) Int. Cl.
G01C 21/00 (2006.01)
G01C 21/36 (2006.01)

(52) U.S. Cl.
CPC ..... G01C 21/3815 (2020.08); G01C 21/3694 (2013.01); G01C 21/3889 (2020.08)

(58) Field of Classification Search
CPC ............ G01C 21/3815; G01C 21/3694; G01C 21/3889; G01C 21/3841; G06Q 10/047;
(Continued)

(56) References Cited

U.S. PATENT DOCUMENTS 7,615,750 B2* 11/2009 Dupont ................... B60T 8/172
250/339.01
7,873,465 B2* 1/2011 Geelen ................... G01C 21/26
701/450
(Continued)

FOREIGN PATENT DOCUMENTS

CN 107462252 A 12/2017
CN 108562298 A 9/2018
(Continued)

*Primary Examiner* — Redhwan K Mawari

(74) *Attorney, Agent, or Firm* — Leydig, Voit & Mayer, Ltd.

(57) ABSTRACT

This application discloses an electronic map correction method, a navigation information setting method, a navigation method, and an apparatus, and relates to the fields of navigation, intelligent driving, and smart driving technologies. In this application, a navigation planning adoption rate of a first road section and vehicle traveling information of the first road section are obtained, and it is determined, based on the navigation planning adoption rate of the first road section and the vehicle traveling information of the first road section, whether the traveling attribute information of the first road section on an electronic map is accurate; and if it is determined that the traveling attribute information of the first road section is inaccurate, the traveling attribute information of the first road section on the electronic map is corrected. According to this application, the electronic map can be corrected, thereby improving navigation accuracy.

18 Claims, 21 Drawing Sheets

(58) Field of Classification Search
CPC ...... G06F 16/29; G06F 16/23; G06F 16/2455;
G06F 16/248
See application file for complete search history.

(56) References Cited

U.S. PATENT DOCUMENTS

| | | | | |
|---|---|---|---|---|
| 8,407,003 | B2 * | 3/2013 | Geelen ................... | G01C 21/26 |
| | | | | 701/532 |
| 10,309,792 | B2 * | 6/2019 | Iagnemma ......... | G01C 21/3461 |
| 10,460,410 | B1 * | 10/2019 | Gajapala ................ | G06Q 50/26 |
| 2011/0202271 | A1 * | 8/2011 | Kruithof ............ | G01C 21/3844 |
| | | | | 701/533 |
| 2018/0340790 | A1 * | 11/2018 | Kislovskiy ......... | G01C 21/3484 |
| 2019/0383624 | A1 * | 12/2019 | Magzimof ........... | H04B 17/373 |
| 2019/0384305 | A1 * | 12/2019 | Niibo .................... | B60W 30/08 |
| 2020/0302787 | A1 * | 9/2020 | Namba ................ | G08G 1/0112 |
| 2020/0342750 | A1 * | 10/2020 | Sakr ................. | G08G 1/096775 |
| 2021/0129847 | A1 * | 5/2021 | Grubwinkler ......... | B60W 40/09 |
| 2022/0003562 | A1 * | 1/2022 | Mack ............... | G08G 1/096883 |
| 2022/0065639 | A1 * | 3/2022 | Mistele ............. | G01C 21/3446 |

FOREIGN PATENT DOCUMENTS

| | | | |
|---|---|---|---|
| CN | 110793538 A | 2/2020 | |
| JP | 2013122381 A | 6/2013 | |

* cited by examiner

First road section after correction

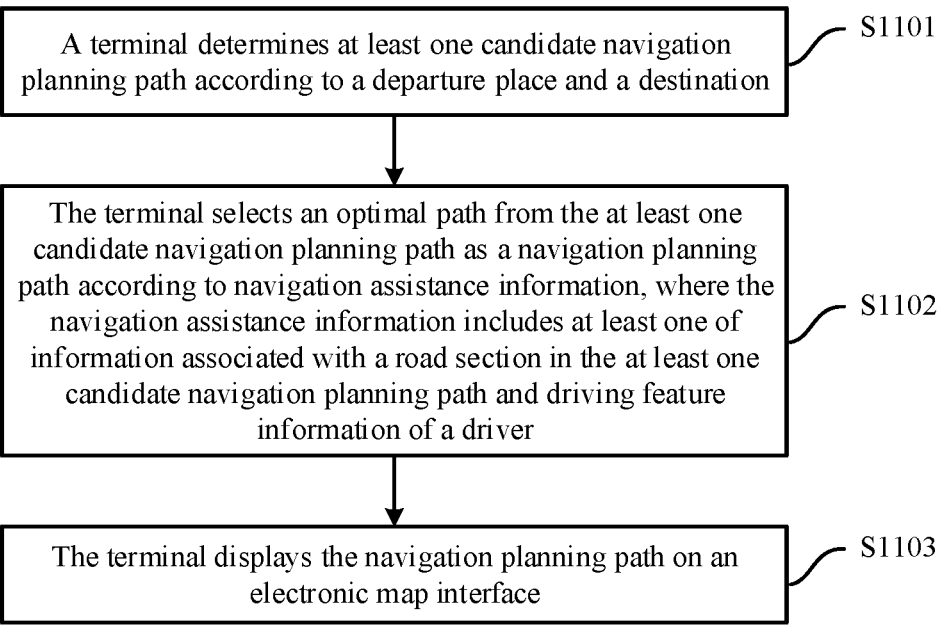

A terminal determines at least one candidate navigation planning path according to a departure place and a destination — S1101

The terminal selects an optimal path from the at least one candidate navigation planning path as a navigation planning path according to navigation assistance information, where the navigation assistance information includes at least one of information associated with a road section in the at least one candidate navigation planning path and driving feature information of a driver — S1102

The terminal displays the navigation planning path on an electronic map interface — S1103

FIG. 11

Figure 14:
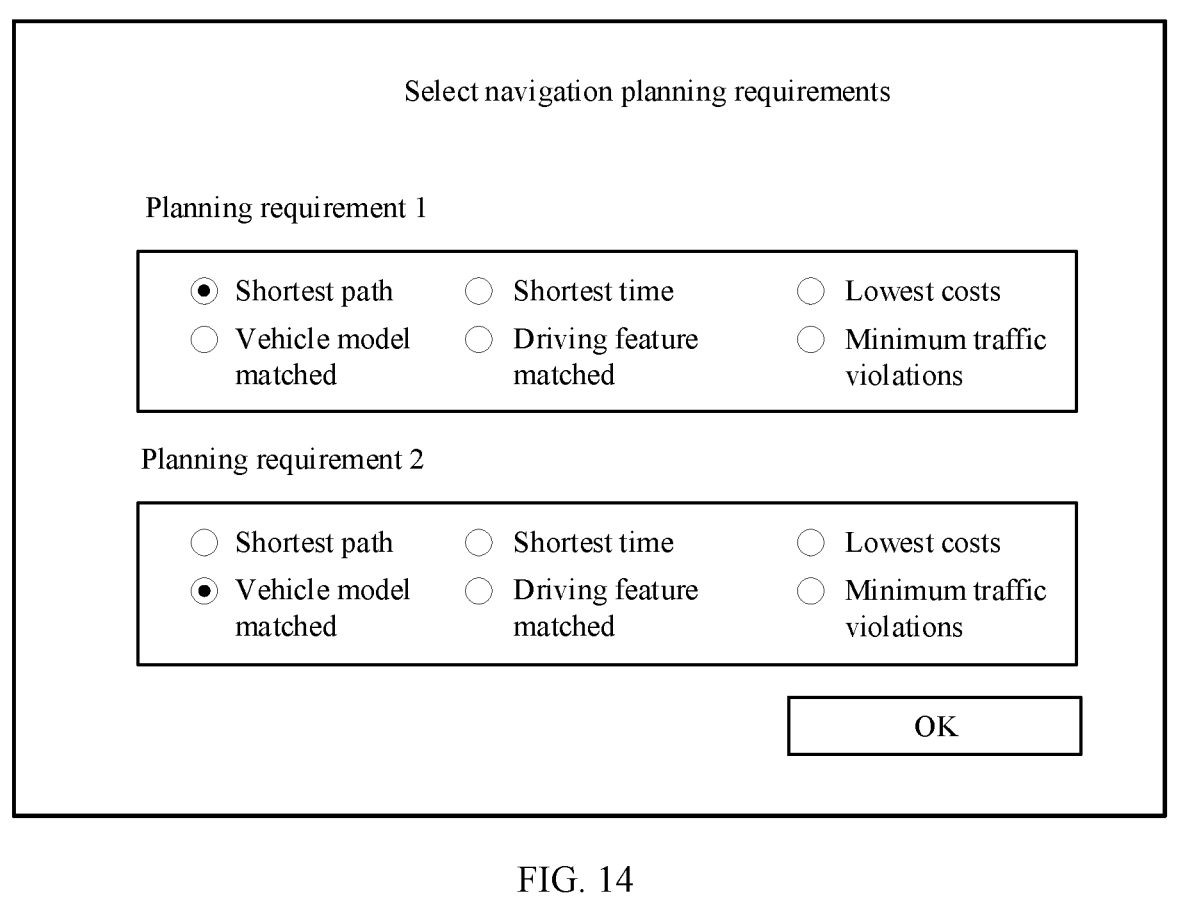

Select navigation planning requirements

Planning requirement 1

⦿ Shortest path        ◯ Shortest time        ◯ Lowest costs
◯ Vehicle model        ◯ Driving feature      ◯ Minimum traffic
   matched                matched                 violations Planning requirement 2

◯ Shortest path        ◯ Shortest time        ◯ Lowest costs
⦿ Vehicle model        ◯ Driving feature      ◯ Minimum traffic
   matched                matched                 violations

ELECTRONIC MAP CORRECTION METHOD, NAVIGATION INFORMATION SETTING METHOD, NAVIGATION METHOD, AND APPARATUS

CROSS-REFERENCE TO RELATED APPLICATIONS

This application is a continuation of International Application No. PCT/CN2021/132859, filed on Nov. 24, 2021, which claims priority to Chinese Patent Application No. 202110014894.X, filed on Jan. 6, 2021. The disclosures of the aforementioned applications are hereby incorporated by reference in their entireties.

TECHNICAL FIELD

This application relates to the field of driving technologies, and in particular, to an electronic map correction method, a navigation information setting method, a navigation method, and an apparatus.

BACKGROUND

With development of society and improvement of living standards, people's living radius becomes increasingly large, road conditions in cities become increasingly complex, and people are increasingly dependent on navigation systems when traveling. When a vehicle is traveling, it is very common to use a navigation function on an in-vehicle terminal or a mobile terminal (such as a mobile phone) to perform path planning and navigation.

The navigation function may fail to provide accurate navigation information for vehicles due to reasons such as incorrect map data collection, a failure to update map data in a timely manner, and a road emergency. As a result, time and economic costs of the vehicles are wasted, and even serious traffic accidents are caused. In addition, some unclear navigation prompt information in the navigation function may easily cause misunderstanding to a person. Consequently, a vehicle cannot accurately travel into a planned road, and driving experience is reduced.

SUMMARY

A first aspect of this application is to provide an electronic map correction method and an apparatus, to correct an electronic map, so as to improve navigation accuracy.

According to a first aspect, an electronic map correction method is provided, including: obtaining a navigation planning adoption rate of a first road section and vehicle traveling information of the first road section; determining, based on the navigation planning adoption rate of the first road section and the vehicle traveling information of the first road section, whether traveling attribute information of the first road section on an electronic map is accurate; and correcting the traveling attribute information of the first road section on the electronic map if it is determined that the traveling attribute information of the first road section is inaccurate.

The navigation planning adoption rate of the first road section represents a relationship between a first quantity of times and a second quantity of times, the first quantity of times is a quantity of times that the first road section is planned as a navigation planning road section in a first statistics time period, the second quantity of times is a quantity of times that vehicles travel into or do not travel into the first road section in accordance with the navigation planning, and the vehicle traveling information of the first road section includes statistics of the vehicles traveling into the first road section in the first statistics time period.

In the foregoing implementation, data analysis is performed based on statistics (including the navigation planning adoption rate of the first road section and the vehicle traveling information of the first road section), to determine whether the traveling attribute information of the first road section on the electronic map is accurate, and when it is determined that the traveling attribute information is inaccurate, the electronic map is corrected, thereby implementing electronic map correction based on big data analysis. The process is controllable because the process does not rely on a manual reporting operation.

In a possible implementation, the determining, based on the navigation planning adoption rate of the first road section and the vehicle traveling information of the first road section, whether traveling attribute information of the first road section on an electronic map is accurate includes: determining, based on the navigation planning adoption rate of the first road section and the vehicle traveling information of the first road section, whether the first road section is travelable; and the correcting the traveling attribute information of the first road section on the electronic map if it is determined that the traveling attribute information of the first road section is inaccurate includes: if it is determined that the first road section is non-travelable, correcting the electronic map, so that the first road section on the electronic map is marked as non-travelable or is deleted.

In the foregoing implementation, it may be determined, based on statistics (including the navigation planning adoption rate of the first road section and the vehicle traveling information of the first road section), whether the traveling attribute information (the traveling attribute information indicates whether the road section is travelable) of the first road section on the electronic map is accurate, and correction is performed when it is determined that the traveling attribute information is inaccurate, so that navigation accuracy can be improved.

In a possible implementation, the determining, based on the navigation planning adoption rate of the first road section and the vehicle traveling information of the first road section, whether the first road section is travelable includes: if a ratio of the second quantity of times that vehicles do not travel into the first road section in accordance with the navigation planning to the first quantity of times is greater than a first threshold, and it is determined, based on the vehicle traveling information of the first road section, that a vehicle traveling volume of the first road section in the first statistics time period is less than a third threshold, determining that the first road section is non-travelable.

The vehicle traveling volume includes a quantity of traveling vehicles or a quantity of traveling times of a vehicle (a case in which a same vehicle travels for a plurality of times is not excluded).

In the foregoing implementation, in the first statistics time period, for the first road section, if the ratio of the second quantity of times that vehicles do not travel into the first road section in accordance with the navigation planning to the first quantity of times is greater than the first threshold, it indicates that a possibility that the first road section is non-travelable is relatively high. Further, if the vehicle traveling volume of the first road section in the first statistics time period is less than the third threshold, it indicates that almost no vehicle travels into or travels on the first road section, and it may be determined that the first road section is non-travelable. The foregoing determining is objective and reasonable, and therefore a relatively accurate determining result may be obtained, thereby ensuring accuracy of the corrected electronic map.

In a possible implementation, the determining, based on the navigation planning adoption rate of the first road section and the vehicle traveling information of the first road section, whether traveling attribute information of the first road section on an electronic map is accurate includes: determining, based on the navigation planning adoption rate of the first road section and the vehicle traveling information of the first road section, whether a traveling direction of the first road section on the electronic map is accurate; and the correcting the traveling attribute information of the first road section on the electronic map if it is determined that the traveling attribute information of the first road section on the electronic map is inaccurate includes: if it is determined that the traveling direction of the first road section on the electronic map is inaccurate, correcting the traveling direction of the first road section on the electronic map.

In the foregoing implementation, it may be determined, based on statistics (including the navigation planning adoption rate of the first road section and the vehicle traveling information of the first road section), whether the traveling attribute information (the traveling attribute information is used to indicate the traveling direction of the road section) of the first road section on the electronic map is accurate, and correction is performed when it is determined that the traveling attribute information is inaccurate, so that navigation accuracy can be improved.

In a possible implementation, the determining, based on the navigation planning adoption rate of the first road section and the vehicle traveling information of the first road section, whether a traveling direction of the first road section on the electronic map is accurate includes: if a ratio of the second quantity of times that vehicles do not travel into the first road section in accordance with the navigation planning to the first quantity of times is greater than a first threshold, and it is determined, based on the vehicle traveling information of the first road section, that the vehicle traveling volume of the first road section in the first statistics time period is greater than or equal to a third threshold, and it is determined that a vehicle traveling direction obtained from the vehicle traveling information of the first road section is different from a planned traveling direction of the first road section, determining that the traveling direction of the first road section on the electronic map is inaccurate.

In the foregoing implementation, in the first statistics time period, for the first road section, if the ratio of the second quantity of times that vehicles do not travel into the first road section in accordance with the navigation planning to the first quantity of times is greater than the first threshold, and the vehicle traveling volume of the first road section in the first statistics time period is greater than or equal to a third threshold, the first road section is travelable. However, because an actual traveling direction of the vehicles that travel into or travel on the first road section is different from a direction indicated by the navigation, it indicates that the traveling direction of the first road section is incorrectly marked on the electronic map. The error is corrected by correcting the traveling direction of the first road section on the electronic map, so as to improve accuracy of subsequent navigation planning.

In a possible implementation, the determining, based on the navigation planning adoption rate of the first road section and the vehicle traveling information of the first road section, whether a traveling direction of the first road section on the electronic map is accurate includes: determining that the traveling direction of the first road section on the electronic map is inaccurate if the following conditions are met:

a ratio of the second quantity of times that vehicles do not travel into the first road section in accordance with the navigation planning to the first quantity of times is greater than a first threshold;

it is determined, based on the vehicle traveling information of the first road section, that the vehicle traveling volume of the first road section in the first statistics time period is greater than or equal to a third threshold; and it is determined that a vehicle traveling direction obtained from the vehicle traveling information of the first road section is different from a planned traveling direction of the first road section, where the first road section is located in a traffic monitoring area.

In the foregoing implementation, based on the navigation planning adoption rate of the first road section (used to represent a ratio of the second quantity of times that vehicles do not travel into the first road section in accordance with the navigation planning to the first quantity of times) and the vehicle traveling information (the vehicle traveling volume and the vehicle traveling direction of the first road section in the first statistics time period), it is further determined, according to whether the first road section is located in a traffic monitoring area, whether the traveling direction of the first road section is accurate, so as to reduce misjudgment and avoid error correction of the electronic map.

In a possible implementation, if the first road section is not located in a traffic monitoring area, the method further includes: setting first information associated with the first road section, where the first information is used to indicate that a traveling direction allowed by the first road section is uncertain.

In the foregoing implementation, if it cannot be determined whether the traveling direction of the first road section on the electronic map is accurate, the first road section may be marked, that is, the first road section may be marked as "uncertain allowed traveling direction", to provide one of the bases for subsequent navigation path planning, or provide prompt information in a vehicle driving process, so as to improve user experience.

In a possible implementation, the setting first information associated with the first road section includes: adding the first information to the first road section on the electronic map; or adding the first road section to a list of road sections with to-be-determined traveling directions, where the list of road sections with to-be-determined traveling directions is used to store a road section with an uncertain traveling direction.

In the foregoing implementation, the first information is stored as a part of electronic map data. In this way, the first information associated with the first road section may be updated when the electronic map is updated. In another implementation, the list of road sections with to-be-determined traveling directions may be stored independently of the electronic map data, so that a coupling degree with the electronic map data can be reduced, and the list can be updated or pushed to a terminal independently of the electronic map data.

In a possible implementation, if the ratio of the second quantity of times that vehicles do not travel into the first road section in accordance with the navigation planning to the first quantity of times is less than or equal to the first threshold and is greater than or equal to a second threshold, where the second threshold is less than the first threshold, the method further includes:

obtaining a vehicle model feature of vehicles that do not travel into the first road section in accordance with the navigation planning;

determining whether a ratio of a quantity of vehicles having a same vehicle model feature to a quantity of the vehicles that do not travel into the first road section in accordance with the navigation planning is greater than a fourth threshold; and if the vehicle ratio is greater than the fourth threshold, setting second information associated with the first road section, where the second information is used to indicate a vehicle model feature of vehicles that are suitable for traveling and/or not suitable for traveling on the first road section.

In the foregoing implementation, if the ratio of the quantity of vehicles having the same vehicle model feature to the quantity of the vehicles that do not travel into the first road section in accordance with the navigation planning is greater than the fourth threshold, it indicates that most of the vehicles that do not travel into the first road section in accordance with the navigation planning have the same or similar vehicle model features, and further indicates that a traveling condition of the first road section probably does not match the vehicle model features of these vehicles. Based on this, the second information associated with the first road section (used to indicate a vehicle model feature of vehicles that are suitable for traveling and/or not suitable for traveling on the first road section) is set, to provide one of the bases for subsequent navigation path planning, so as to improve effectiveness of navigation planning, or provide prompt information for a driver in a vehicle driving process, so as to improve user experience.

In a possible implementation, the setting second information associated with the first road section includes: adding the second information to the first road section on the electronic map; or adding the first road section to a list of road sections corresponding to a first vehicle model feature, where the list of road sections corresponding to the first vehicle model feature is used to store a road section matching the first vehicle model feature, and the first vehicle model feature is a same vehicle model feature of vehicles whose vehicle ratio is greater than the fourth threshold.

In the foregoing implementation, the second information is stored as a part of electronic map data. In this way, the second information associated with the first road section may be updated when the electronic map is updated. In another implementation, the list of road sections corresponding to the first vehicle model feature may be stored independently of the electronic map data, so that a coupling degree with the electronic map data can be reduced, and the list can be updated or pushed to a terminal independently of the electronic map data.

In a possible implementation, the second information includes at least one of a vehicle model, a vehicle height, a vehicle width, a vehicle length, or a turning radius.

In a possible implementation, if the ratio of the quantity of the vehicles having the same vehicle model feature to the quantity of the vehicles that do not travel into the first road section in accordance with the navigation planning is less than or equal to the fourth threshold, the method further includes: obtaining driver information of the vehicles that do not travel into the first road section in accordance with the navigation planning and feature information of a second road section, where the second road section is a road section into which the vehicles that do not travel into the first road section in accordance with the navigation planning actually travel; and determining driving feature information of drivers based on a difference between a feature of the first road section and a feature of the second road section, and storing the driving feature information of the drivers.

In the foregoing implementation, when it is determined that the first road section is travelable, but some vehicles still do not travel into the first road section in accordance with the navigation planning, and a cause of the phenomenon is not that the vehicle model feature of the vehicles does not match the first road section, the driving feature of the drivers is further determined based on a difference between the first road section and the second road section (the second road section is a road section on which the driver actually drives). Subsequently, the driving feature may be used as one of the bases for navigation path planning, so that navigation path planning can be performed according to personalized information of the user, thereby improving effectiveness of navigation planning and improving user experience.

In a possible implementation, if the vehicle ratio is less than or equal to the fourth threshold, the method further includes:

obtaining intersection information of the first road section on the electronic map; and if it is determined, based on the intersection information of the first road section, that the first road section includes a forked intersection and an included angle between road sections corresponding to the forked intersection is less than a specified angle, setting third information associated with the first road section, where the third information is used to indicate that the first road section has a forked intersection that may be easily entered by mistake.

In the foregoing implementation, during navigation path planning, the third information may be used as one of the bases for navigation path planning, and is used to assist in navigation path planning, so as to avoid planning a road section with a large quantity of forked intersections and a relatively small included angle of the forked intersection, so as to prevent the driver from entering an incorrect road section by mistake. The third information may also be output by the terminal as prompt information in a vehicle driving process, so as to prompt the driver to avoid entering an incorrect road section by mistake.

In a possible implementation, the setting third information associated with the first road section includes: adding the third information to the first road section on the electronic map; or adding the first road section to a list of road sections with multi-forked intersections, where the list of road sections with multi-forked intersections is used to store a road section that has a forked intersection and that corresponds to the forked intersection and that has an included angle less than a specified angle.

In the foregoing implementation, the third information is stored as a part of electronic map data. In this way, the third information associated with the first road section may be updated when the electronic map is updated. In another implementation, the list of road sections with multi-forked intersections may be stored independently of the electronic map data, so that a coupling degree with the electronic map data can be reduced, and the list can be updated or pushed to a terminal independently of the electronic map data.

In a possible implementation, the method further includes:

obtaining traffic violation tickets generated by the vehicles on the first road section in a second statistics time period; and if it is determined, based on a quantity of the traffic violation tickets, that a specified condition is met, setting fourth information associated with the first road section, where the fourth information is used to indicate that the first road section is a road section prone to a traffic violation, or is used to indicate that the first road section is a road section prone to a traffic violation and a type of the traffic violation that may easily occur on the first road section, where the specified condition includes: a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, where N is preset, and N is an integer greater than or equal to 1.

In the foregoing implementation, the fourth information associated with the first road section may be used as one of the bases for navigation path planning, so that traffic violations of drivers can be reduced, or a road section with frequent traffic violations can be avoided to improve driving safety, thereby improving effectiveness of navigation planning. The fourth information associated with the first road section may be further used as prompt information to be output in a vehicle driving process, so as to prompt the driver to pay attention, thereby improving user experience.

In a possible implementation, the setting fourth information associated with the first road section includes: adding the fourth information to the first road section on the electronic map; or adding the first road section and a type of the traffic violation that may easily occur on the first road section to a list of road sections with frequent traffic violations, where the list of road sections with frequent traffic violations is used to store a road section prone to a traffic violation and a traffic violation type corresponding to the road section prone to a traffic violation.

In the foregoing implementation, the fourth information is stored as a part of electronic map data. In this way, the third information associated with the first road section may be updated when the electronic map is updated. In another implementation, the list of road sections with frequent traffic violations may be stored independently of the electronic map data, so that a coupling degree with the electronic map data can be reduced, and the list can be updated or pushed to a terminal independently of the electronic map data.

In a possible implementation, the obtaining a navigation planning adoption rate of a first road section and vehicle traveling information of the first road section includes: obtaining the navigation planning adoption rate of the first road section and the vehicle traveling information of the first road section according to a specified period, where the first statistics time period is a latest period; or when a map correction condition is met, obtaining the navigation planning adoption rate of the first road section and the vehicle traveling information of the first road section, where the first statistics time period is a time period from a last time period in which the map correction condition is met, where the map correction condition includes at least one of the following:

a quantity of vehicles that do not travel in accordance with a planned navigation path is greater than a sixth threshold; and a quantity of times of vehicles that do not travel in accordance with a planned navigation path is greater than a seventh threshold.

In the foregoing implementation, error information on the electronic map can be identified and corrected in a periodic triggering manner and/or an event triggering manner, so that the error information on the electronic map can be detected and corrected in a timely manner, thereby improving navigation accuracy.

According to a second aspect, a server is provided, including:

an obtaining unit, configured to obtain a navigation planning adoption rate of a first road section and vehicle traveling information of the first road section, where the navigation planning adoption rate of the first road section is used to represent a relationship between a first quantity of times and a second quantity of times, the first quantity of times is a quantity of times that the first road section is planned as a navigation planning road section in a first statistics time period, the second quantity of times is a quantity of times that vehicles travel into or do not travel into the first road section in accordance with the navigation planning, and the vehicle traveling information of the first road section includes statistics of the vehicles traveling into the first road section in the first statistics time period; and a processing unit, configured to: determine, based on the navigation planning adoption rate of the first road section and the vehicle traveling information of the first road section, whether traveling attribute information of the first road section on an electronic map is accurate; and correct the traveling attribute information of the first road section on the electronic map if it is determined that the traveling attribute information of the first road section is inaccurate.

In a possible implementation, the processing unit is specifically configured to: determine, based on the navigation planning adoption rate of the first road section and the vehicle traveling information of the first road section, whether the first road section is travelable; and if it is determined that the first road section is non-travelable, correct the electronic map, so that the first road section on the electronic map is marked as non-travelable or is deleted.

In a possible implementation, the processing unit is specifically configured to: if a ratio of the second quantity of times that vehicles do not travel into the first road section in accordance with the navigation planning to the first quantity of times is greater than a first threshold, and it is determined, based on the vehicle traveling information of the first road section, that a vehicle traveling volume of the first road section in the first statistics time period is less than a third threshold, determine that the first road section is non-travelable.

In a possible implementation, the processing unit is specifically configured to: determine, based on the navigation planning adoption rate of the first road section and the vehicle traveling information of the first road section, whether a traveling direction of the first road section on the electronic map is accurate; and if it is determined that the traveling direction of the first road section on the electronic map is inaccurate, correct the traveling direction of the first road section on the electronic map.

In a possible implementation, the processing unit is specifically configured to: if a ratio of the second quantity of times that vehicles do not travel into the first road section in accordance with the navigation planning to the first quantity of times is greater than a first threshold, and it is determined, based on the vehicle traveling information of the first road section, that the vehicle traveling volume of the first road section in the first statistics time period is greater than or equal to a third threshold, and it is determined that a vehicle traveling direction obtained from the vehicle traveling information of the first road section is different from a planned traveling direction of the first road section, determine that the traveling direction of the first road section on the electronic map is inaccurate.

In a possible implementation, the processing unit is specifically configured to: determine that the traveling direction of the first road section on the electronic map is inaccurate if the following conditions are met:

a ratio of the second quantity of times that vehicles do not travel into the first road section in accordance with the navigation planning to the first quantity of times is greater than a first threshold;

it is determined, based on the vehicle traveling information of the first road section, that the vehicle traveling volume of the first road section in the first statistics time period is greater than or equal to a third threshold; and it is determined that a vehicle traveling direction obtained from the vehicle traveling information of the first road section is different from a planned traveling direction of the first road section, where the first road section is located in a traffic monitoring area.

In a possible implementation, the processing unit is further configured to: if the first road section is not located in a traffic monitoring area, set first information associated with the first road section, where the first information is used to indicate that a traveling direction allowed by the first road section is uncertain.

In a possible implementation, the processing unit is specifically configured to: add the first information to the first road section on the electronic map; or add the first road section to a list of road sections with to-be-determined traveling directions, where the list of road sections with to-be-determined traveling directions is used to store a road section with an uncertain traveling direction.

In a possible implementation, the processing unit is further configured to: if the ratio of the second quantity of times that vehicles do not travel into the first road section in accordance with the navigation planning to the first quantity of times is less than or equal to the first threshold and is greater than or equal to a second threshold, where the second threshold is less than the first threshold, obtain a vehicle model feature of vehicles that do not travel into the first road section in accordance with the navigation planning; determine whether a ratio of a quantity of vehicles having a same vehicle model feature to a quantity of the vehicles that do not travel into the first road section in accordance with the navigation planning is greater than a fourth threshold; and if the vehicle ratio is greater than the fourth threshold, set second information associated with the first road section, where the second information is used to indicate a vehicle model feature of vehicles that are suitable for traveling and/or not suitable for traveling on the first road section.

Further, the processing unit is specifically configured to: add the second information to the first road section on the electronic map; or add the first road section to a list of road sections corresponding to a first vehicle model feature, where the list of road sections corresponding to the first vehicle model feature is used to store a road section matching the first vehicle model feature, and the first vehicle model feature is a same vehicle model feature of vehicles whose vehicle ratio is greater than the fourth threshold.

Further, the second information includes at least one of a vehicle model, a vehicle height, a vehicle width, a vehicle length, or a turning radius.

In a possible implementation, the processing unit is further configured to: if the ratio of the quantity of the vehicles having the same vehicle model feature to the quantity of the vehicles that do not travel into the first road section in accordance with the navigation planning is less than or equal to the fourth threshold, obtain driver information of the vehicles that do not travel into the first road section in accordance with the navigation planning and feature information of a second road section, where the second road section is a road section into which the vehicles that do not travel into the first road section in accordance with the navigation planning actually travel; and determine driving feature information of drivers based on a difference between a feature of the first road section and a feature of the second road section, and store the driving feature information of the drivers.

In a possible implementation, the processing unit is further configured to: if the vehicle ratio is less than or equal to the fourth threshold, obtain intersection information of the first road section on the electronic map; and if it is determined, based on the intersection information of the first road section, that the first road section includes a forked intersection and an included angle between road sections corresponding to the forked intersection is less than a specified angle, set third information associated with the first road section, where the third information is used to indicate that the first road section has a forked intersection that may be easily entered by mistake.

Further, the processing unit is specifically configured to: add the third information to the first road section on the electronic map; or add the first road section to a list of road sections with multi-forked intersections, where the list of road sections with multi-forked intersections is used to store a road section that has a forked intersection and that corresponds to the forked intersection and that has an included angle less than a specified angle.

In a possible implementation, the obtaining unit is further configured to obtain traffic violation tickets generated by the vehicles on the first road section in a second statistics time period; and the processing unit is further configured to: if it is determined, based on a quantity of the traffic violation tickets, that a specified condition is met, set fourth information associated with the first road section, where the fourth information is used to indicate that the first road section is a road section prone to a traffic violation, or is used to indicate that the first road section is a road section prone to a traffic violation and a type of the traffic violation that may easily occur on the first road section, where the specified condition includes: a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, where N is preset, and N is an integer greater than or equal to 1.

Further, the processing unit is specifically configured to: add the fourth information to the first road section on the electronic map; or add the first road section and a type of the traffic violation that may easily occur on the first road section to a list of road sections with frequent traffic violations, where the list of road sections with frequent traffic violations is used to store a road section prone to a traffic violation and a traffic violation type corresponding to the road section prone to a traffic violation.

In a possible implementation, the obtaining unit is specifically configured to: obtain the navigation planning adoption rate of the first road section and the vehicle traveling information of the first road section according to a specified period, where the first statistics time period is a latest period; or when a map correction condition is met, obtain the navigation planning adoption rate of the first road section and the vehicle traveling information of the first road section, where the first statistics time period is a time period from a last time period in which the map correction condition is met, where the map correction condition includes at least one of the following:

a quantity of vehicles that do not travel in accordance with a planned navigation path is greater than a sixth threshold; and a quantity of times of vehicles that do not travel in accordance with a planned navigation path is greater than a seventh threshold.

According to a third aspect, an electronic device is provided. The electronic device includes one or more processors and one or more memories, where the one or more memories store one or more computer programs, the one or more computer programs include instructions, and when the instructions are executed by the one or more processors, the electronic device is enabled to perform the method according to any one of the first aspect or the possible implementations of the first aspect.

According to a fourth aspect, a computer-readable storage medium is provided. The computer-readable storage medium includes a computer program, and when the computer program is run on an electronic device, the electronic device is enabled to perform the method according to any one of the first aspect or the possible implementations of the first aspect.

According to a fifth aspect, a computer program product is provided. When the computer program product is invoked by a computer, the computer is enabled to perform the method according to any one of the first aspect or the possible implementations of the first aspect.

A second aspect of this application is to provide a navigation information setting method and an apparatus, to set navigation-related information for performing navigation path planning or providing prompt information in a navigation process.

According to a sixth aspect, a navigation information setting method is provided, including:

obtaining a navigation planning adoption rate of a first road section and vehicle traveling information of the first road section; and setting information associated with the first road section based on the navigation planning adoption rate of the first road section and the vehicle traveling information of the first road section, where the information associated with the first road section is used to indicate a traveling attribute of the first road section, and the information associated with the first road section is used for navigation path planning or for providing prompt information in a vehicle driving process.

The navigation planning adoption rate of the first road section represents a relationship between a first quantity of times and a second quantity of times, the first quantity of times is a quantity of times that the first road section is planned as a navigation planning road section in a first statistics time period, the second quantity of times is a quantity of times that vehicles travel into or do not travel into the first road section in accordance with the navigation planning, and the vehicle traveling information of the first road section includes statistics of the vehicles traveling into the first road section in the first statistics time period.

In a possible implementation, the information associated with the first road section includes at least one of the following:

first information, used to indicate that a traveling direction allowed by the first road section is uncertain;

second information, used to indicate a vehicle model feature of vehicles that are suitable for traveling and/or not suitable for traveling on the first road section; and third information, used to indicate that the first road section has a forked intersection that may be easily entered by mistake.

Further, the vehicle model feature of vehicles that are suitable for and/or not suitable for traveling on the first road section includes at least one of a vehicle model, a vehicle height, a vehicle width, a vehicle length, or a turning radius of the vehicle that is suitable for and/or not suitable for traveling on the first road section.

In a possible implementation, the setting information associated with the first road section based on the navigation planning adoption rate of the first road section and the vehicle traveling information of the first road section includes:

if the following conditions are met, setting the first information associated with the first road section:

a ratio of the second quantity of times that vehicles do not travel into the first road section in accordance with the navigation planning to the first quantity of times is greater than a first threshold;

it is determined, based on the vehicle traveling information of the first road section, that the vehicle traveling volume of the first road section in the first statistics time period is greater than or equal to a third threshold; and it is determined that a vehicle traveling direction obtained from the vehicle traveling information of the first road section is different from a planned traveling direction of the first road section, where the first road section is not located in a traffic monitoring area.

Further, the setting first information associated with the first road section includes: adding the first information to the first road section on the electronic map; or adding the first road section to a list of road sections with to-be-determined traveling directions, where the list of road sections with to-be-determined traveling directions is used to store a road section with an uncertain traveling direction.

In a possible implementation, the setting information associated with the first road section based on the navigation planning adoption rate of the first road section and the vehicle traveling information of the first road section includes:

if the following conditions are met, setting the second information associated with the first road section:

the ratio of the second quantity of times that vehicles do not travel into the first road section in accordance with the navigation planning to the first quantity of times is less than or equal to the first threshold and is greater than or equal to a second threshold, where the second threshold is less than the first threshold; and a ratio of a quantity of vehicles having a same vehicle model feature to a quantity of the vehicles that do not travel into the first road section in accordance with the navigation planning is greater than a fourth threshold.

Further, the setting the second information associated with the first road section includes: adding the second information to the first road section on the electronic map; or adding the first road section to a list of road sections corresponding to a first vehicle model feature, where the list of road sections corresponding to the first vehicle model feature is used to store a road section matching the first vehicle model feature, and the first vehicle model feature is a same vehicle model feature of vehicles whose vehicle ratio is greater than the fourth threshold.

In a possible implementation, the setting information associated with the first road section based on the navigation planning adoption rate of the first road section and the vehicle traveling information of the first road section includes:

if the following conditions are met, setting the third information associated with the first road section:

the ratio of the second quantity of times that vehicles do not travel into the first road section in accordance with the navigation planning to the first quantity of times is less than or equal to the first threshold and is greater than or equal to a second threshold, where the second threshold is less than the first threshold; and a ratio of a quantity of vehicles having a same vehicle model feature to a quantity of the vehicles that do not travel into the first road section in accordance with the navigation planning is less than or equal to a fourth threshold; and the first road section includes a forked intersection, and an included angle between road sections corresponding to the forked intersection is less than a specified angle.

Further, the setting the third information associated with the first road section includes: adding the third information to the first road section on the electronic map; or adding the first road section to a list of road sections with multi-forked intersections, where the list of road sections with multi-forked intersections is used to store a road section that has a forked intersection and that corresponds to the forked intersection and that has an included angle less than a specified angle.

In a possible implementation, the information associated with the first road section further includes: fourth information, used to indicate that the first road section is a road section prone to a traffic violation, or used to indicate that the first road section is a road section prone to a traffic violation and a type of the traffic violation that may easily occur on the first road section; and the method further includes:

obtaining traffic violation tickets generated by the vehicles on the first road section in a second statistics time period; and if it is determined, based on the quantity of the traffic violation tickets, that a specified condition is met, setting the fourth information associated with the first road section, where the specified condition includes:

a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, where N is preset, and N is an integer greater than or equal to 1.

Further, the setting the fourth information associated with the first road section includes: adding the fourth information to the first road section on the electronic map; or adding the first road section and a type of the traffic violation that may easily occur on the first road section to a list of road sections with frequent traffic violations, where the list of road sections with frequent traffic violations is used to store a road section prone to a traffic violation and a traffic violation type corresponding to the road section prone to a traffic violation.

According to a seventh aspect, a server is provided, including:

an obtaining unit, configured to obtain a navigation planning adoption rate of a first road section and vehicle traveling information of the first road section, where the navigation planning adoption rate of the first road section is used to represent a relationship between a first quantity of times and a second quantity of times, the first quantity of times is a quantity of times that the first road section is planned as a navigation planning road section in a first statistics time period, the second quantity of times is a quantity of times that vehicles travel into or do not travel into the first road section in accordance with the navigation planning, and the vehicle traveling information of the first road section includes statistics of the vehicles traveling into the first road section in the first statistics time period; and a processing unit, configured to set information associated with the first road section based on the navigation planning adoption rate of the first road section and the vehicle traveling information of the first road section, where the information associated with the first road section is used to indicate a traveling attribute of the first road section, and the information associated with the first road section is used for navigation path planning or for providing prompt information in a vehicle driving process.

In a possible implementation, the information associated with the first road section includes at least one of the following:

first information, used to indicate that a traveling direction allowed by the first road section is uncertain;

second information, used to indicate a vehicle model feature of vehicles that are suitable for traveling and/or not suitable for traveling on the first road section; and third information, used to indicate that the first road section has a forked intersection that may be easily entered by mistake.

Further, the vehicle model feature of vehicles that are suitable for and/or not suitable for traveling on the first road section includes at least one of a vehicle model, a vehicle height, a vehicle width, a vehicle length, or a turning radius of the vehicle that is suitable for and/or not suitable for traveling on the first road section.

In a possible implementation, the setting information associated with the first road section based on the navigation planning adoption rate of the first road section and the vehicle traveling information of the first road section includes:

if the following conditions are met, setting the first information associated with the first road section:

a ratio of the second quantity of times that vehicles do not travel into the first road section in accordance with the navigation planning to the first quantity of times is greater than a first threshold;

it is determined, based on the vehicle traveling information of the first road section, that the vehicle traveling volume of the first road section in the first statistics time period is greater than or equal to a third threshold; and it is determined that a vehicle traveling direction obtained from the vehicle traveling information of the first road section is different from a planned traveling direction of the first road section, where the first road section is not located in a traffic monitoring area.

Further, the processing unit is specifically configured to: add the first information to the first road section on the electronic map; or add the first road section to a list of road sections with to-be-determined traveling directions, where the list of road sections with to-be-determined traveling directions is used to store a road section with an uncertain traveling direction.

In a possible implementation, the processing unit is specifically configured to set the second information associated with the first road section if the following conditions are met:

the ratio of the second quantity of times that vehicles do not travel into the first road section in accordance with the navigation planning to the first quantity of times is less than or equal to the first threshold and is greater than or equal to a second threshold, where the second threshold is less than the first threshold; and a ratio of a quantity of vehicles having a same vehicle model feature to a quantity of the vehicles that do not travel into the first road section in accordance with the navigation planning is greater than a fourth threshold.

Further, the processing unit is specifically configured to: add the second information to the first road section on the electronic map; or add the first road section to a list of road sections corresponding to a first vehicle model feature, where the list of road sections corresponding to the first vehicle model feature is used to store a road section matching the first vehicle model feature, and the first vehicle model feature is a same vehicle model feature of vehicles whose vehicle ratio is greater than the fourth threshold.

In a possible implementation, the processing unit is specifically configured to set the third information associated with the first road section if the following conditions are met:

the ratio of the second quantity of times that vehicles do not travel into the first road section in accordance with the navigation planning to the first quantity of times is less than or equal to the first threshold and is greater than or equal to a second threshold, where the second threshold is less than the first threshold; and a ratio of a quantity of vehicles having a same vehicle model feature to a quantity of the vehicles that do not travel into the first road section in accordance with the navigation planning is less than or equal to a fourth threshold; and the first road section includes a forked intersection, and an included angle between road sections corresponding to the forked intersection is less than a specified angle.

Further, the processing unit is specifically configured to: add the third information to the first road section on the electronic map; or add the first road section to a list of road sections with multi-forked intersections, where the list of road sections with multi-forked intersections is used to store a road section that has a forked intersection and that corresponds to the forked intersection and that has an included angle less than a specified angle.

In a possible implementation, the information associated with the first road section further includes: fourth information, used to indicate that the first road section is a road section prone to a traffic violation, or used to indicate that the first road section is a road section prone to a traffic violation and a type of the traffic violation that may easily occur on the first road section; and the obtaining unit is further configured to obtain traffic violation tickets generated by the vehicles on the first road section in a second statistics time period; and the processing unit is further configured to: if it is determined, based on the quantity of the traffic violation tickets, that a specified condition is met, set the fourth information associated with the first road section, where the specified condition includes: a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, where N is preset, and N is an integer greater than or equal to 1.

Further, the processing unit is specifically configured to: add the fourth information to the first road section on the electronic map; or add the first road section and a type of the traffic violation that may easily occur on the first road section to a list of road sections with frequent traffic violations, where the list of road sections with frequent traffic violations is used to store a road section prone to a traffic violation and a traffic violation type corresponding to the road section prone to a traffic violation.

According to an eighth aspect, an electronic device is provided. The electronic device includes one or more processors and one or more memories, where the one or more memories store one or more computer programs, the one or more computer programs include instructions, and when the instructions are executed by the one or more processors, the electronic device is enabled to perform the method according to any one of the sixth aspect or the possible implementations of the sixth aspect.

According to a ninth aspect, a computer-readable storage medium is provided. The computer-readable storage medium includes a computer program, and when the computer program is run on an electronic device, the electronic device is enabled to perform the method according to any one of the sixth aspect or the possible implementations of the sixth aspect.

According to a tenth aspect, a computer program product is provided. When the computer program product is invoked by a computer, the computer is enabled to perform the method according to any one of the sixth aspect or the possible implementations of the sixth aspect.

A third aspect of this application is to provide a navigation method and an apparatus, to improve navigation accuracy.

According to an eleventh aspect, a navigation method is provided, applied to a terminal having a vehicle navigation function, and including:

determining at least one candidate planned navigation path according to a departure place and a destination; and selecting an optimal path from the at least one candidate planned navigation path as a planned navigation path according to navigation assistance information, where the navigation assistance information includes information associated with a first road section, the first road section is one road section in the at least one candidate planned navigation path, the first road section is a road section in the at least one candidate planned navigation path, and the information associated with the first road section is obtained based on the method according to any one of the first aspect or the sixth aspect or the possible implementations of the first aspect or the sixth aspect.

Further, the navigation assistance information further includes driving feature information of a driver. The driving feature information of the driver is used as one of the bases for navigation path planning, so that a planned navigation path can meet a personalized requirement of the driver.

In a possible implementation, the planned navigation path includes a first road section, and the method further includes: when a vehicle does not travel into the first road section in accordance with the planned navigation path, sending a notification to a server, where the notification carries first indication information, and the first indication information is used to indicate that the vehicle does not travel into the first road section in accordance with the planned navigation path.

In a possible implementation, the method further includes: sending second indication information to the server, where the second indication information is used to indicate a second road section, the second road section is a road section into which the vehicle actually travels when the vehicle does not travel into the first road section in accordance with the planned navigation path, and the second road section is determined by the terminal based on a location reported by the vehicle.

In a possible implementation, the planned navigation path includes a first road section, and the method further includes: in response to that a first road section in a planned navigation path enters a specified range of a vehicle traveling direction and/or that a vehicle travels into the first road section in accordance with the planned navigation path, obtaining information associated with the first road section; and outputting the information associated with the first road section.

Further, the obtaining information associated with the first road section includes at least one of the following:

obtaining the information associated with the first road section on an electronic map;

querying at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section; and sending, to the server, a query request used to obtain the information associated with the first road section, and receiving a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

In a possible implementation, the outputting the information includes at least one of the following: outputting the information associated with the first road section by using a voice; or displaying the information associated with the first road section on an electronic map interface.

In a possible implementation, the navigation assistance information further includes a navigation planning requirement; and the method further includes: obtaining, in response to a first user operation that is based on an interface for entering a navigation planning requirement, a navigation planning requirement entered by a user.

According to a twelfth aspect, a terminal is provided, including:

a candidate path planning unit, configured to determine at least one candidate planned navigation path according to a departure place and a destination; and an optimal path selection unit, configured to select an optimal path from the at least one candidate planned navigation path as a planned navigation path according to navigation assistance information, where the navigation assistance information includes at least one of information associated with a first road section and driving feature information of a driver, the first road section is one road section in the at least one candidate planned navigation path, the first road section is a road section in the at least one candidate planned navigation path, and the information associated with the first road section is obtained based on the method according to any one of the first aspect or the sixth aspect or the possible implementations of the first aspect or the sixth aspect.

In a possible implementation, the planned navigation path includes a first road section, and the terminal further includes a notification unit, configured to: when a vehicle does not travel into the first road section in accordance with the planned navigation path, send a notification to a server, where the notification carries first indication information, and the first indication information is used to indicate that the vehicle does not travel into the first road section in accordance with the planned navigation path.

Further, the notification unit is further configured to send second indication information to the server, where the second indication information is used to indicate a second road section, the second road section is a road section into which the vehicle actually travels when the vehicle does not travel into the first road section in accordance with the planned navigation path, and the second road section is determined by the terminal based on a location reported by the vehicle.

In a possible implementation, the planned navigation path includes a first road section, and the terminal further includes an obtaining unit and a prompting unit. The obtaining unit is configured to: in response to that a first road section in a planned navigation path enters a specified range of a vehicle traveling direction and/or that a vehicle travels into the first road section in accordance with the planned navigation path, obtain information associated with the first road section; and the prompting unit is configured to output the information associated with the first road section.

Further, the obtaining unit is specifically configured to perform at least one of the following operations:

obtaining the information associated with the first road section on an electronic map;

querying at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section; and sending, to the server, a query request used to obtain the information associated with the first road section, and receiving a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

In a possible implementation, the prompting unit is specifically configured to perform at least one of the following operations: outputting the information associated with the first road section by using a voice; or displaying the information associated with the first road section on an electronic map interface.

In a possible implementation, the navigation assistance information further includes a navigation planning requirement, and the candidate path planning unit is further configured to obtain, in response to a first user operation that is based on an interface for entering a navigation planning requirement, a navigation planning requirement entered by a user.

According to a thirteenth aspect, an electronic device is provided. The electronic device includes one or more processors and one or more memories, where the one or more memories store one or more computer programs, the one or more computer programs include instructions, and when the instructions are executed by the one or more processors, the electronic device is enabled to perform the method according to any one of the eleventh aspect or the possible implementations of the eleventh aspect.

According to a fourteenth aspect, a computer-readable storage medium is provided. The computer-readable storage medium includes a computer program, and when the computer program is run on an electronic device, the electronic device is enabled to perform the method according to any one of the eleventh aspect or the possible implementations of the eleventh aspect.

According to a fifteenth aspect, a computer program product is provided. When the computer program product is invoked by a computer, the computer is enabled to perform the method according to any one of the eleventh aspect or the possible implementations of the eleventh aspect.

A fourth aspect of this application is to provide a navigation method and an apparatus, to provide prompt information in a navigation process, so as to improve user experience.

According to a sixteenth aspect, a navigation method is provided, applied to a terminal having a vehicle navigation function, and including:

in response to that a first road section in a planned navigation path enters a specified range of a vehicle traveling direction and/or that a vehicle travels into the first road section in accordance with the planned navigation path, obtaining information associated with the first road section, where the information associated with the first road section is obtained based on the method according to any one of the first aspect or the second aspect or the possible implementations of the first aspect or the second aspect; and outputting the information associated with the first road section.

In a possible implementation, the outputting the information associated with the first road section includes at least one of the following: outputting the information associated with the first road section by using a voice; or displaying the information associated with the first road section on an electronic map interface.

In a possible implementation, the obtaining information associated with the first road section includes at least one of the following:

obtaining the information associated with the first road section on an electronic map;

querying at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section; and sending, to the server, a query request used to obtain the information associated with the first road section, and receiving a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

According to a seventeenth aspect, a terminal is provided, including:

an obtaining unit, configured to: in response to that a first road section in a planned navigation path enters a specified range of a vehicle traveling direction and/or that a vehicle travels into the first road section in accordance with the planned navigation path, obtain information associated with the first road section; and a prompting unit, configured to output the information associated with the first road section.

In a possible implementation, the prompting unit is specifically configured to perform at least one of the following operations: outputting the information associated with the first road section by using a voice; and displaying the information associated with the first road section on an electronic map interface.

In a possible implementation, the obtaining unit is specifically configured to perform at least one of the following operations:

obtaining the information associated with the first road section on an electronic map;

querying at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section; and sending, to the server, a query request used to obtain the information associated with the first road section, and receiving a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

According to an eighteenth aspect, an electronic device is provided. The electronic device includes one or more processors and one or more memories, where the one or more memories store one or more computer programs, the one or more computer programs include instructions, and when the instructions are executed by the one or more processors, the electronic device is enabled to perform the method according to any one of the sixteenth aspect or the possible implementations of the sixteenth aspect.

According to a nineteenth aspect, a computer-readable storage medium is provided. The computer-readable storage medium includes a computer program, and when the computer program is run on an electronic device, the electronic device is enabled to perform the method according to any one of the sixteenth aspect or the possible implementations of the sixteenth aspect.

According to a twentieth aspect, a computer program product is provided. When the computer program product is invoked by a computer, the computer is enabled to perform the method according to any one of the sixteenth aspect or the possible implementations of the sixteenth aspect.

The foregoing objectives and other objectives are achieved by using features in the independent claims. Further implementations are embodied in the dependent claims, the specification, and the accompanying drawings.

For beneficial effects of the second aspect to the twentieth aspect, refer to the beneficial effects of the first aspect. Details are not described again.

BRIEF DESCRIPTION OF DRAWINGS

FIG. 11 is a schematic flowchart of a navigation method according to an embodiment of this application;

FIG. 14 is a schematic diagram of an interface for entering a navigation planning requirement according to an embodiment of this application;

DESCRIPTION OF EMBODIMENTS

Figure 1:
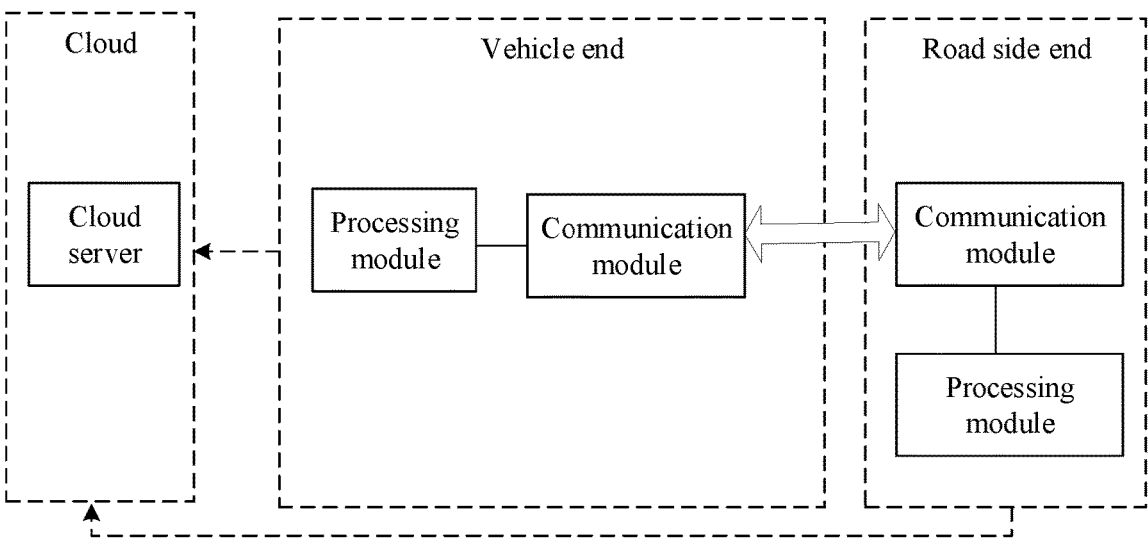
FIG. 1 is a schematic diagram of a possible network architecture according to an embodiment of this application.

Accuracy of an electronic map is essential to accuracy of a planned navigation path. Currently, errors on the electronic map are mainly reported manually, and then the electronic map is corrected through drive tests based on manually reported problems.

For example, for a static error in the electronic map, for example, a planned path provided by the electronic map includes a road that does not exist, a traveling direction in the planned path is inconsistent with a traveling direction allowed by the road, or a road surface status is not suitable for vehicle traveling, the static error is mainly reported manually to an electronic map service provider. Subsequently, the electronic map service provider obtains map data and updates the electronic map by collecting data on site. A data collection manner mainly includes vehicle-based collection (for example, collecting road information by driving a vehicle and using an apparatus such as a sensor in the vehicle) and collecting while walking (for example, manually collecting road information). In addition, data may be collected in a manner such as photographing and measurement by using an air vehicle.

For another example, for a dynamic problem on an electronic map, for example, road congestion, road construction, temporary road closure, and a traffic event, a user mainly needs to report the problem by using an electronic map client. In a method of reporting by a user, a reporting event type is preset. There are five reporting event types: accident, road closure, water accumulation, construction, and congestion. When finding that one or more of the five events occur on a road in a driving process, the user may report the event/events by using a map application.

The electronic map is corrected based on self-reporting by users and an on-site survey by professional persons, which is costly and time-consuming, and has poor controllability (because the users perform manual operations, most users may not actively report events), and accuracy cannot be ensured (because information reported by the users may be inaccurate, or even incorrect information is maliciously reported).

In addition, the current navigation planning method further has the following problem: There is a lack of a personalized service for a user, and effective prompt information is not provided for the user in a navigation process, thereby resulting in relatively low driving experience of the user.

In conclusion, a current manner of detecting an electronic map error cannot meet requirements for navigation accuracy and effectiveness.

Embodiments of this application provide an electronic map correction method, a navigation information setting method, a navigation method, and an apparatus, to resolve one or more of the foregoing problems. For example, in this embodiment of this application, no manual active reporting is involved, and no additional sensor needs to be installed. Instead, information such as a navigation planning adoption rate and vehicle traveling information of a road section is collected and analyzed, to obtain a possible factor that affects that a vehicle or a driver does not travel according to a planned road section, and then the electronic map is correspondingly corrected, or navigation information is set, to meet the requirements for navigation accuracy and effectiveness.

The terms "system" and "network" may be used interchangeably in embodiments of this application. "a plurality of" means two or more. In view of this, in embodiments of this application, "a plurality of" may also alternatively be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship between associated objects and indicates that three relationships may exist. For example, A and/or B may indicate the following three cases: Only A exists, both A and B exist, and only B exists. In addition, the character "/", unless otherwise specified, generally indicates an "or" relationship between the associated objects.

Unless otherwise specified, ordinal terms such as "first" and "second" used in embodiments of this application are used to distinguish between a plurality of objects, and are not intended to limit a sequence, a time sequence, a priority, or importance of the plurality of objects.

A specific operation method in a method embodiment may also be applied to an apparatus embodiment or a system embodiment.

To better understand embodiments of this application, the following first describes terms in embodiments of this application.

(1) Road Section:

In the traffic field, a road section is a traffic line between two adjacent nodes (for example, an intersection) on a traffic network.

(2) Navigation Planning Adoption Rate of a Road Section:

The navigation planning adoption rate of a road section is used to represent a relationship between a first quantity of times that the road section is planned as a navigation planning road section in a statistics time period and a second quantity of times that vehicles travel into or do not travel into the road section in accordance with the navigation planning.

For example, the navigation planning adoption rate is used to represent a percentage of the vehicles that do not travel into a road section in accordance with the navigation planning in a statistics time period, and may be represented by using the following formula:

$$ failPer_i = \frac{n}{m} $$

where $failPer_i$ represents a percentage of the vehicles that do not travel into a road section i in accordance with the navigation planning in the statistics period; m represents a quantity of times that the road section i is selected as a navigation planning road section in the statistics period (that is, a first quantity of times); and n represents a quantity of times that the road section i is selected as a navigation planning road section in the statistics period but the vehicles do not select the road section for traveling (that is, a second quantity of times). For example, in a statistics time period, a road section i is selected as a navigation planning road section 100 times, and in the 100 navigation planning times, a quantity of times that the vehicles do not select the road section i in accordance with the planned navigation path for traveling is 60. In this case, in the statistics period, a percentage of the vehicles that do not travel into the road section i in accordance with the navigation planning is 60%.

It may be understood that the navigation planning adoption rate of the first road section may also be used to represent a relationship between a quantity of times that the first road section is planned as a navigation planning road section in the first statistics time period and a quantity of times that the vehicle travels into the first road section in accordance with the navigation planning, and may be represented by using the following formula:

$$ SuccPer_i = \frac{m - n}{m} $$

where $SuccPer_i$ represents a percentage of the vehicles that travel into a road section i in accordance with the navigation planning in the statistics period; m represents a quantity of times that the road section i is selected as a navigation planning road section in the statistics period (that is, a first quantity of times); and n represents a quantity of times that the road section i is selected as a navigation planning road section in the statistics period but the vehicles do not select the road section for traveling (that is, a second quantity of times). For example, in the first statistics time period, a quantity of times (that is, a first quantity of times) that the first road section is planned as a navigation planning road section is 100, and a quantity of times (that is, a second quantity of times) that vehicles do not travel into the first road section in accordance with the navigation planning is 40. In this case, in the first statistics time period, a percentage of the vehicles that travel into the first road section in accordance with the navigation planning is 40%, and a percentage of the vehicles that do not travel into the first road section in accordance with the navigation planning is 60%.

It should be noted that, in this embodiment of this application, a terminal (for example, an in-vehicle terminal or a mobile phone) may perform navigation path planning, or a server on a network side may perform navigation path planning based on a request of the terminal.

(3) Vehicle Traveling Information of a Road Section:

Statistics of vehicles (for example, vehicles that travel into the road section or vehicles that travel on the road section) that travel on a road section (or have traveled on the road section) in a statistics time period. The statistics may include information such as a quantity of these vehicles, traveling directions of these vehicles, and vehicle model features of these vehicles. For example, the traffic information of the first road section may specifically include at least one of the following statistics:

(i) A vehicle traveling volume of the first road section in the statistics time period, where the vehicle traveling volume may be a quantity of traveling vehicles, or may be a quantity of traveling times of vehicles. For the quantity of traveling times of vehicles, there is a case in which a same vehicle travels into or has traveled into the road section for a plurality of times. That is, during statistics collection, license plate numbers may not be distinguished. Therefore, if the same vehicle travels on the road section for N times (N is an integer greater than or equal to 2) in a statistics time period, the vehicle is counted as traveling N times during statistics collection.

(ii) Traveling directions of vehicles that travel into the first road section or travel on the first road section in the statistics time period.

(iii) Vehicle model feature information of vehicles that travel into the first road section or travel on the first road section in the statistics time period.

(4) Traveling Attribute Information of a Road Section:

Traveling attribute information of a road section on the electronic map is one of various types of attribute information of the road section on the electronic map, and may be used to represent whether the road section is travelable, a traveling direction, or the like. The traveling attribute information in this embodiment of this application may include at least one of the following information:

(i) Whether traveling on the road section is allowed or whether the road section is travelable. For example, the road section may be non-travelable due to road section construction, emergencies, or traffic restrictions.

(ii) Traveling direction allowed by the road section, for example, two-way traveling is allowed by the road section, or only one-way traveling in a specific direction is allowed by the road section.

Further, a traveling attribute of a road section may further include a vehicle model feature of vehicles that are suitable for and/or not suitable for traveling on the road section, whether the road section has a forked intersection that may be easily entered by mistake, whether the road section is a road section prone to a traffic violation, or the like.

(5) Vehicle Model Feature Information of a Vehicle:

The vehicle model feature information may include at least one of the following: a vehicle model (for example, a car, an off-road vehicle, a box van, or a big van), a vehicle height (which may be a value or a height value range), a vehicle width (which may be a value or a width value range), a vehicle length (which may be a value or a value range), a vehicle chassis height (which may be a value or a value range), and the like. Certainly, another feature may be further included. This is not limited in this embodiment of this application.

In embodiments of this application, different thresholds are used. The following describes the thresholds in embodiments of this application.

First threshold and second threshold: The first threshold and the second threshold are thresholds used to measure "a percentage of the vehicles that do not travel in accordance with the navigation planning", and are used to determine a percentage of a quantity of times that a road section is selected as a planned road section but vehicles do not travel into the road section. The first threshold is greater than the second threshold. The first threshold and the second threshold may be preset. For example, a value of the first threshold may be 80%, and a value of the second threshold may be 10%. For another example, a value of the first threshold may be 75%, and a value of the second threshold may be 5%.

Third threshold: The third threshold is used to measure a vehicle traveling volume of a road section, and is used to determine whether a vehicle is allowed to travel on the road section. The third threshold may be preset, and may be set to a relatively small value.

Fourth threshold: The fourth threshold is used to measure a ratio of vehicles having a same vehicle model feature in vehicles that do not travel into the first road section in accordance with the navigation planning, and is used to determine whether the ratio is relatively high. The fourth threshold may be preset. For example, a value of the fourth threshold may be 70%.

Fifth threshold: The fifth threshold is used to measure a quantity of traffic violation tickets generated by the vehicles. The fifth threshold may be preset, and a value of the fifth threshold may be set based on experience or statistics.

Sixth threshold: The sixth threshold is used to measure a quantity of vehicles that do not travel in accordance with a planned navigation path. The sixth threshold may be preset, and a value of the sixth threshold may be set based on experience or statistics.

Seventh threshold: The seventh threshold is used to measure a quantity of times of vehicles that do not travel in accordance with the planned navigation path. The seventh threshold may be preset, and a value of the seventh threshold may be set based on experience or statistics.

The following further describes in detail embodiments of this application with reference to the accompanying drawings.

For ease of understanding embodiments of this application, a system architecture to which embodiments of this application may be applied is first described. The system architecture may be applied to application scenarios such as vehicle navigation, unmanned driving, automated driving, intelligent driving, and networked driving.

FIG. 1 shows a system architecture to which embodiments of this application may be applied. As shown in FIG. 1, the system architecture includes a vehicle end, a road side end, and a cloud.

The vehicle end includes at least one vehicle, or an in-vehicle terminal in one vehicle. The vehicle or the in-vehicle terminal may include a processing module, a communication module, and the like. The processing module may run one or more applications, and the one or more applications may include a map application. When running the map application, the processing module may display information such as one or more planned paths from a location A to a location B of the vehicle, and receive a target planning path selected by a user from the one or more planned paths. The processing module may further activate the communication module, and control the communication module to send information about a target planning path. The communication module may be configured to communicate with the outside (for example, a road side device, a road side server, or a cloud server), for example, send the planned navigation path information of the vehicle to the road side device, or for another example, send the planned navigation path information of the vehicle to the cloud server.

Optionally, when the vehicle end includes at least two vehicles, the vehicles may further communicate with each other. For example, the at least two vehicles include a first vehicle and a second vehicle. A planned navigation path determined by the first vehicle is denoted as a first planned path, a planned navigation path determined by the second vehicle is denoted as a second planned path, and the first vehicle may send information about the first planned path to the second vehicle, the second vehicle may send the information about the first planned path and information about the second planned path to the road side device and/or the cloud server.

The road side end may include one or more road side devices. The road side device may include a communication module and the like. The communication module is configured to receive the information about the target planning path sent and the like sent by the vehicle. Optionally, the road side device may further include a processing module. The processing module is configured to: process planning path information of a plurality of vehicles that is received by the communication module, for example, combine and pack the planning path information; and then send the planning path information by using the communication module. For example, the road side device may be a road side unit (RSU). The RSU is used as an example. The RSU may receive the planning path information of at least one vehicle, and send the planning path information to a road side server or a cloud server.

The road side end may further include one or more road side servers. Similarly, the road side server may receive the planning path information sent by at least one vehicle, or receive the planning path information of at least one vehicle that is sent by the RSU.

The cloud may include a cloud server and the like, and may receive the planning path information of at least one vehicle.

It should be understood that FIG. 1 is merely an example. (1) The system architecture may further include more or fewer devices. For example, the system architecture may further include an application server. A vehicle determines planned navigation path information by using a map application, and the application server may obtain the planned navigation path information of the vehicle, and the application server sends the planned navigation path information of the vehicle to a cloud server or a road side server. (2) Each device in the system architecture may further include more or fewer components. For example, the cloud server and the road side server may further include a storage device, configured to store historical path information, historical positioning information, or speed information of a vehicle. In addition, a quantity of road side servers, vehicles, and cloud servers included in the system architecture is not limited in this embodiment of this application. (3) In FIG. 1, an example in which a vehicle end includes a vehicle is used for description. In the system architecture in this embodiment of this application, the vehicle end may further include another type of terminal device, for example, a mobile phone or a tablet computer. For example, when the vehicle end includes a mobile phone, the planned navigation path may be determined by a user by using a mobile phone (for example, a map application installed on the mobile phone), and the planned navigation path is a driving path suitable for the vehicle, the planned navigation path information is sent to the outside by using the mobile phone. A type of a device for sending the planned navigation path is not limited in this embodiment of this application.

Technologies described in embodiments of this application may be applied to various system architectures such as a 4th generation (4G) system architecture, a 5G system architecture, a system in which a plurality of system architectures are integrated, or a future evolved system architecture (for example, a 6G system architecture), for example, a Long Term Evolution (LTE) system, a New Radio (NR) system, a vehicle to everything (V2X), a Long Term Evolution-Internet of Vehicles (LTE-V), a vehicle to vehicle (V2V), an Internet of Vehicles, and other similar system architectures. This is not limited in embodiments of this application.

Figure 2:
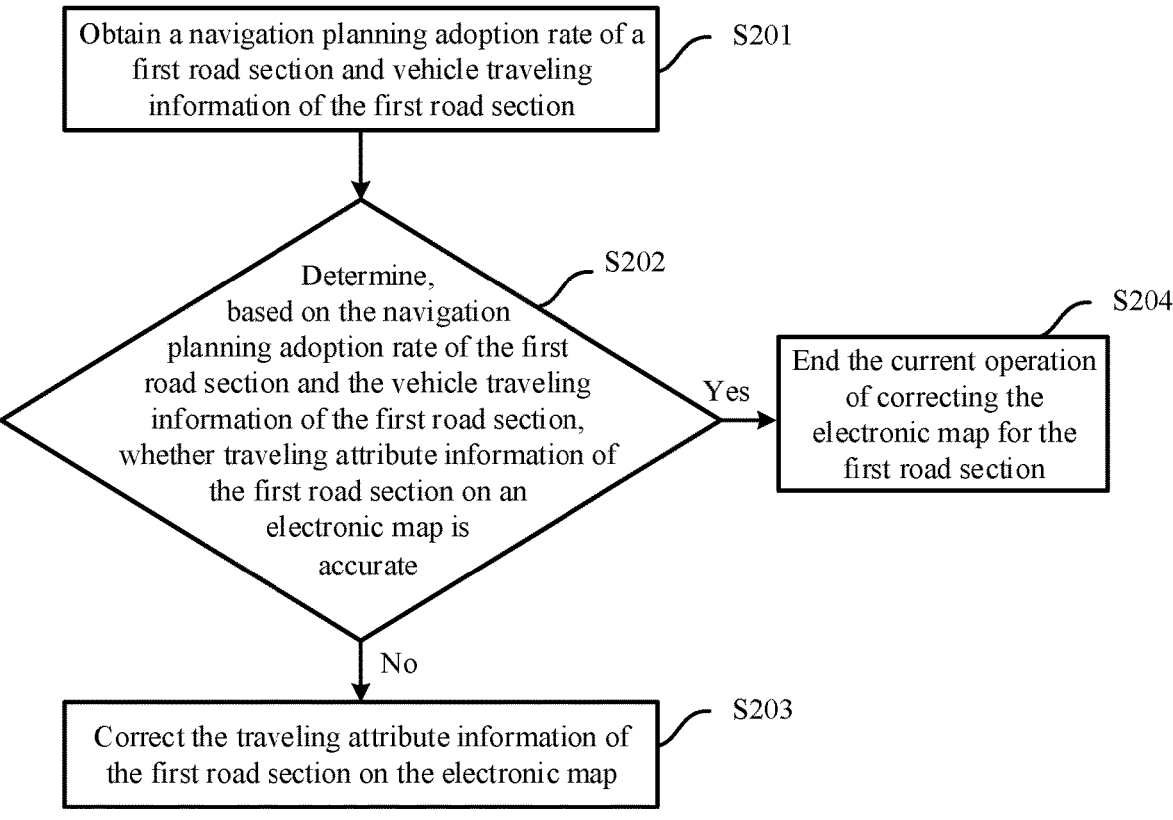
FIG. 2 is an overall schematic flowchart of electronic map correction implemented on a server side according to an embodiment of this application.

Based on the foregoing system architecture, FIG. 2 shows an example of an overall procedure of electronic map correction implemented on a server side according to an embodiment of this application. The server may be the cloud server shown in FIG. 1.

Refer to FIG. 2. An electronic map correction process implemented on a server side according to an embodiment of this application may include the following steps.

S201. A server obtains a navigation planning adoption rate of a first road section and vehicle traveling information of the first road section.

Optionally, the server may obtain, for a specified geographic area, a navigation planning adoption rate and vehicle traveling information in the geographic area, so as to modify electronic map data in the geographic area. The specified geographic area may be ab urban central area, or an urban transportation hub area, or a tourism hotspot area, or may be an entire urban road network area, or the like. This is not limited in this embodiment of this application. The specified geographic area may include a plurality of road sections or only one road section.

The navigation planning adoption rate and the vehicle traveling information of the first road section may be obtained by collecting statistics on navigation planning information (for example, a planned navigation path) and vehicle traveling information (for example, a vehicle location, a road section in which the vehicle travels, and a vehicle traveling direction) in a first statistics time period.

The navigation planning adoption rate of the first road section may be a percentage of times that the vehicles do not travel into the first road section in accordance with the navigation planning, or may be a percentage of times that the vehicles travel into the first road section in accordance with the navigation planning.

Optionally, the server may obtain the foregoing information in a periodic triggering manner or an event triggering manner to correct an electronic map, so that error information on the electronic map can be found and corrected in a timely manner. In addition, because the error information on the electronic map is found according to the foregoing statistics (such as a navigation planning adoption rate and vehicle traveling information), the user does not need to report the error information, thereby ensuring controllability and accuracy. The server may further combine the periodic triggering manner and the event triggering manner to correct the electronic map. That is, the server may execute the process shown in FIG. 2 according to a specified period. In addition, when a specific event occurs (for example, a map correction condition is met), the server also executes the process shown in FIG. 2.

A period length may be set according to factors such as a requirement for precision of the electronic map and server performance. For example, if the requirement for the precision of the electronic map is high, the period length may be set to be relatively short, for example, may be set to one week (7 days); or if the requirement for the precision of the electronic map is low, the period length may be set to be relatively long, for example, may be set to one month (30 days).

The specific event may include at least one of receiving an instruction by a server or meeting a map correction condition. When at least one of the following map correction conditions is met, the server may trigger execution of the process shown in FIG. 2:

Condition 1: A quantity of vehicles that do not travel in accordance with the planned navigation path is greater than a sixth threshold.

Condition 2: A quantity of times that vehicles that do not travel in accordance with a planned navigation path is greater than a seventh threshold.

Certainly, the foregoing merely provides an example of the condition that should be met for triggering electronic map correction. However, this embodiment of this application is not limited to the foregoing example. For example, the condition that should be met for triggering electronic map correction may further include: for N or more than N (N is an integer greater than or equal to 1, and a value of N may be preset) road sections, a percentage of the vehicles that do not travel accordance with a planned navigation path is greater than a specified threshold. This is not limited in this embodiment of this application.

According to different manners of triggering electronic map correction by the server, the meaning of the first statistics time period may include:

(1) If the server performs electronic map correction based only on periodic triggering, the first statistics time period may be a time period in a latest period, or may be a sub-time period in a latest period, for example, a latest sub-time period in a latest period (a length of the sub-time period is less than a length of a period, and the length of the sub-time period may be preset).

(2) If the server performs electronic map correction based only on event triggering, the first statistics time period may be a time period from current event triggering to previous event triggering, or may be a sub-time period in the time period, for example, a latest sub-time period in the time period (a length of the sub-time period may be preset).

(3) If the server may perform electronic map correction based on periodic triggering, and may perform electronic map correction based on event triggering, the first statistics time period is a time period from current triggering of electronic map correction to previous triggering of electronic map correction, where the current triggering and the previous triggering may be periodic triggering or event triggering.

S202. The server determines, based on the navigation planning adoption rate of the first road section and the vehicle traveling information of the first road section, whether traveling attribute information of the first road section on the electronic map is accurate. If the traveling attribute information is inaccurate, go to S203; or if the traveling attribute information is accurate, go to S204 to end the current electronic map correction processing operation for the first road section.

S203. The server corrects the traveling attribute information of the first road section on the electronic map.

In the process shown in FIG. 2, the server may determine, based on the navigation planning adoption rate of the road section and the vehicle traveling information of the road section, whether the traveling attribute information of the corresponding road section on the electronic map is accurate, and correct the electronic map when determining that the traveling attribute information is inaccurate. Because navigation planning adoption rate of a road section and vehicle traveling information of the road section may be obtained by collecting statistics on vehicle navigation and traveling information, that is, big data analysis may be performed based on a difference between a planned navigation path and an actual traveling path of a vehicle, so as to find and correct a possible error in an electronic map in a timely manner, thereby improving navigation accuracy and effectiveness. The foregoing electronic map correction process does not rely on manual active reporting, and is controllable. In addition, no additional device such as a sensor needs to be installed on a road side, that is, there is no need to increase investment costs.

In some embodiments, it may be determined, based on the navigation planning adoption rate and the vehicle traveling information of the first road section, whether the "travelable" attribute of the first road section on the electronic map is accurate, and if the attribute is inaccurate, correction is performed, to improve navigation accuracy.

Specifically, in S202, the server may determine, based on the navigation planning adoption rate and the vehicle traveling information of the first road section, whether the first road section is travelable. In S203, if it is determined that the first road section is non-travelable, the electronic map is corrected, so that the first road section on the electronic map is marked as non-travelable or is deleted, so as to prevent a navigation system from subsequently selecting the road section as a planned road section.

Further, when the first road section is marked as non-travelable, the first road section may be further marked as to-be-checked, so as to further collect data of the first road section subsequently through vehicle-based collection (for example, collecting road information by driving a vehicle and using an apparatus such as a sensor in the vehicle) or collection while walking (for example, manually collecting data), or in another manner, so that the electronic map is more accurately corrected.

Optionally, when determining that the following conditions are met, the server may determine that the first road section is non-travelable:

For the first road section, a percentage of the vehicles that do not travel in accordance with the navigation planning (that is, a ratio of a second quantity of times that the vehicles do not travel into the road section in accordance with the navigation planning to a first quantity of times that the road section is planned as the navigation planning road section in a statistics time period, that is, a navigation planning adoption rate $failPer_i$, where i is identification information of the first road section) is greater than a first threshold; and it is determined, based on the vehicle traveling information of the first road section, that a vehicle traveling volume of the first road section in the first statistics time period is less than a third threshold.

The first threshold is a threshold used to measure "a percentage of the vehicles that do not travel in accordance with the navigation planning", and is used to determine a percentage of a quantity of times that a road section is selected as a planned road section but vehicles do not travel into the road section. Therefore, for the first road section, if the percentage of the vehicles that do not travel in accordance with the navigation planning is greater than the threshold, it indicates that most of the vehicles do not travel into the first road section in accordance with the navigation planning.

The third threshold is used to measure a vehicle traveling volume of a road section, and is used to determine whether a vehicle is allowed to travel the road section. Therefore, for the first road section, if the vehicle traveling volume of the first road section in the first statistics time period is less than the third threshold, it indicates that no vehicle or a few vehicles travel into the first road section or travel on the first road section in the first statistics time period. In some special cases, for example, the first road section is under construction and is non-travelable, but some engineering vehicles need to work on the first road section. Because a traveling volume of engineering vehicles is less than that of social vehicles, the traveling volume threshold may be set to a relatively small value, so that a case in which a traveling volume of vehicles is small due to road construction is considered, thereby improving determining accuracy.

If a percentage of the vehicles that do not travel into the first road section in accordance with the navigation planning in the first statistics time period is very high (for example, the percentage of the vehicles that do not travel into the first road section in accordance with the navigation planning is greater than the first threshold), it indicates that a possibility that the first road section is non-travelable is relatively high. Further, if almost no vehicles travel into the first road section or travel on the first road section (for example, a vehicle traveling volume is less than the third threshold) in the first statistics time period, it may be determined that the first road section is non-travelable. In the foregoing embodiment of this application, the method for determining, based on the navigation planning adoption rate and the vehicle traveling information, whether the first road section is travelable is objective and reasonable. Therefore, a relatively accurate determining result can be obtained, and accuracy of a corrected electronic map can be ensured.

The reasons why the first road section is non-travelable may include the following several possibilities.

(1) The first road section is physically non-travelable. For example, the first road section on the electronic map is travelable, but in an actual case, the first road section is non-travelable due to a road closure (for example, a road is blocked due to construction), or the first road section on the electronic map does not actually exist, or a location of the first road section on the electronic map is incorrectly marked.

Figure 3A:
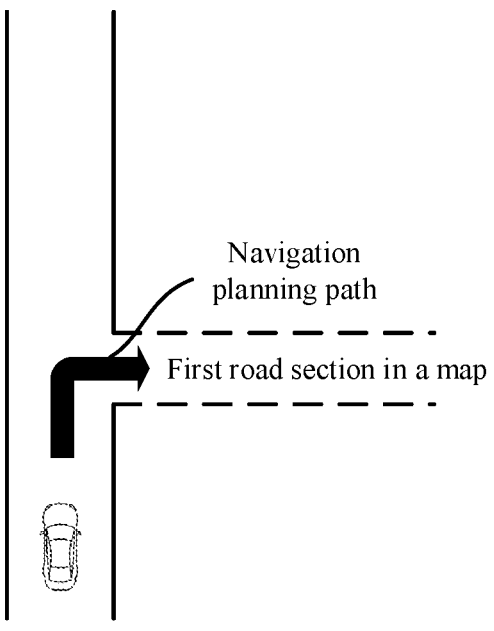
FIG. 3a and FIG. 3b are schematic diagrams of an electronic map data error according to an embodiment of this application.
Figure 3B:
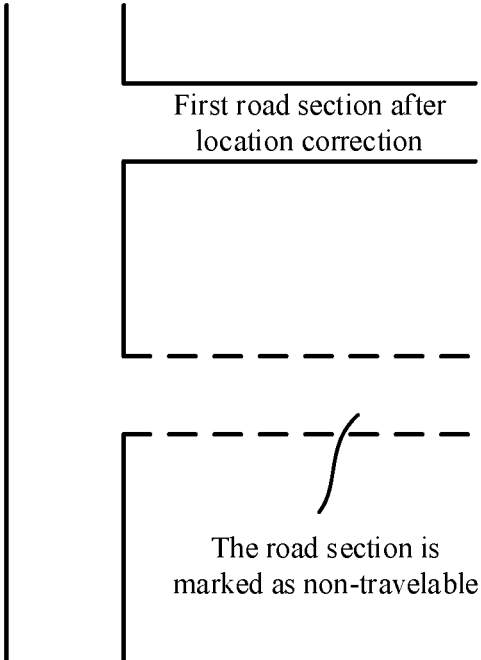

In the scenario shown in FIG. 3a, location data of the first road section on the electronic map is incorrect. In this case, for the first road section on the electronic map, a percentage of the vehicles that do not travel in accordance with a planned navigation path is greater than the first threshold, and there are no statistics of vehicles that travel on the road section. Therefore, the server determines that the first road section on the electronic map is non-travelable, and marks the first road section on the electronic map as non-travelable, so that the road section will not be selected during subsequent navigation path planning. Further, a correct location of the road section may be determined through actual measurement, and then the electronic map is corrected. The first road section in the corrected electronic map may be shown in FIG. 3b. It can be learned that, in this embodiment of this application, an error in the electronic map can be detected and corrected in a timely manner in this scenario, so that navigation accuracy can be improved.

Figure 4:
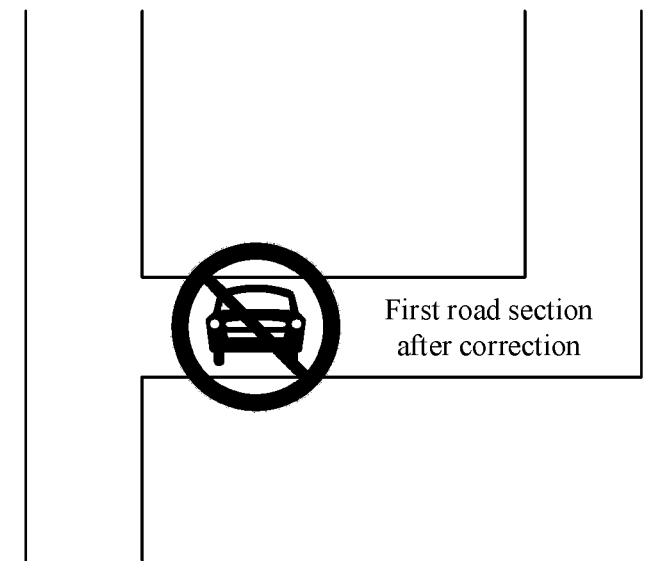
FIG. 4 is a schematic diagram of an electronic map data error and correction according to an embodiment of this application.

On the electronic map, a traveling status of the first road section is incorrect (for example, the road is non-travelable due to construction). In this case, for the first road section on the electronic map, a percentage of the vehicles that do not travel in accordance with the planned navigation path is greater than the first threshold, and there are a few vehicles on the road section (some engineering vehicles are allowed to travel into the road section for construction operation). Therefore, the server determines that the first road section on the electronic map is non-travelable, and marks the first road section on the electronic map as non-travelable, as shown in FIG. 4, so that the road section will not be selected during subsequent navigation path planning. It can be learned that, in this embodiment of this application, an error in the electronic map can be detected and corrected in a timely manner in this scenario, so that navigation accuracy can be improved.

(2) Traveling is restricted by law. For example, the first road section on the electronic map is travelable, but in an actual case, traveling on the first road section is prohibited (for example, a military forbidden area) or a traveling direction is restricted.

In this embodiment of this application, for the foregoing scenarios, an error in the electronic map may be identified by analyzing the navigation planning adoption rate and the vehicle traveling information of the first road section, and the error is corrected.

In some embodiments, it may be determined, based on the navigation planning adoption rate and the vehicle traveling information of the first road section, whether the "travelable" attribute of the first road section on the electronic map is accurate, and if the attribute is inaccurate, correction is performed.

Specifically, in S202, the server may determine, based on the navigation planning adoption rate and the vehicle traveling information of the first road section, whether the traveling direction of the first road section on the electronic map is accurate; and in S203, if it is determined that the traveling direction of the first road section on the electronic map is inaccurate, the traveling direction of the first road section on the electronic map is corrected, thereby improving navigation accuracy.

Optionally, when determining that the following conditions are met, the server may determine that the traveling direction of the first road section on the electronic map is inaccurate:

For the first road section, a percentage of the vehicles that do not travel in accordance with the navigation planning (that is, a ratio of a second quantity of times that the vehicles do not travel into the road section in accordance with the navigation planning to a first quantity of times that the road section is planned as the navigation planning road section in a statistics time period, that is, a navigation planning adoption rate $\text{failPer}_i$, where i is identification information of the first road section) is greater than a first threshold; and it is determined, based on the vehicle traveling information of the first road section, that the vehicle traveling volume of the first road section in the first statistics time period is greater than or equal to a third threshold; and the vehicle traveling direction (that is, the actual traveling direction of the vehicles on the first road section) obtained from the vehicle traveling information of the first road section is different from the planned traveling direction (that is, the traveling direction indicated by the navigation) of the first road section. For example, the actual traveling direction of the vehicles on the first road section is opposite to the traveling direction indicated by the navigation.

The meanings of the first threshold and the third threshold are described above.

Optionally, if the server determines that an actual traveling direction of a relatively high percentage of the vehicles in the vehicles traveling on the first road section is opposite to the traveling direction indicated by the navigation, it is considered that for the first road section, the actual traveling direction of the vehicles is opposite to the traveling direction indicated by the navigation.

A ratio threshold may be preset, and the threshold may be used to determine whether a traveling direction of a relatively high percentage of the vehicles in the vehicles traveling on the first road section is opposite to the traveling direction indicated by the navigation. For example, if a ratio of a quantity of vehicles whose traveling directions are opposite to the traveling direction indicated by the navigation to the total quantity of vehicles traveling on the first road section is greater than the ratio threshold, it is considered that for the first road section, the actual traveling direction of the vehicles is opposite to the traveling direction indicated by the navigation.

If a percentage of the vehicles that do not travel into the first road section in accordance with the navigation planning in the first statistics time period is very high (for example, the percentage of the vehicles that do not travel into the first road section in accordance with the navigation planning is greater than the first threshold), and a specific quantity of vehicles travel into the first road section or travel on the first road section (for example, a vehicle traveling volume is greater than or equal to the third threshold), it indicates that the first road section is travelable. However, an actual traveling direction of the vehicles that travel into or travel on the first road section is different from a direction indicated by the navigation, it indicates that the traveling direction of the first road section is incorrectly marked on the electronic map. The error may be corrected by correcting the traveling direction of the first road section on the electronic map, so as to improve accuracy of subsequent navigation planning.

For example, the first road section is marked on the electronic map as a one-way lane on which only southward traveling is allowed, but actually the first road section is a one-way lane on which only northward traveling is allowed, that is, a traveling direction of the first road section on the electronic map is incorrect. As a result, when a navigation path is planned according to the electronic map, a direction indicated by the navigation of the first road section in a planned path is southward, and a vehicle cannot travel southward on the first road section according to the navigation path. Consequently, a percentage of the vehicles that do not travel in accordance with the navigation planning is greater than the first threshold. Further, the vehicle traveling information of the first road indicates that an actual traveling direction of the vehicles on the first road section is northward. Therefore, with reference to the foregoing determining result (that is, a percentage of the vehicles that do not travel in accordance with the navigation planning is greater than the first threshold), it may be determined that the traveling direction of the first road section is incorrectly marked on the electronic map. Further, a traveling direction allowed by the first road section on the electronic map may be corrected according to an actual traveling direction of the vehicles on the first road section. For example, the traveling direction of the first road section on the electronic map is corrected from only allowing traveling southward to only allowing traveling northward.

Considering that some special reasons may lead to an abnormal traveling direction of a vehicle, for example, if the first road section is not located in a traffic monitoring area, some drivers may not drive according to a traffic law. Consequently, in the first statistics time period, a traveling direction of vehicles that travel into or travel on the first road section is different from a planned traveling direction (that is, a traveling direction indicated by the navigation) of the first road section. However, this does not mean that the traveling direction of the first road section that is marked on the electronic map is definitely incorrect. Therefore, this case needs to be identified to reduce misjudgment and avoid error correction of the electronic map.

Therefore, in some embodiments, if the server determines that the following conditions are met, it is determined that the traveling direction of the first road section on the electronic map is inaccurate:

For the first road section, a percentage of the vehicles that do not travel in accordance with the navigation planning (that is, a ratio of a second quantity of times that the vehicles do not travel into the road section in accordance with the navigation planning to a first quantity of times that the road section is planned as the navigation planning road section in a statistics time period, that is, a navigation planning adoption rate $failPer_i$, where i is identification information of the first road section) is greater than a first threshold;

it is determined, based on the vehicle traveling information of the first road section, that the vehicle traveling volume of the first road section in the first statistics time period is greater than or equal to a third threshold; and the vehicle traveling direction (that is, the actual traveling direction of the vehicles on the first road section) obtained from the vehicle traveling information of the first road section is different from the planned traveling direction (that is, the traveling direction indicated by the navigation) of the first road section. For example, the actual traveling direction of the vehicles on the first road section is opposite to the traveling direction indicated by the navigation.

The first road section is located in a traffic monitoring area.

Optionally, the server may obtain environment information of the first road section, and determine, based on the environment information of the first road section, whether the first road section is located in a traffic monitoring area. The environment information of the first road section may be used to indicate whether the first road section is located in a traffic monitoring area. For example, the environment information of the first road section may include a location of the first road section. If the first road section is located in an urban center or a transportation hub, the first road section is usually located in a traffic monitoring area. For another example, the environment information of the first road section may include deployment information of a traffic surveillance camera on the first road section. If a traffic surveillance camera is deployed on the first road section, the first road section is located in a traffic monitoring area.

Further, in some embodiments, if the server determines that the first road section is not located in a traffic monitoring area, in this case, for the first road section, it cannot be determined whether the actual traveling direction of the vehicles is different from the direction indicated by the navigation, that is, whether the difference is caused by incorrect marking of the traveling direction of the first road section on the electronic map or by another reason. Therefore, the server may set the first information associated with the first road section, where the first information is used to indicate that the traveling direction allowed by the first road section is uncertain. The first information may be used as one of navigation planning bases during navigation planning, and is used to assist in navigation path planning, so as to prevent a road section with an uncertain traveling direction from being used as a planned navigation path as much as possible, thereby improving navigation effectiveness and improving user experience. The first information may also be output (for example, output by using a voice or displayed on an electronic map interface) by the terminal as prompt information in a vehicle driving process, so as to prompt the driver, thereby improving user experience.

Further, the server may mark the first road section as a to-be-checked road section, so that data collection is subsequently performed on the first road section through vehicle-based collection or collection while walking, or in another manner, so that the electronic map is more accurately corrected.

Optionally, a method for setting the first information associated with the first road section may be: adding the first information to the first road section on the electronic map, so that the first information is stored as a part of the electronic map data. In this way, the first information associated with the first road section may be updated when the electronic map is updated. A method for setting the first information associated with the first road section may alternatively be: adding the first road section to a list of road sections with to-be-determined traveling directions, where the traveling directions of the road sections in the list of road sections with to-be-determined traveling directions are uncertain. The list of road sections with to-be-determined traveling directions may be stored independently of the electronic map data, so that a coupling degree with the electronic map data can be reduced, and the list can be updated or pushed to a terminal independently of the electronic map data. Further, the server may locally store the list of road sections with to-be-determined traveling directions in the server, or may send the list to a terminal having an electronic map application or a navigation function.

In some embodiments, if the first road section is travelable, but some vehicles still do not travel into the first road section in accordance with the navigation planning, the server may further analyze whether a cause of the phenomenon is that the vehicle model feature of the vehicles does not match the first road section, so as to determine a vehicle model feature of vehicles that are suitable for traveling and/or not suitable for traveling on the first road section.

Specifically, if the server determines, for the first road section, that a percentage of the vehicles that do not travel in accordance with the navigation planning (that is, a ratio of a second quantity of times that the vehicles do not travel into the road section in accordance with the navigation planning to a first quantity of times that the road section is planned as the navigation planning road section in a statistics time period, that is, a navigation planning adoption rate $failPer_i$, where i is identification information of the first road section) is less than or equal to a first threshold and greater than or equal to the second threshold, it indicates that a relatively large quantity of vehicles do not travel into the first road section in accordance with the navigation planning, and the server obtains a vehicle model feature of vehicles that do not travels into the first road section in accordance with the navigation planning, and determines whether a ratio of a quantity of the vehicles having a same vehicle model feature to a quantity of the vehicles that do not travel into the first road section in accordance with the navigation planning is greater than a fourth threshold. If the vehicle ratio is greater than the fourth threshold, the server sets second information associated with the first road section, where the second information is used to indicate a vehicle model feature of vehicles that are suitable for traveling and/or not suitable for traveling on the first road section.

If the ratio of the quantity of vehicles having the same vehicle model feature to the quantity of the vehicles that do not travel into the first road section in accordance with the navigation planning is greater than the fourth threshold, it indicates that most of the vehicles that do not travel into the first road section in accordance with the navigation planning have the same or similar vehicle model features, and further indicates that a traveling condition of the first road section probably does not match the vehicle model features of these vehicles. As a result, these vehicles do not travel into the first road section in accordance with the navigation planning. In this case, the server may determine, based on the vehicle model features of the vehicles that do not travel into the first road section and whose vehicle ratio is greater than the fourth threshold, a vehicle model feature of vehicles that are suitable for traveling or not suitable for traveling on the first road section, and set the second information associated with the first road section. The second information may include at least one of a vehicle model, a vehicle height, a vehicle width, a vehicle length, or a turning radius. Certainly, the second information may further include other vehicle model feature information. This is not limited in this embodiment of this application.

The second information may be used as an assistance basis for navigation path planning, so that a planned path matches vehicle models of vehicles, thereby improving navigation effectiveness. The second information may also be provided to the user as prompt information in a vehicle driving process, so as to improve user experience.

For example, if a vehicle model feature of most of the vehicles that do not travel into the first road section in accordance with the navigation planning is that a vehicle height is greater than 4 meters, it indicates that the first road section may have a height limit requirement, and is not suitable for traveling by vehicles whose vehicle heights are greater than 4 meters, and is suitable for traveling by vehicles whose vehicle heights are less than 4 meters. For another example, if a vehicle model feature of most of the vehicles that travel into the first road section in accordance with the navigation planning is that a vehicle body length is greater than 10 meters, it indicates that a turning radius on the first road section may be relatively small, and is not suitable for traveling by vehicles whose vehicle body lengths are greater than 10 meters. For another example, if a vehicle model feature of most of the vehicles that do not travel into the first road section in accordance with the navigation planning is that a vehicle width is relatively large, it indicates that the first road section may be relatively narrow, and is not suitable for traveling by vehicles whose widths are relatively large.

Optionally, the server may set the second information associated with the first road section in the following manner: adding the second information to the first road section on the electronic map, that is, adding the second information to the electronic map data, and associating the second information with the first road section, so that the second information is stored as a part of the electronic map data. In this way, the second information associated with the first road section may be updated when the electronic map is updated. In some other embodiments, the server adds the first road section to a list of road sections corresponding to a first vehicle model feature, where the list of road sections corresponding to the first vehicle model feature is used to store a road section matching the first vehicle model feature, and the first vehicle model feature is a same vehicle model feature of the vehicles whose vehicle ratio is greater than the fourth threshold. For example, for the first road section, if a percentage of the vehicles having a same vehicle model feature in the vehicles that do not travel into the first road section in accordance with the navigation planning is greater than the fourth threshold, and heights of these vehicles having the same vehicle model feature are not greater than 3.5 meters, the server adds the first road section to a list of road sections corresponding to a common vehicle model (a height of a common vehicle model is less than 3.5 meters). The list of road sections corresponding to the first vehicle model feature may be stored independently of the electronic map data, so that a coupling degree with the electronic map data can be reduced, and the list can be updated or pushed to a terminal independently of the electronic map data. Further, the list of road sections corresponding to the first vehicle model feature may be stored in the server, or may be sent by the server to a terminal having a navigation function.

In some embodiments, if the first road section is travelable, but some vehicles still do not travel into the first road section in accordance with the navigation planning, and a cause of the phenomenon is not that the vehicle model feature of the vehicles does not match the first road section, the server may further obtain the driving feature of drivers through analysis.

Specifically, if the server determines, for the first road section, that a percentage of the vehicles that do not travel in accordance with the navigation planning (that is, a ratio of a second quantity of times that the vehicles do not travel into the road section in accordance with the navigation planning to a first quantity of times that road section is planned as the navigation planning road section in a statistics time period, that is, a navigation planning adoption rate failPer$_i$, where i is identification information of the first road section) is less than or equal to a first threshold and greater than or equal to a second threshold, and that a percentage of the vehicles that have a same vehicle model feature in the vehicles that do not travel into the first road section in accordance with the navigation planning is less than or equal to a fourth threshold, driver information of the vehicles that do not travel into the first road section in accordance with the navigation planning and feature information of a second road section are obtained, where the second road section is a road section into which the vehicles that do not travel into the first road section in accordance with the navigation planning actually travel; and driving feature information of the drivers is determined based on a difference between a feature of the first road section and a feature of the second road section, and the driving feature information of the drivers is stored. For example, the server may store the determined driving feature of the drivers into a driver database for use as one of the bases for subsequent navigation path planning, so that navigation path planning can be performed according to personalized information of the user, thereby improving effectiveness of navigation planning and improving user experience.

The driver information may be specifically identity information of a driver, and may include an identifier of the driver, a user account name used for logging in to a map application, and the like. The driver information may be obtained in the following manners:

Manner 1: A camera is disposed in the vehicle to collect facial information. For example, a camera disposed in front of a position of the driver can collect facial information of the driver, an in-vehicle terminal sends the collected facial information of the driver to the server, and the server may obtain the identity information of the driver through facial recognition.

Manner 2: The driver first logs in to the map application before using the navigation function in the terminal, and the identity information of the driver may be obtained according to login information.

The feature of the first road section and the feature of the second road section may include a quantity of lanes, a road width, a location, a road surface status (for example, whether a road surface is damaged), a congestion status, and the like.

The feature of the first road section and the feature of the second road section may be obtained from electronic map data. For example, the electronic map includes feature information of the first road section and/or feature information of the second road section, for example, includes a quantity of lanes, a road width, and a location. The feature of the first road section and the feature of the second road section may also be obtained from real-time traffic road condition information. For example, a congestion status of the first road section and/or a congestion status of the second road section may be obtained based on real-time traffic road condition information. The feature of the first road section and the feature of the second road section may also be obtained from data such as images and laser point clouds collected by vehicles traveling on the first road section and the second road section. Generally, various sensors, such as a camera and a radar, used to detect a road and an external environment are disposed in the vehicle. The in-vehicle terminal may send data detected by the sensors to the server, so that the server can obtain various road conditions based on the data, for example, whether a road surface is damaged, whether there is water on the road, and whether there is a pedestrian or a vehicle on the road. The feature of the first road section and/or the feature of the second road section may be further obtained from a road side device disposed on a road side, and the road side device may collect a road condition in real time and upload the road condition to the server. The foregoing merely lists several possible obtaining manners as examples. A manner of obtaining the feature of the first road section and/or the feature of the second road section is not limited in this embodiment of this application. Certainly, the foregoing obtaining manners may also be used in combination.

Optionally, the determining driving feature information of drivers based on a difference between a feature of the first road section and a feature of the second road section may include the following cases:

Case 1: If the first road section is relatively narrow and the second road section is relatively wide, and the driver selects the second road section rather than selecting the first road section for traveling in accordance with the navigation planning, it may be because the driver prefers to drive on a relatively wide road, or it indicates that the driver may have a limited driving skill level and is not good at driving on a relatively narrow road.

Case 2: If pedestrians and vehicles are mixed on the first road section (for example, in a commercial area or a residential area) and there are few vehicles and pedestrians on the second road section, and the driver selects the second road section rather than selecting the first road section for traveling in accordance with the navigation planning, it may be because the driver has a limited driving skill level or prefers to drive on a road section with fewer vehicles.

Case 3: If the first road section is located in an old urban area and there are multi-forked intersections, making the road complex, and the driver selects the second road section rather than selecting the first road section for traveling in accordance with the navigation planning, it may be because the driver is unfamiliar with the road.

Case 4: If road surface quality of the first road section is lower than that of the second road section, and the driver selects the second road section rather than selecting the first road section for traveling in accordance with the navigation planning, it may be because of poor driving experience.

The foregoing merely lists several possible cases as examples. In this embodiment of this application, the driving feature information of the driver may be obtained through learning based on a difference between the feature of the first road section and the feature of the second road section by using a method such as machine learning or a neural network.

Optionally, for a driver of a vehicle or a driver, in addition to analyzing historical driving behaviors of the driver to obtain a driving feature of the driver, and driving behaviors of a plurality of drivers whose driving habits and driving skill levels are similar to those of the driver may be analyzed as a whole, to obtain a driving feature. For example, a driver drives a vehicle in a new environment, and there is no historical driving behavior of the driver in the environment. However, historical driving behavior of a driver whose driving habit and driving skill level are similar to those of the driver in the environment may be used as reference data to obtain a driving feature suitable for the driver, so as to implement personalized path planning for the driver.

Optionally, when the server determines that the first road section is travelable, but some vehicles still do not travel into the first road section in accordance with the navigation planning, and a cause of the phenomenon is not that the vehicle model feature of the vehicles does not match the first road section. In this case, the driving feature of the driver is not analyzed immediately, but is analyzed when a trigger condition is met. That the trigger condition is met may include the following cases:

Case 1: The driving feature information is collected according to a specified period. When it is determined, based on a statistics period of the driving feature information, that a statistics time of the driving feature information arrives, the condition for triggering collecting of statistics on the driving feature is met.

Case 2: When a specified event occurs, a condition for triggering collecting of statistics on the driving feature is met. The set event may be a received request or instruction for collecting statistics on the driving feature information. This is not limited in this embodiment of this application.

In some embodiments, if the first road section is travelable, but some vehicles still do not travel into the first road section in accordance with the navigation planning, and a cause of the phenomenon is not that the vehicle model feature of the vehicles does not match the first road section, the server may further determine, based on an intersection status of the first road section, whether drivers drive into an incorrect road section by mistake because an included angle between road sections corresponding to a forked intersection of the first road section is relatively small.

Specifically, if the server determines, for the first road section, that a percentage of the vehicles that do not travel in accordance with the navigation planning (that is, a ratio of a second quantity of times that the vehicles do not travel into the road section in accordance with the navigation planning to a first quantity of times that road section is planned as the navigation planning road section in a statistics time period, that is, a navigation planning adoption rate $failPer_i$, where i is identification information of the first road section) is less than or equal to a first threshold and greater than or equal to a second threshold, and that a ratio of the vehicles that have a same vehicle model feature in the vehicles that do not travel into the first road section in accordance with the navigation planning is less than or equal to a fourth threshold, intersection information (for example, an intersection quantity and an intersection location) of the first road section on the electronic map is obtained; and if it is determined, based on the intersection information of the first road section, that the first road section includes a forked intersection and an included angle between road sections corresponding to the forked intersection is less than a specified angle, third information associated with the first road section is set, where the third information is used to indicate that the first road section has a forked intersection that may be easily entered by mistake. For example, the third information may be used to prompt that an included angle of a neighboring intersection is relatively small, so as to prompt a driver to pay attention while driving. During navigation path planning, the third information may be used as one of the bases for navigation path planning, and is used to assist in navigation path planning. For example, when navigation planning is performed based on the third information, a road section with a large quantity of forked intersections and a relatively small included angle of the forked intersection may be avoided, so as to prompt the driver to avoid entering an incorrect road section by mistake. The third information may also be output (for example, output by using a voice or displayed on an electronic map interface) by the terminal as prompt information in a vehicle driving process, so as to prompt the driver to avoid entering an incorrect road section by mistake.

The specified angle may be preset. For example, a value of the specified angle may be a value ranging from 45 degrees to 90 degrees, or a value less than or equal to 45 degrees.

Figure 5:
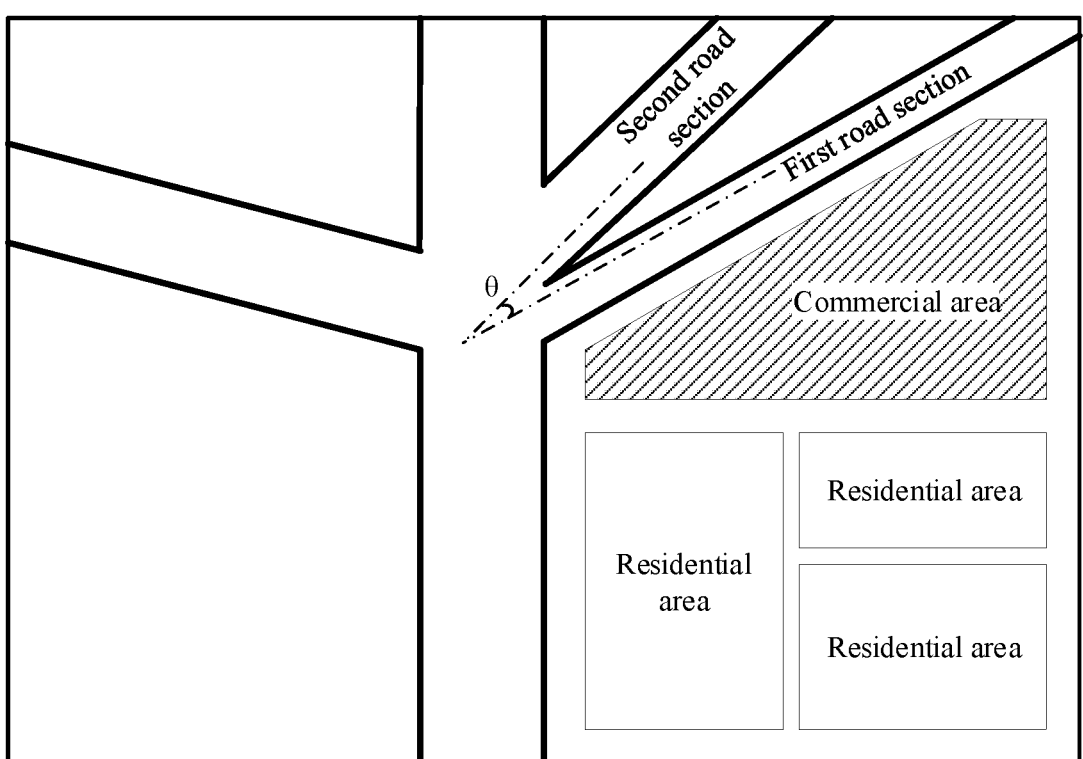
FIG. 5 is a schematic diagram of a relatively small included angle between road sections corresponding to a forked intersection according to an embodiment of this application.

As shown in FIG. 5, on the electronic map, the first road section has a forked intersection, and an included angle $\theta$ between the first road section and the second road section that are corresponding to the forked intersection is less than 45 degrees. A planned navigation path indicates that the vehicle should travel into the first road section. However, because a direction difference between the first road section and the second road section is not significant, the driver may easily enter the second road section by mistake, especially at night, or when the driver is unfamiliar with the road. In this case, for the first road section on the electronic map, if statistics show that a percentage of the vehicles that do not travel in accordance with the navigation planning is less than or equal to a first threshold and is greater than or equal to a second threshold, a percentage of the vehicles that have a same vehicle model feature in the vehicles that do not travel into the first road section in accordance with the navigation planning is less than or equal to a fourth threshold, the first road section includes a forked intersection, and an included angle between road sections corresponding to the forked intersection is less than a specified angle, the third information may be set for the first road section, during subsequent navigation, prompt information may be output in a timely manner according to the third information, to prompt the driver, so as to prevent the driver from driving into an incorrect road section.

Optionally, the server may set the third information associated with the first road section in the following manner: adding the third information to the first road section on the electronic map, that is, adding the third information to the electronic map data, and associating the third information with the first road section, so that the third information is stored as a part of the electronic map data. In this way, the second information associated with the first road section may be updated when the electronic map is updated. The server may also add the first road section to a list of road sections with multi-forked intersections, where the list of road sections with multi-forked intersections is used to store a road section that has a forked intersection and that corresponds to the forked intersection and that has an included angle less than a specified angle. The list of road sections with multi-forked intersections may be stored independently of the electronic map data, so that a coupling degree with the electronic map data can be reduced, and the list can be updated or pushed to a terminal independently of the electronic map data. Further, the list of road sections with multi-forked intersections may be stored in the server, or may be sent by the server to a terminal having a navigation function.

It can be learned from the process shown in FIG. 2 that, in this embodiment of this application, manual active reporting is not involved, and controllability is ensured. In addition, no additional sensor needs to be installed, and big data analysis is performed based on a difference between a planned navigation path and an actual traveling path of a vehicle, so that a possible error in an electronic map can be detected in a timely manner, and correction can be performed.

In addition to problems such as whether an electronic map is incorrect, whether a road has a requirement on a vehicle model, and whether a road condition affects driving experience, drivers are generally concerned about problems related to tickets, that is, road sections are prone to traffic violations and how to prevent these violations. Ticket information is especially important for newcomers and drivers who are driving in unfamiliar environments.

In some embodiments of this application, the server may collect statistics on and mark road sections that are prone to traffic violations, to provide a prompt about these road sections in a navigation process, or provide a basis for navigation path planning, so as to avoid or reduce a traffic violation of a driver.

The server may execute, based on a specified period, a process of collecting statistics on tickets of a road section. Alternatively, the server may execute the process based on event triggering. For example, the server may execute the process after obtaining, from a traffic management platform, ticket information generated in a time period.

Figure 6:
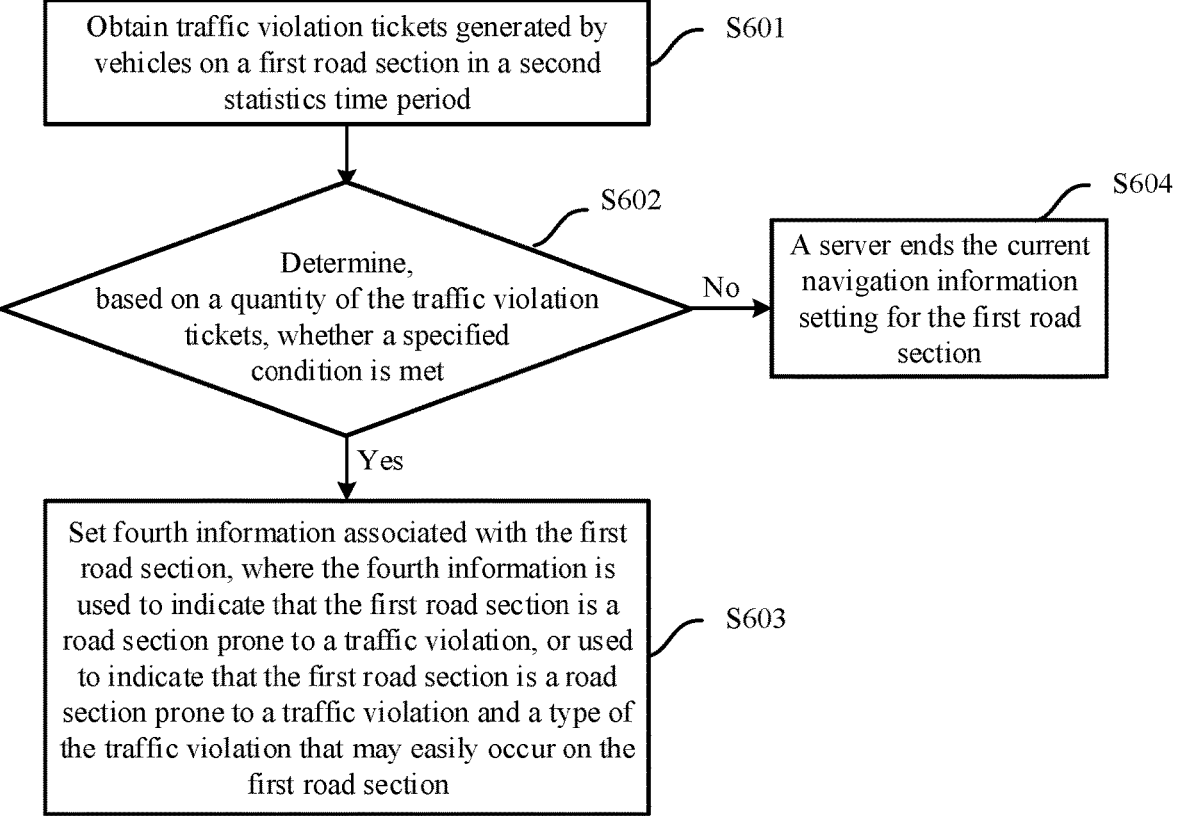
FIG. 6 is a schematic diagram of a navigation information setting procedure according to an embodiment of this application.

FIG. 6 is a navigation information setting procedure according to an embodiment of this application. As shown in the figure, the procedure may include the following steps.

S601: A server obtains traffic violation tickets generated by vehicles on a first road section in a second statistics time period.

The meaning of the second statistics time period may also be different, depending on a manner of triggering the procedure by the server. For example, if the server executes the procedure based only on periodic triggering, the second statistics time period may be a time period of a latest period, or may be a sub-time period in a latest period, for example, a latest sub-time period in the period. For another example, if the server triggers execution of the procedure based only on an event, the second statistics time period may be a time period corresponding to the obtained traffic violation tickets.

S602: If it is determined, based on a quantity of the traffic violation tickets, that a specified condition is met, go to S603; or if the specified condition is not met, go to S604.

In this step, in the following cases, the server may determine that the first road section meets the specified condition:

Case 1: If a quantity of the traffic violation tickets generated by the vehicles on the first road section in the second statistics time period is greater than a fifth threshold, it is determined that the specified condition is met.

Case 2: If the first road section is ranked in the first N specified places (N is an integer greater than or equal to 1) after the road sections are sorted in descending order of quantities of traffic violation tickets generated by the vehicles in the statistics time period, it is determined that the specified condition is met. A value of N may be preset, and the value of N may be set based on experience or statistics.

S603: The server sets fourth information associated with the first road section, where the fourth information is used to indicate that the first road section is a road section prone to a traffic violation, or used to indicate that the first road section is a road section prone to a traffic violation and a type of the traffic violation that may easily occur on the first road section.

In this step, the server may identify data of tickets, determine types of traffic violations (for example, running a red light, illegal lane change, illegal U-turn, or illegal parking), collect statistics on a quantity of occurrences of each type of traffic violation, and may further collect statistics on related information such as a time when the traffic violation occurs.

Optionally, the server may set the fourth information associated with the first road section in the following manner: adding the fourth information to the first road section on the electronic map, that is, adding the fourth information to the electronic map data, and associating the fourth information with the first road section, so that the fourth information is stored as a part of the electronic map data. In this way, the third information associated with the first road section may be updated when the electronic map is updated. In some other embodiments, the server adds the first road section to a list of road sections with frequent traffic violations, where the list of road sections with frequent traffic violations includes a road section prone to a traffic violation, and further includes a corresponding traffic violation type. The list of road sections with frequent traffic violations may be stored independently from the electronic map data. The list of road sections with frequent traffic violations may be stored independently of the electronic map data, so that a coupling degree with the electronic map data can be reduced, and the list can be updated or pushed to a terminal independently of the electronic map data. Further, the list of road sections with frequent traffic violations may be stored in the server, or may be sent by the server to a terminal having a navigation function.

S604: The server ends the current navigation information setting for the first road section.

According to the process shown in FIG. 6, after the fourth information associated with the first road section is set, the fourth information may be used as one of the bases for navigation planning in subsequent navigation path planning, so that traffic violations of drivers can be reduced, or a road section with frequent traffic violations can be avoided to improve driving safety, thereby improving effectiveness of navigation planning. The fourth information associated with the first road section may be further used as prompt information to be output in a vehicle driving process, so as to prompt the driver to pay attention, thereby improving user experience.

The process shown in FIG. 6 may be independently performed, or may be in combination with the process shown in FIG. 2. This is not limited in this embodiment of this application.

Figure 7:
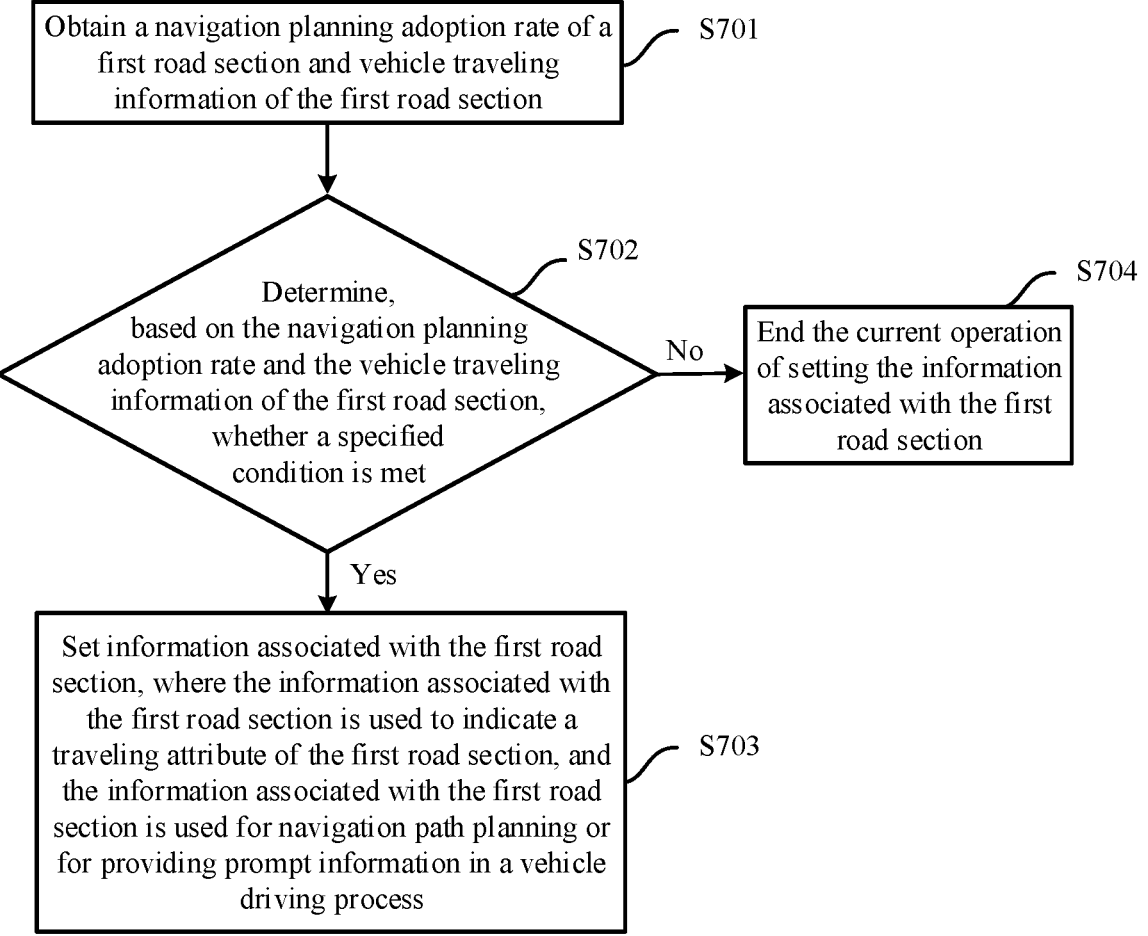
FIG. 7 is a schematic flowchart of another navigation information setting method according to an embodiment of this application.

Refer to FIG. 7. An embodiment of this application further provides a procedure of a navigation information setting method. As shown in the figure, the procedure may include the following steps.

S701: A server obtains a navigation planning adoption rate of a first road section and vehicle traveling information of the first road section.

S702: The server determines, based on the navigation planning adoption rate of the first road section and the vehicle traveling information of the first road section, whether a specified condition (that is, a condition for setting information associated with the first road section) is met. If the specified condition is met, go to S703; or if the specified condition is not met, go to S704.

S703: The server sets information associated with the first road section, where the information associated with the first road section is used to indicate a traveling attribute of the first road section. The information associated with the first road section is also referred to as navigation information, and is used for navigation path planning or for providing prompt information in a vehicle driving process.

S704: The server ends the current operation of setting information associated with the first road section.

Optionally, the information associated with the first road section includes at least one of the following:

first information, used to indicate that a traveling direction allowed by the first road section is uncertain;

second information, used to indicate a vehicle model feature of vehicles that are suitable for traveling and/or not suitable for traveling on the first road section; and third information, used to indicate that the first road section has a forked intersection that may be easily entered by mistake.

For a method for setting the information associated with the first road section, refer to related descriptions in the process shown in FIG. 2. Details are not described herein again.

Further, the information associated with the first road section further includes: fourth information, used to indicate that the first road section is a road section prone to a traffic violation, or used to indicate that the first road section is a road section prone to a traffic violation and a type of the traffic violation that may easily occur on the first road section. For a method for setting the fourth information associated with the first road section, refer to the process shown in FIG. 6. Details are not described herein again.

In this embodiment of this application, after the terminal determines a planned navigation path in response to a navigation request of a vehicle, if the vehicle does not travel in accordance with the planned navigation path, for example, travels into a road section that is not a planned road section, the terminal sends a notification to the server (for example, a cloud computing center), to inform the server that the vehicle does not travel into the navigation planning road section. The cloud computing center may collect statistics on a navigation planning adoption rate of each road section according to the notification sent by the terminal.

The navigation planning adoption rate of a road section is used to represent a relationship between a quantity of times (referred to as a first quantity of times) that the road section is selected as a navigation planning road section in a statistics time period and a quantity of times (referred to as a second quantity of times) that a vehicle travels into or does not travel into the road section in accordance with the navigation planning.

Figure 8:
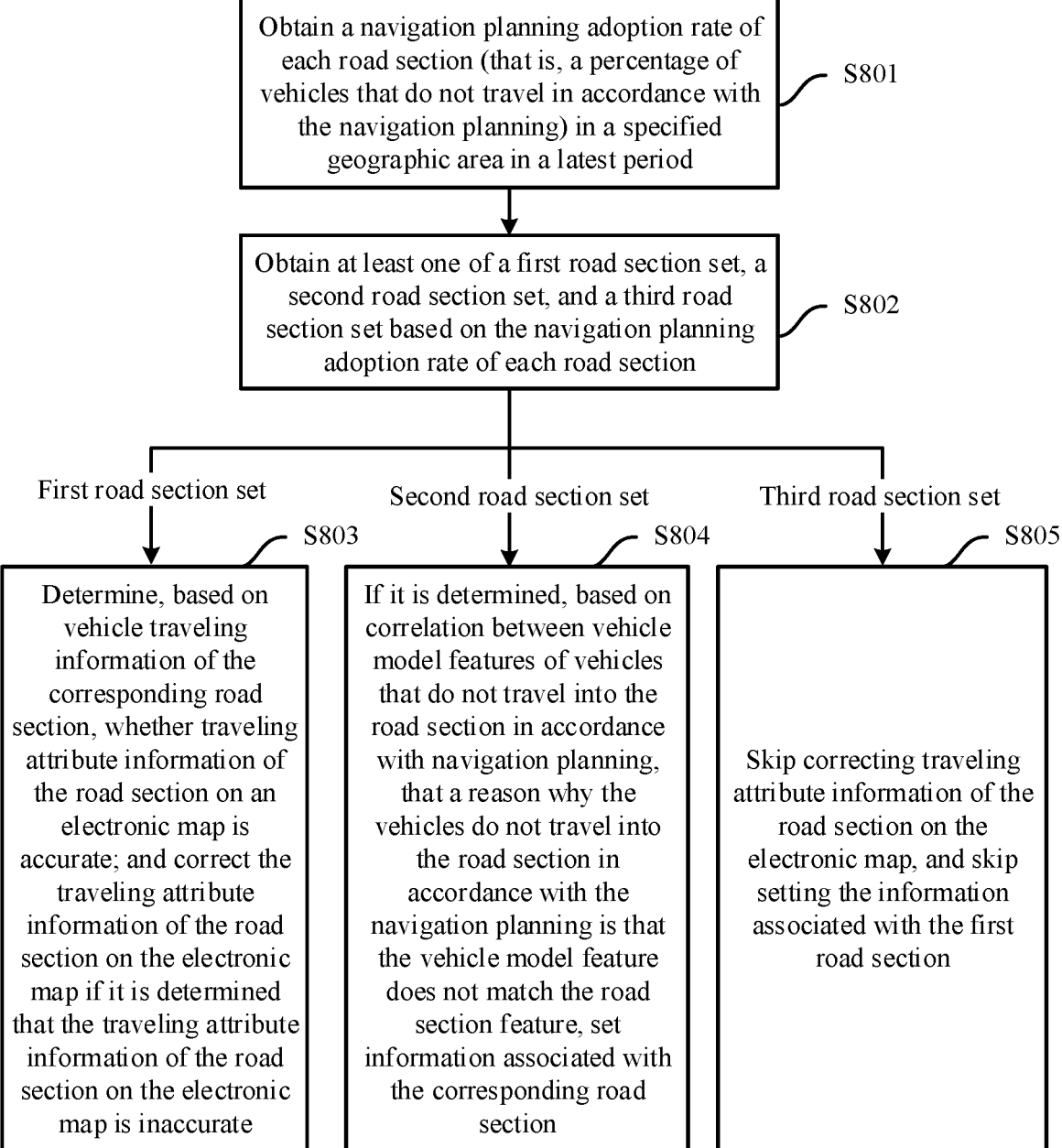
FIG. 8 is a schematic flowchart of electronic map correction based on periodic triggering according to an embodiment of this application.

The following uses a periodic triggering manner as an example to describe a method provided in an embodiment of this application based on the process shown in FIG. 8. A navigation planning adoption rate of a road section is used to represent a ratio of a second quantity of times that the vehicle does not travel into the road section in accordance with the navigation planning to a first quantity of times that the road section is selected as the navigation planning road section in a statistics period (that is, an electronic map correction period).

Refer to FIG. 8. According to a set electronic map correction period, when the electronic map correction time arrives, the following steps are performed:

S801: A server obtains a navigation planning adoption rate of each road section (that is, a percentage of vehicles that do not travel in accordance with navigation planning) in a specified geographic area in a latest period.

S802: The server obtains at least one of a first road section set, a second road section set, and a third road section set based on the navigation planning adoption rate of each road section (that is, the ratio of vehicles that do not travel in accordance with the navigation planning), and correspondingly proceeds to at least one of steps S803, S804, and S805. Specifically, for the first road section set, the procedure proceeds to S803 for further processing; for the second road section set, the procedure proceeds to S804 for further processing; and for the third road section set, the procedure proceeds to S805.

Road sections in the first road section set, the second road section set, and the third road section set are selected as road sections in the planned navigation path at least once in the latest period. For each road section in the first road section set, the navigation planning adoption rate (that is, the ratio of vehicles that do not travel in accordance with the navigation planning) is greater than a first threshold (for example, 80%); for each road section in the second road section set, the navigation planning adoption rate (that is, the ratio of vehicles that do not travel in accordance with the navigation planning) is less than or equal to the first threshold and is greater than or equal to a second threshold (for example, between 10% and 80%); and for each road section in the third road section set, the navigation planning adoption rate (that is, the ratio of vehicles that do not travel in accordance with the navigation planning) is less than the second threshold (for example, 10%).

S803: For each road section in the first road section set, the server determines, based on vehicle traveling information of the corresponding road section, whether traveling attribute information of the road section on the electronic map is accurate; and corrects the traveling attribute information of the road section on the electronic map if it is determined that the traveling attribute information of the road section on the electronic map is inaccurate.

Because the ratio of vehicles that do not travel in accordance with the navigation planning on the road sections in the first road section set is very high, it indicates that there is a relatively high probability that the road sections in the road section set cannot pass. Therefore, the server may determine, based on vehicle traveling information of the road sections, whether the road sections are non-travelable or whether a traveling direction is incorrect, to correct the traveling attribute information of the road sections on the electronic map. For specific implementation of S803, refer to FIG. 6.

S804: For each road section in the second road section set, if the server determines, based on correlation between vehicle model features of vehicles that do not travel into the road section in accordance with the navigation planning, that a reason why the vehicles do not travel into the road section in accordance with the navigation planning is that the vehicle model feature does not match the road section feature, the server sets information associated with the corresponding road section to provide one of the bases for navigation path planning or provide a prompt about a vehicle model feature that matches the road section in a vehicle driving process.

For each road section in the second road section set, the navigation planning adoption rate (that is, the ratio of vehicles that do not travel in accordance with the navigation planning) is lower than that of the first road section set, indicating that each road section in the second road section set is travelable. However, the navigation planning adoption rate is higher than that of each road section in the third road section set, indicating that although each road section in the second road section set is travelable. Due to factors such as vehicle models and driving habits of drivers, the percentage of vehicles that do not travel in accordance with the navigation planning may be relatively high. Therefore, the server may determine, based on the feature information of each vehicle traveling on the road section, the road section feature information, and the like, the reason why the vehicle does not travel into the planned road section, and set corresponding association information according to the determined reason, so as to provide a prompt when the vehicle travels or uses the association information as one of the bases for navigation path planning, or learn a driving feature of a driver according to the determined reason, so that the driving feature information of the driver is used as one of the bases for navigation path planning during subsequent navigation path planning. For specific implementation of S804, refer to FIG. 7.

S805: For each road section in the third road section set, because the ratio of vehicles that do not travel in accordance with the navigation planning is relatively low, that is, planned paths of only a few vehicles are inconsistent with actual paths, it indicates that there is basically no problem in the traveling attribute information of the road section on the electronic map. Therefore, the server may not correct the traveling attribute information of the road section on the electronic map, and does not set information associated with the first road section.

It should be noted that the execution time sequence of the steps in the foregoing procedure is merely an example. An execution time sequence of the foregoing steps is not limited in this embodiment of this application. For example, S803 to S804 may also be performed in parallel.

Figure 9:
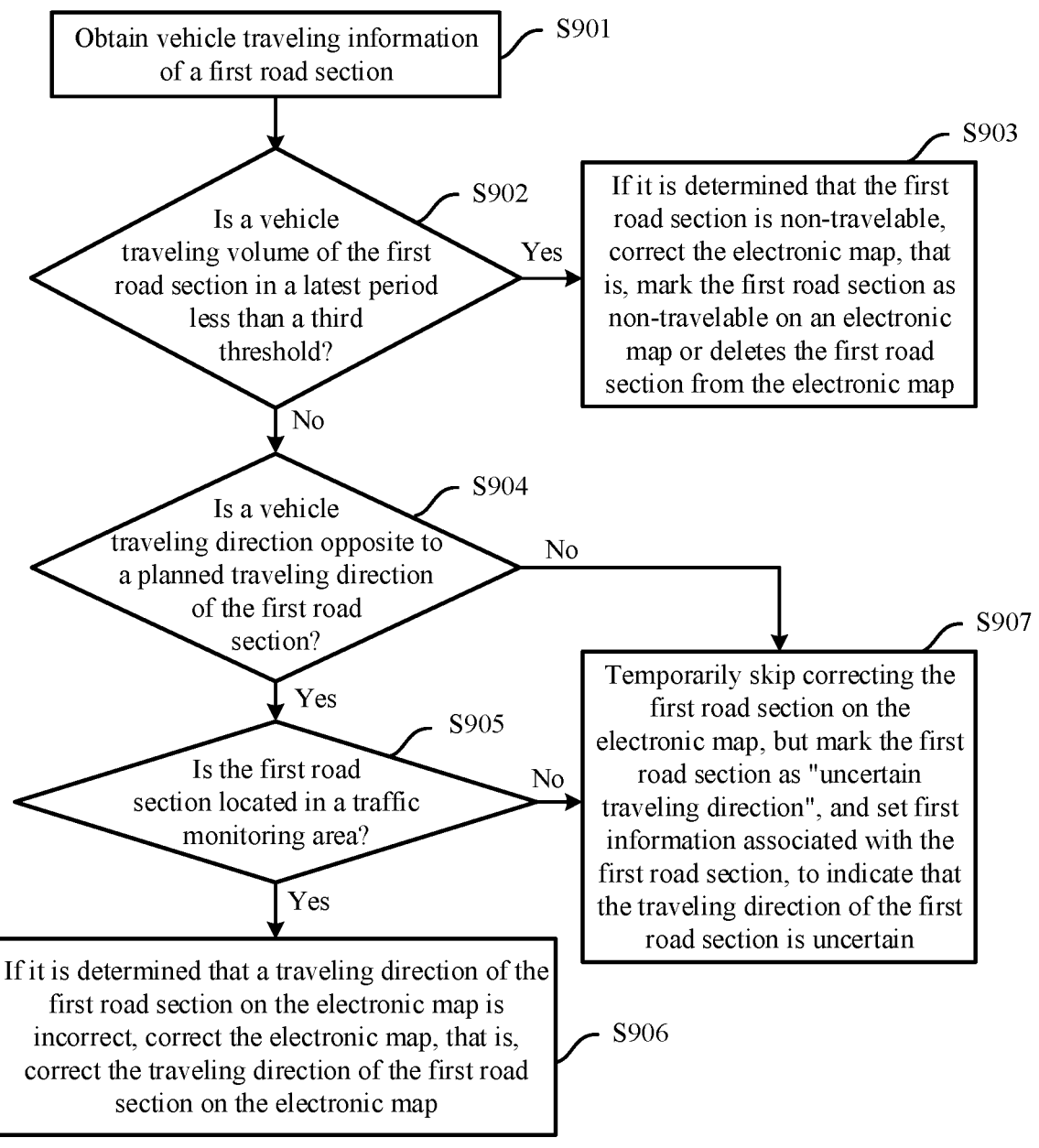
FIG. 9 is a schematic flowchart of a server processing operation when a percentage of the vehicles that do not travel in accordance with navigation planning is greater than a first threshold in FIG. 8.

Refer to FIG. 9. A first road section is used as an example to describe a processing operation of a server when a navigation planning adoption rate of vehicles (that is, a percentage of vehicles that do not travel in accordance with navigation planning) is greater than a first threshold (for example, 80%). The process shown in FIG. 9 corresponds to S803 in FIG. 8.

As shown in FIG. 9, the processing operation may include the following steps.

S901: A server obtains vehicle traveling information of a first road section.

The vehicle traveling information of the first road section includes a vehicle traveling volume and a vehicle traveling direction of the first road section in a latest period.

S902: The server determines, based on the vehicle traveling information of the first road section, whether a vehicle traveling volume of the first road section in a latest period is less than a third threshold. If the vehicle traveling volume is less than the third threshold, go to S903; or if the vehicle traveling volume is not less than the third threshold, go to S904.

When the vehicle traveling volume of the first road section is less than the third threshold, it indicates that planned navigation paths of almost all vehicles on the first road section are inconsistent with actual paths, and it may be considered that the first road section is non-travelable; or when the vehicle traveling volume of the first road section is not less than the third threshold, it may be considered that the first road section is travelable.

S903: The server determines that the first road section is non-travelable, and corrects the electronic map, that is, marks the first road section as non-travelable on the electronic map or deletes the first road section from the electronic map, so as to prevent a subsequent navigation system from selecting the road section as a planned road section.

S904: The server determines, based on the vehicle traveling information of the first road section, whether a vehicle traveling direction is opposite to the planned traveling direction of the first road section. If the vehicle traveling direction is opposite to the planned traveling direction of the first road section, go to S905; or if the vehicle traveling direction is not opposite to the planned traveling direction of the first road section, go to S907.

S905: The server determines whether the first road section is located in a traffic monitoring area. If the first road section is located in a traffic monitoring area, go to S906; or if the first road section is not located in a traffic monitoring area, go to S907.

S906: The server determines that a traveling direction of the first road section on the electronic map is incorrect, and corrects the electronic map, that is, corrects the traveling direction of the first road section on the electronic map. For example, the traveling direction of the first road section on the electronic map may be corrected to a traveling direction of a relatively high percentage of vehicles in the vehicles traveling on the first road section.

S907: The server cannot determine whether the traveling direction of the first road section on the electronic map needs to be corrected. Therefore, the server may not correct the first road section on the electronic map temporarily, but mark the first road section as "uncertain traveling direction", and may set first information associated with the first road section, to indicate that the traveling direction of the first road section is uncertain.

For a specific implementation method of the process shown in FIG. 9, refer to related descriptions in the foregoing embodiments.

Figure 10:
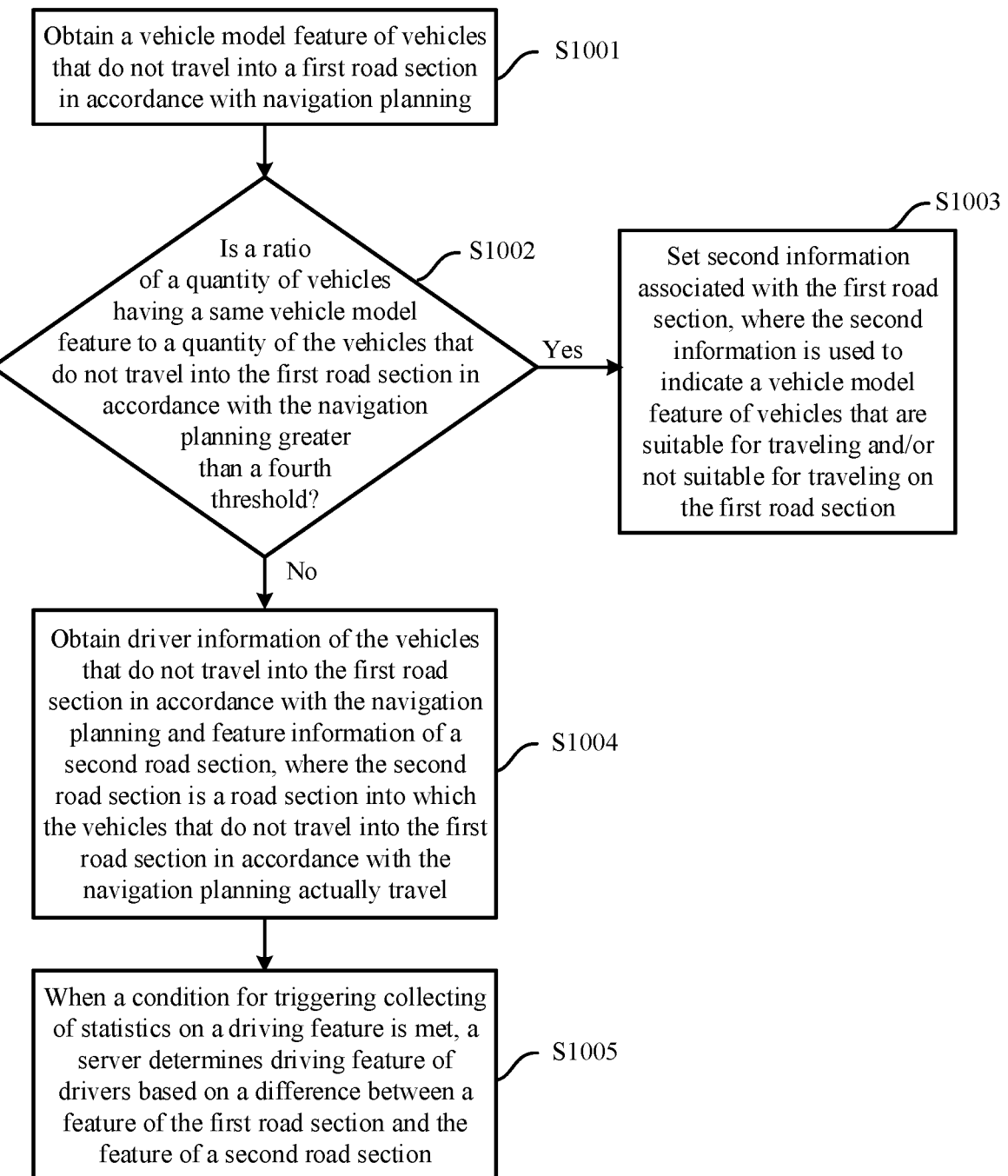
FIG. 10 is a schematic flowchart of a server processing operation when a percentage of the vehicles that do not travel in accordance with navigation planning is less than or equal to a first threshold and is greater than or equal to a second threshold in FIG. 8.

Refer to FIG. 10. A first road section is used as an example to describe a processing operation of a server when a navigation planning adoption rate of vehicles (that is, a percentage of vehicles that do not travel in accordance with navigation planning) is less than or equal to a first threshold (for example, 80%) and is greater than or equal to a second threshold (for example, 10%). The process shown in FIG. 10 corresponds to S804 in FIG. 8.

As shown in FIG. 10, the processing operation may include the following steps.

S1001: The server obtains a vehicle model feature of vehicles that do not travel into a first road section in accordance with navigation planning.

S1002: The server determines whether a ratio of vehicles having a same vehicle model feature in the vehicles that do not travel into the first road section in accordance with the navigation planning is greater than a fourth threshold. If the ratio is greater than the fourth threshold, go to S1003; or if the ratio is not greater than the fourth threshold, go to S1004.

S1003: The server sets second information associated with the first road section, where the second information is used to indicate a vehicle model feature of vehicles that are suitable for traveling and/or not suitable for traveling on the first road section.

S1004: The server obtains driver information of the vehicles that do not travel into the first road section in accordance with the navigation planning and feature information of a second road section. The second road section is a road section into which that the vehicles actually travel when the vehicles do not travel into the first road section in accordance with the navigation planning.

S1005: When a condition for triggering collecting of statistics on a driving feature is met, the server determines the driving feature of drivers based on a difference between a feature of the first road section and a feature of the second road section.

For a specific implementation method of the process shown in FIG. 10, refer to related descriptions in the foregoing embodiments.

An embodiment of this application further provides a navigation method that may be applied to a terminal having a navigation function.

FIG. 11 is a schematic flowchart of a navigation method according to an embodiment of this application. The procedure may be applied to a terminal having a navigation function. As shown in the figure, the procedure may include the following steps.

S1101: The terminal determines at least one candidate planned navigation path according to a departure place and a destination.

The terminal may determine, in response to a vehicle navigation request, the at least one candidate planned navigation path according to a departure place and a destination.

S1102: The terminal selects an optimal path from the at least one candidate planned navigation path as a planned navigation path according to navigation assistance information.

The navigation assistance information includes at least one of information associated with a road section in the at least one candidate planned navigation path and driving feature information of a driver.

If the candidate planned navigation path includes the first road section, the navigation assistance information may include information associated with the first road section. Specifically, the information associated with the first road section may include at least one of the following:

first information, used to indicate that a traveling direction allowed by the first road section is uncertain;

second information, used to indicate a vehicle model feature of vehicles that are suitable for traveling and/or not suitable for traveling on the first road section;

third information, used to indicate that the first road section has a forked intersection that may be easily entered by mistake; and fourth information, used to indicate that the first road section is a road section prone to a traffic violation, or used to indicate that the first road section is a road section prone to a traffic violation and a type of the traffic violation that may easily occur on the first road section.

For a method for setting the information associated with the first road section, refer to the foregoing embodiments. Details are not described herein again.

Further, the procedure may further include the following step:

S1103: The terminal displays the planned navigation path on an electronic map interface.

Generally, when selecting the optimal path, three modes may be considered: the shortest path, the shortest time, and the lowest costs (generally referred to as the traveling costs). In this embodiment of this application, the optimal path may be selected based on one of or a combination of more than one of the foregoing three modes. On this basis, the optimal path may be further selected with reference to the navigation assistance information, so that the selected optimal path can better match a driving feature of a driver, or better match a feature of a road section, thereby improving user experience.

It should be noted that the server may also perform navigation path planning in the foregoing manner, and may inform the terminal of the planned navigation planning path.

In some embodiments of this application, after the planned navigation path is obtained, when the vehicle does not travel in accordance with the planned navigation path, for example, the planned navigation path includes the first road section, and the vehicle travels into the second road section rather than the first road section, the terminal may send a notification to the server, where the notification may carry indication information used to indicate that the vehicle does not travel into the first road section in accordance with the navigation planning, so that the server can determine, based on the notification, whether traveling attribute information of the first road section on the electronic map is accurate, and correct the electronic map when it is determined that the traveling attribute information of the first road section is inaccurate.

Further, the notification may further carry second indication information used to indicate the second road section, and the second road section may be determined by the terminal based on a location reported by the vehicle. The server may learn the driving feature information of the driver based on a difference between the feature of the first road section and the feature of the second road section. In another embodiment, the second indication information may not be carried in the notification, but is sent to the server by using another message. This is not limited in this embodiment of this application.

Figure 12:
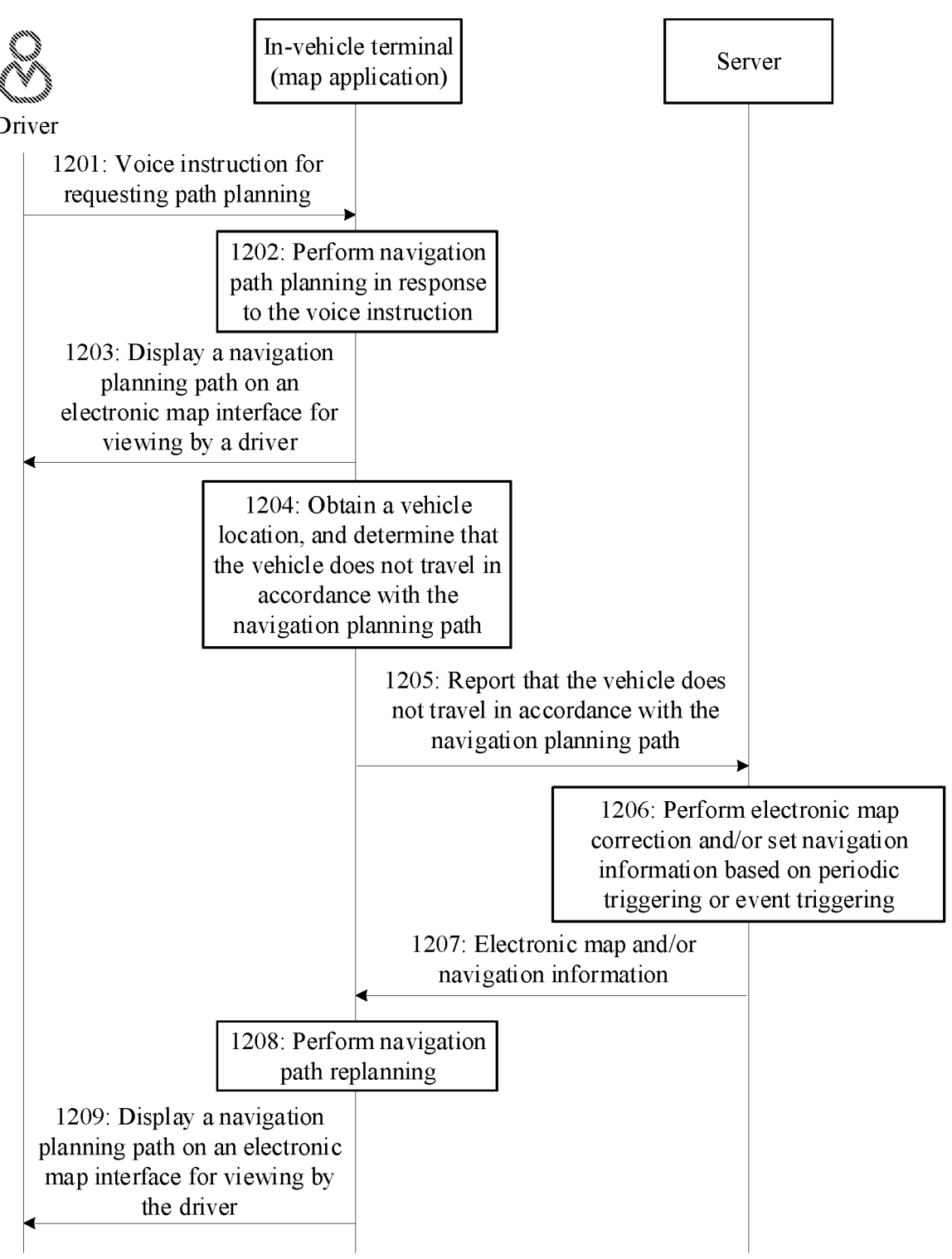
FIG. 12 is a schematic diagram of signaling interaction between an in-vehicle terminal having a map application and a server in an application scenario according to an embodiment of this application.

FIG. 12 is an example of a schematic diagram of signaling interaction between an in-vehicle terminal having a map application and a server in an application scenario. As shown in the figure:

In 1201, a driver requests, by using a voice instruction, the in-vehicle terminal to perform navigation path planning. The voice instruction includes destination information.

In 1202, the in-vehicle terminal performs navigation path planning in response to the voice instruction. A navigation path planning method may be shown in FIG. 11.

In 1203, the in-vehicle terminal displays a navigation path on an electronic map interface on a screen of the in-vehicle terminal for viewing by a driver.

In 1204, the in-vehicle terminal may obtain a location of a vehicle in real time. If the vehicle does not travel in accordance with a navigation path, the in-vehicle terminal may discover, according to the vehicle location, that the vehicle does not travel in accordance with the navigation path in a timely manner. For example, according to the navigation path, the vehicle should travel into the first road section, but the vehicle actually travels into the second road section.

In 1205, the in-vehicle terminal sends a notification to the server, to inform the server that the vehicle does not travel into the first road section in accordance with the navigation path.

In 1206, the server performs electronic map correction or sets navigation information, or performs electronic map correction and sets navigation information based on periodic triggering or event triggering. The navigation information includes information associated with the first road section.

In 1207, the server sends the updated electronic map and/or the set navigation information to the in-vehicle terminal.

In 1208, the in-vehicle terminal may perform navigation path replanning according to the received updated electronic map and/or the set navigation information.

In 1209, the in-vehicle terminal displays a replanned navigation path on the electronic map interface on the screen of the in-vehicle terminal for viewing by the driver.

For a method for correcting the electronic map, refer to the process shown in FIG. 2. For a method for setting the navigation information, refer to the process shown in FIG. 6 or FIG. 7.

In some embodiments of this application, after obtaining the planned navigation path, the terminal may obtain the information associated with the first road section in response to that the first road section in the planned navigation path enters a specified range of the vehicle traveling direction in a process in which the vehicle travels in accordance with the planned navigation path, and output the information associated with the first road section. In some other embodiments, after traveling into the first road section in accordance with the planned navigation path, the vehicle may obtain the information associated with the first road section, and output the information associated with the first road section. In some other embodiments, the terminal may further obtain the information associated with the first road section and output the information associated with the first road section in the foregoing two cases.

The specified range may be a specified distance, for example, 200 meters. Correspondingly, in some embodiments, if the terminal determines, based on a vehicle traveling direction, a vehicle location (a road section on which the vehicle is located), a vehicle speed, and the like, that a distance from an intersection of the first road section in the planned navigation path is equal to or less than 200 meters, it indicates that the first road section has entered the specified range of the vehicle traveling direction. The specified range may alternatively be a hop count between a road section in which the vehicle is currently located and the first road section, for example, may be one hop. Correspondingly, if the terminal determines that a next-hop road section of the road section in which the vehicle is currently located is the first road section, it indicates that the first road section has entered the specified range of the traveling direction of the vehicle.

Optionally, the terminal may output the information associated with the first road section in the following manner: outputting the information associated with the first road section by using a voice; or displaying the information associated with the first road section on the electronic map interface; or outputting the information associated with the first road section by using a voice, and displaying the information associated with the first road section on the electronic map interface.

Optionally, the terminal may obtain the information associated with the first road section in the following manner:

Manner 1: The terminal obtains the information associated with the first road section on the electronic map.

Manner 2: The terminal queries at least one of the list of road sections with to-be-determined traveling directions, the list of road sections corresponding to the first vehicle model feature, the list of road sections with multi-forked intersections, and the list of road sections with frequent traffic violations, to obtain the information associated with the first road section, where each of the foregoing lists is stored in the terminal.

Manner 3: The terminal sends, to the server, a query request used to obtain the information associated with the first road section, and receives a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

Optionally, the information associated with the first road section may include at least one of the following:

first information, used to indicate that a traveling direction allowed by the first road section is uncertain;

second information, used to indicate a vehicle model feature of vehicles that are suitable for traveling and/or not suitable for traveling on the first road section;

third information, used to indicate that the first road section has a forked intersection that may be easily entered by mistake; and fourth information, used to indicate that the first road section is a road section prone to a traffic violation, or used to indicate that the first road section is a road section prone to a traffic violation and a type of the traffic violation that may easily occur on the first road section.

In some embodiments, in response to that the first road section in the planned navigation path enters a specified range of a vehicle traveling direction in a process in which a vehicle travels in accordance with the planned navigation path, the terminal may obtain first information associated with the first road section, so as to inform, by using a voice, displaying on a map interface, or the like, a driver that a traveling direction allowed by the first road section ahead is uncertain, so as to attract attention of the driver, improve driving safety, and enable the driver to determine, based on the prompt, as early as possible, whether to drive into the first road section.

Figure 13A:
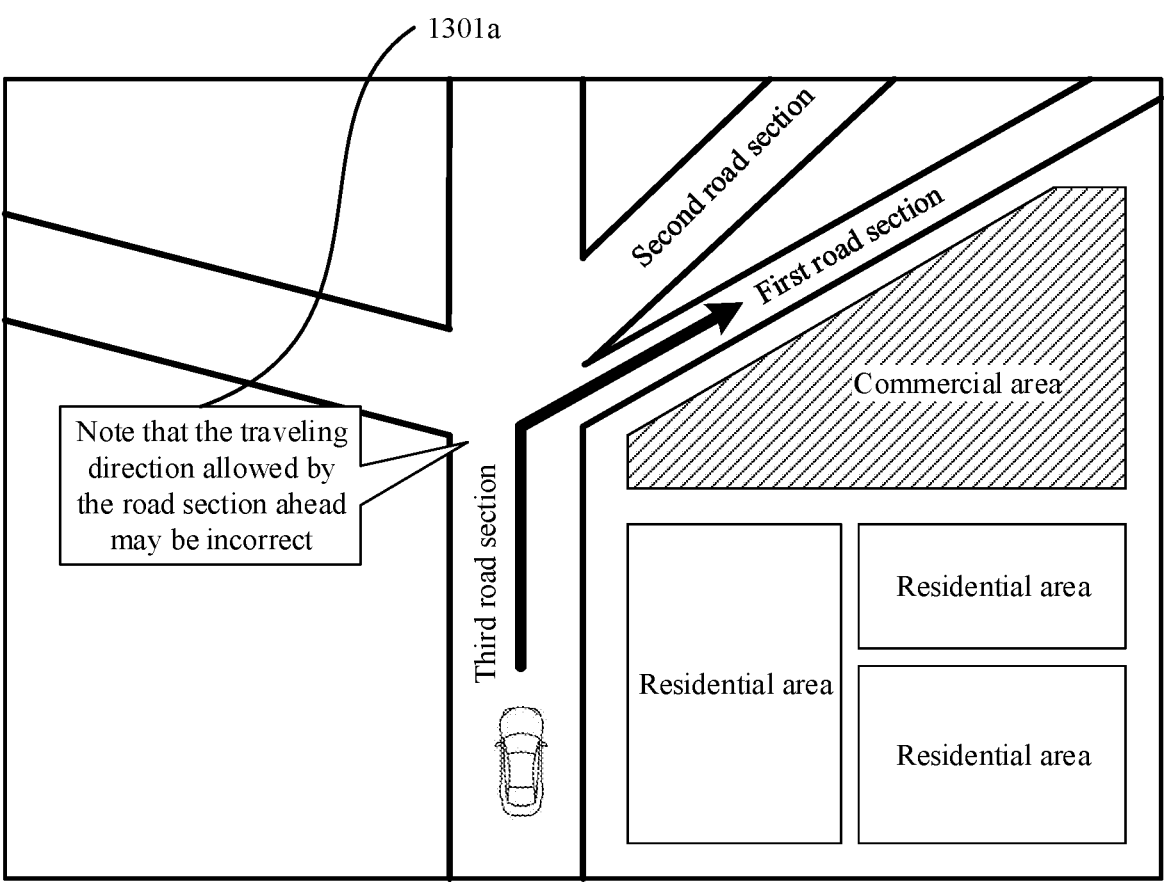
FIG. 13a, FIG. 13b, FIG. 13c, and FIG. 13d are respectively schematic diagrams of outputting navigation prompt information according to embodiments of this application.

FIG. 13*a* shows an example of content displayed on an electronic map interface and information content prompted by using a voice when a first road section in a planned navigation path enters a specified range of a vehicle traveling direction. As shown in the figure, the planned navigation path is from a third road section to the first road section, a vehicle currently travels on the third road section in accordance with the planned navigation path, and a current location of the vehicle is 200 meters away from an intersection of the first road section. In this case, the first road section enters a specified range of a traveling direction of the vehicle. Therefore, the terminal obtains first information associated with the first road section. The first information indicates that the traveling direction allowed by the first road section is uncertain. Therefore, the terminal provides, by using a voice, the driver with a prompt "note that the traveling direction allowed by the road section ahead may be incorrect". The prompt information may also be displayed on an electronic map interface (as shown in a prompt information box 1301a in the figure).

In some embodiments, in response to that the first road section in the planned navigation path enters a specified range of a vehicle traveling direction in a process in which a vehicle travels in accordance with the planned navigation path, the terminal may obtain second information associated with the first road section, so as to inform, by using a voice, displaying on a map interface, or the like, a driver of a vehicle model feature of vehicles that are suitable for traveling and/or not suitable for traveling on the first road section, so that the driver can select, based on a vehicle status, a proper road section in advance for traveling.

Figure 13B:
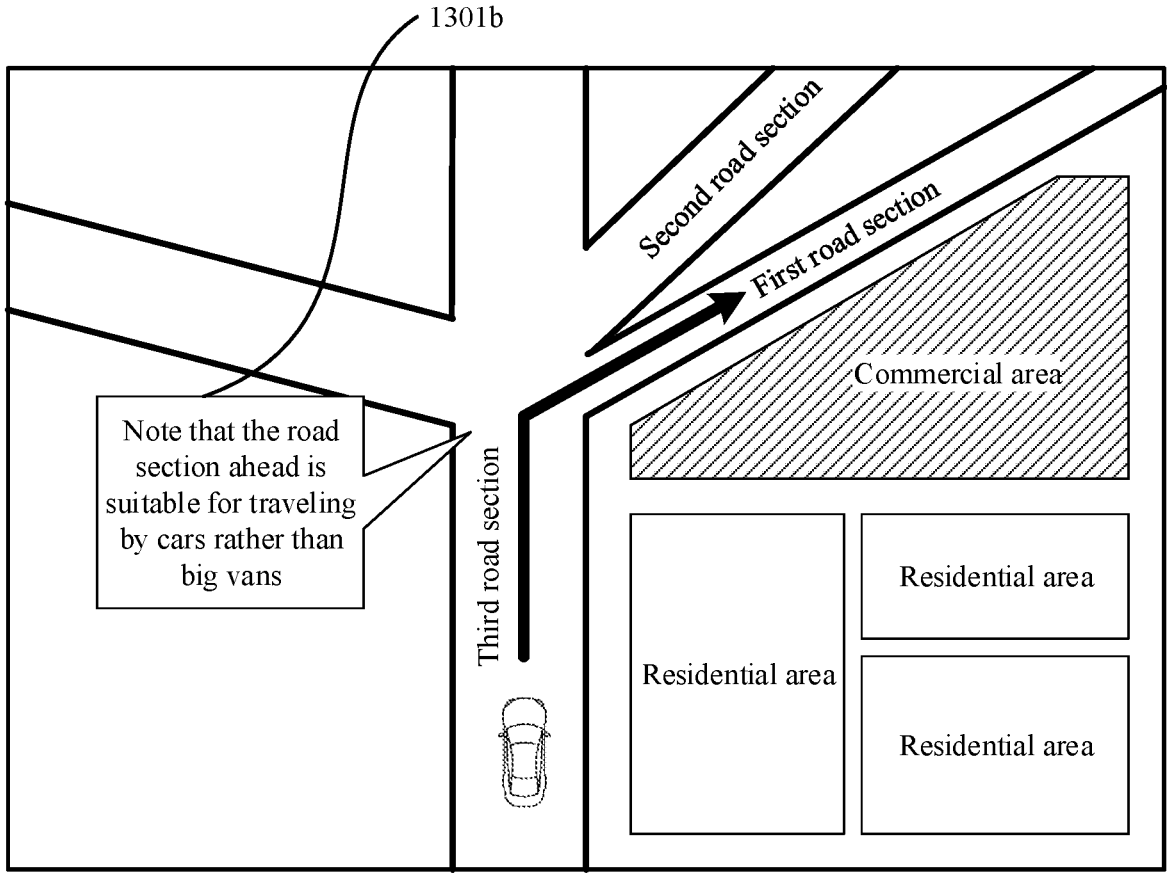

FIG. 13b shows an example of content displayed on an electronic map interface and information content prompted by using a voice when a first road section in a planned navigation path enters a specified range of a vehicle traveling direction. As shown in the figure, the planned navigation path is from a third road section to the first road section, a vehicle currently travels on the third road section in accordance with the planned navigation path, and a next road section on the planned navigation path is the first road section. Therefore, the first road section enters a specified range of a traveling direction of the vehicle, and the terminal obtains second information associated with the first road section. The second information indicates that the first road section is suitable for traveling by cars but not suitable for traveling by big vans. Therefore, the terminal provides, by using a voice, the driver with a prompt "note that the road section ahead is suitable for traveling by cars but not suitable for traveling by big vans". The prompt information may also be displayed on an electronic map interface (as shown in a prompt information box 1301b in the figure).

In some embodiments, in response to that the first road section in the planned navigation path enters a specified range of a vehicle traveling direction in a process in which a vehicle travels in accordance with the planned navigation path, the terminal may obtain third information associated with the first road section, so as to inform, by using a voice, displaying on a map interface, or the like, a driver that an intersection ahead is an intersection of a plurality of road sections, so as to prompt the driver to avoid driving into an incorrect road section.

Figure 13C:
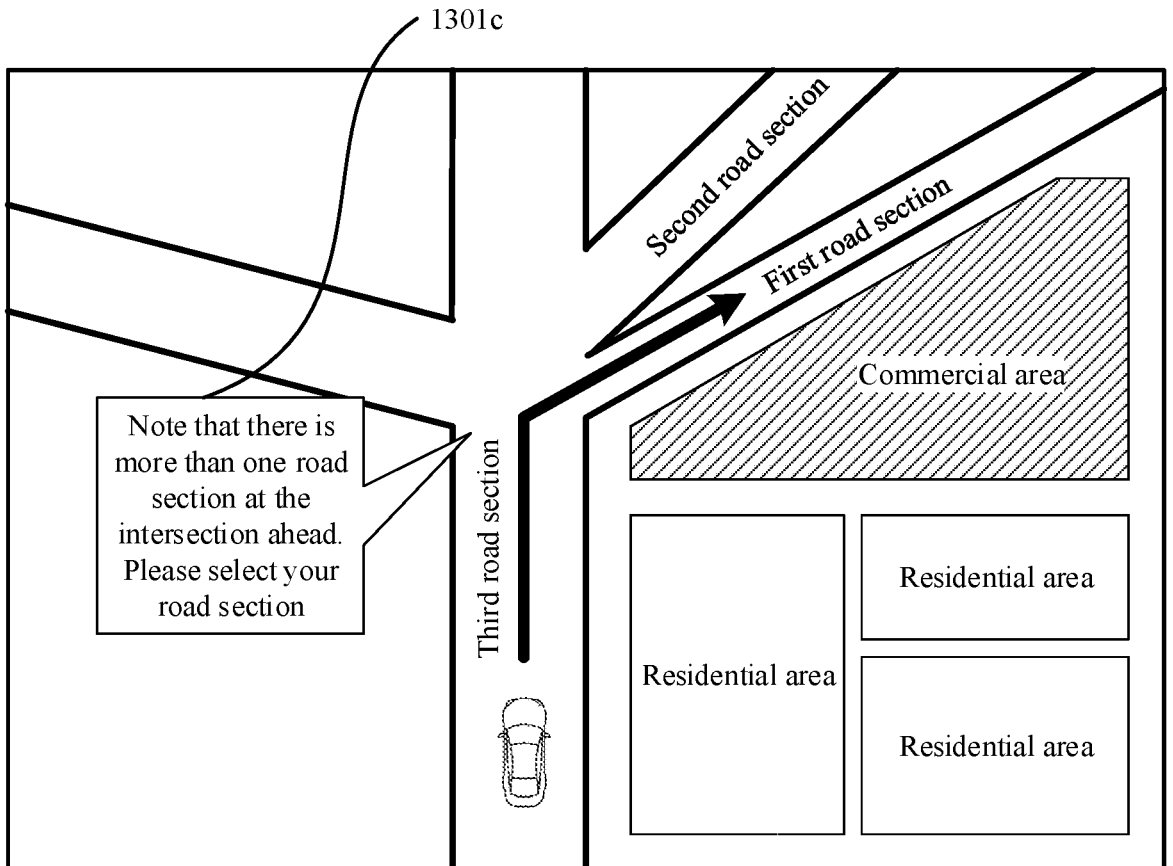

FIG. 13c shows an example of content displayed on an electronic map interface and information content prompted by using a voice when a first road section in a planned navigation path enters a specified range of a vehicle traveling direction. As shown in the figure, the planned navigation path is from a third road section to the first road section, a vehicle currently travels on the third road section in accordance with the planned navigation path, and a next road section on the planned navigation path is the first road section. Therefore, the first road section enters a specified range of a traveling direction of the vehicle, and the terminal obtains third information associated with the first road section. The third information indicates that there are a plurality of road sections at the entrance of the first road section. Therefore, the terminal provides, by using a voice, the driver with a prompt "note that there are a plurality of road sections at the intersection ahead, and select a correct road section for driving". The prompt information may also be displayed on an electronic map interface (as shown in a prompt information box 1301c in the figure).

In some embodiments, in response to that the first road section in the planned navigation path enters a specified range of a vehicle traveling direction in a process in which a vehicle travels in accordance with the planned navigation path, the terminal may obtain fourth information associated with the first road section, so as to inform, by using a voice, displaying on a map interface, or the like, the driver that an intersection ahead is an intersection of a plurality of road sections, so as to remind the driver to avoid driving into an incorrect road section.

Figure 13D:
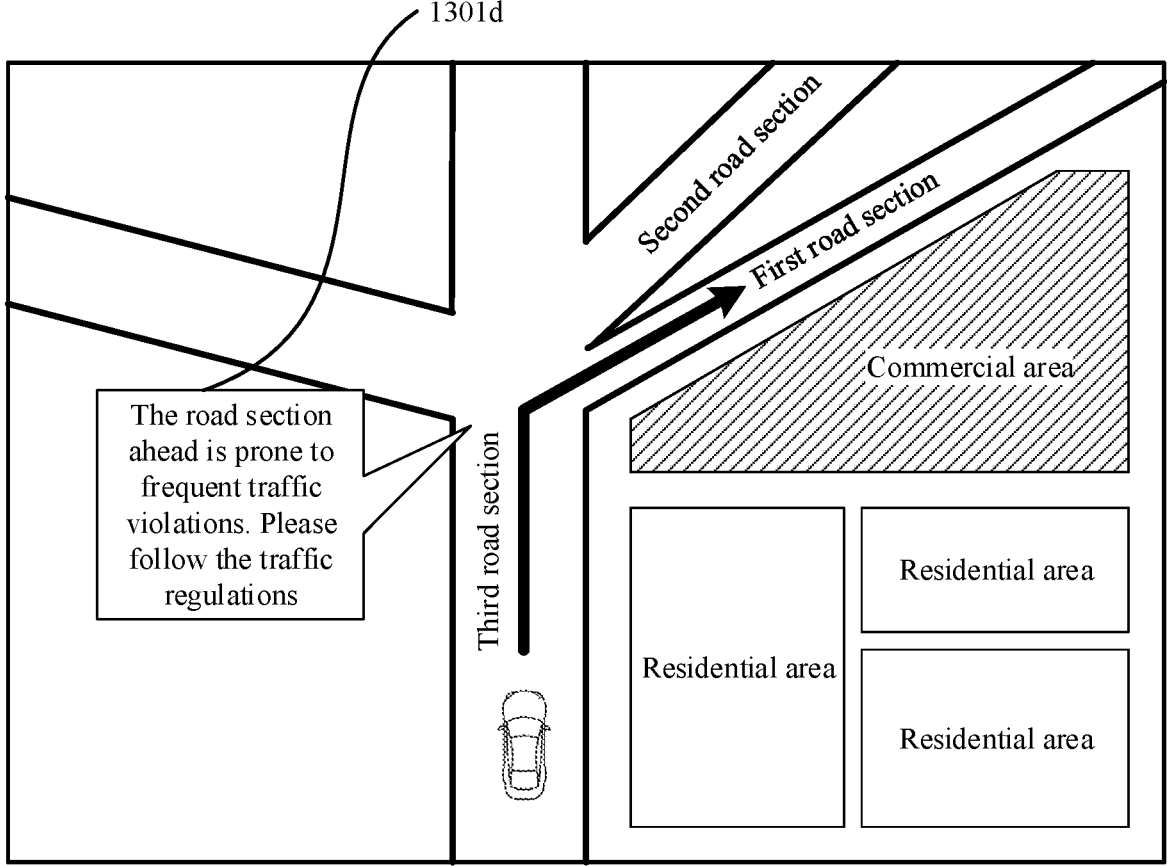

FIG. 13d shows an example of content displayed on an electronic map interface and information content prompted by using a voice when a first road section in a planned navigation path enters a specified range of a vehicle traveling direction. As shown in the figure, the planned navigation path is from a third road section to the first road section, a vehicle currently travels on the third road section in accordance with the planned navigation path, and a next road section on the planned navigation path is the first road section. Therefore, the first road section enters a specified range of a traveling direction of the vehicle, and the terminal obtains fourth information associated with the first road section. The fourth information indicates that the first road section is a road section on which a traffic violation ticket may be easily generated, and indicates that a type of a traffic violation may easily occur is a parking violation. Therefore, the terminal provides, by using a voice, the driver with a prompt "the road section ahead is a road section on which parking violation tickets are frequently generated, and please follow traffic rules". The prompt information may also be displayed on an electronic map interface (as shown in a prompt information box 1301d in the figure).

In some embodiments of this application, the terminal may provide the user with an interface for entering a navigation planning requirement, and may allow the user to enter the navigation planning requirement by using a voice or a screen operation manner. The navigation planning requirement entered by the user may be used as one piece of navigation assistance information for navigation path planning.

Specifically, the terminal may obtain, in response to a first operation of a user based on an interface for entering a navigation planning requirement, a navigation planning requirement entered by the user. The terminal may use the navigation planning requirement entered by the user as one piece of navigation assistance information, to perform navigation path planning.

The navigation planning requirement may include at least one of the following:

priority is given to the shortest path;

priority is given to the shortest time;

priority is given to the lowest traveling costs;

priority is given to matching of a vehicle model feature of the vehicle; further, the user may be allowed to input the vehicle model feature, or the terminal may obtain the vehicle model feature from a local database or a server;

priority is given to matching of a driving feature of the driver of the vehicle; further, the user may be allowed to input the driving feature of the driver (for example, a preference for driving on a wide road surface or a driving skill level is low), or the terminal may obtain the driving feature of the driver of the vehicle from a local database or a server; and priority is given to being less likely to generate traffic violation tickets.

Certainly, the foregoing several requirements may also be sorted based on a priority sequence, to form another navigation planning requirement.

For example, the navigation planning requirement is entered in a screen operation manner. FIG. 14 shows an example of an interface for entering the navigation planning requirement. As shown in the figure, the interface allows a user to select two planning requirements, and a priority of planning requirement 1 is higher than that of planning requirement 2. Planning requirement 1 can be selected from a requirement list shown in the figure. Planning requirement 2 can be selected from the planning requirement list shown in the figure.

The terminal may perform navigation path planning according to the planning requirements selected by the user. Specifically, after obtaining the N candidate planned navigation paths through planning based on a destination, the terminal may select an optimal planned navigation path from the N planned navigation paths according to the planning requirements selected by the user.

Figure 15A:
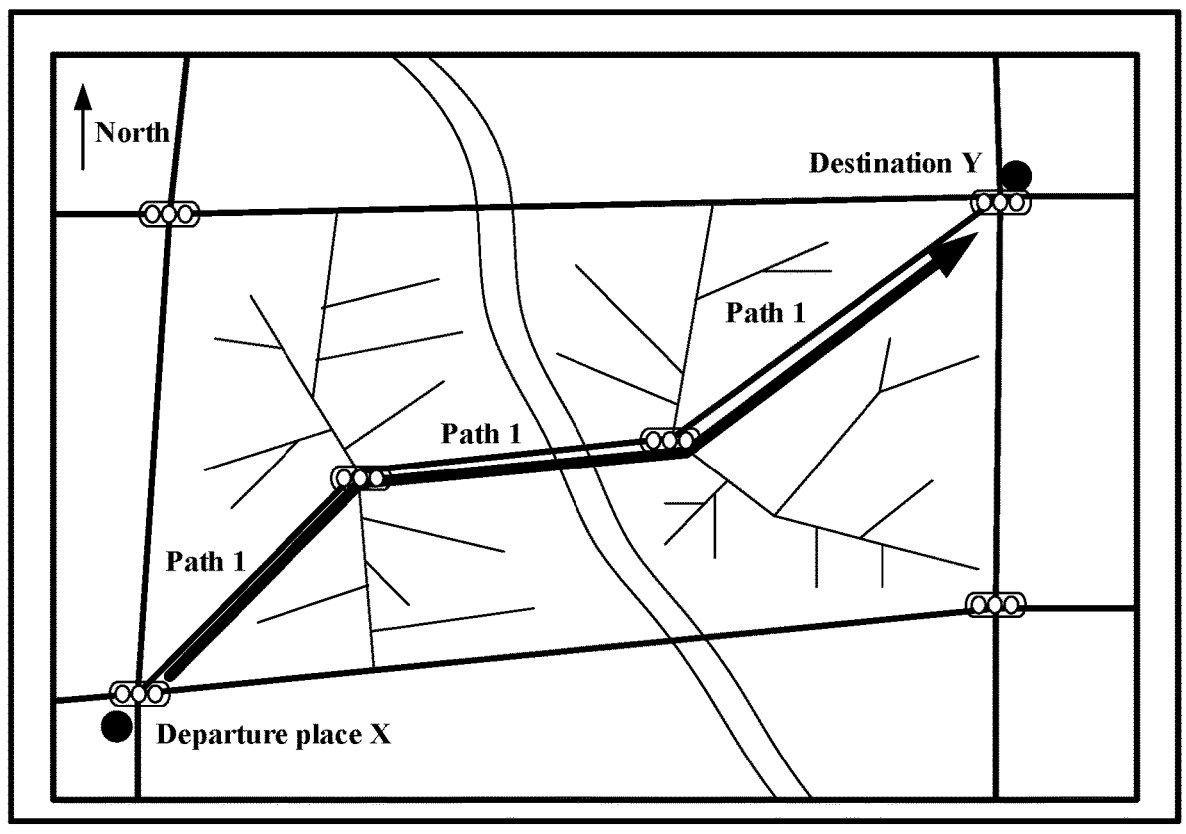
FIG. 15a and FIG. 15b are schematic diagrams of planned navigation paths corresponding to different planning requirements under a same condition according to an embodiment of this application.
Figure 15B:
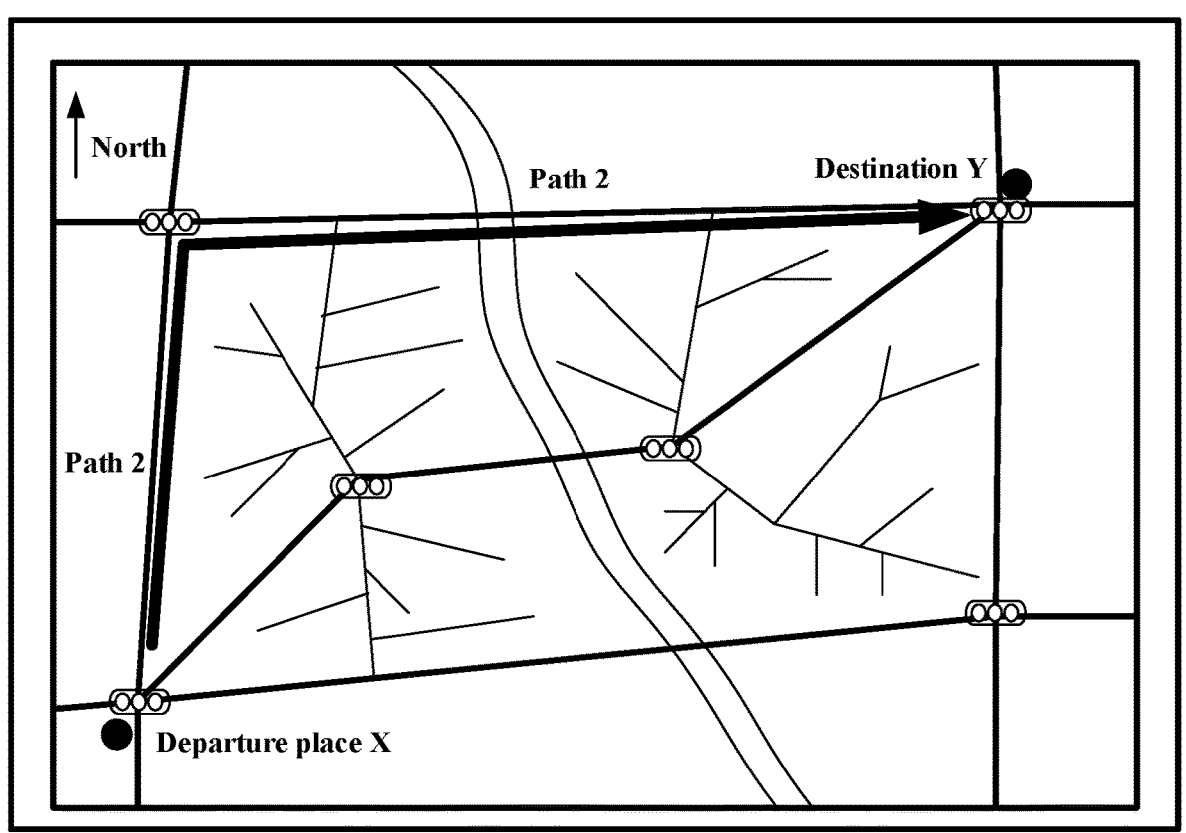

If the planning requirements selected by the user are sorted in descending order of priorities as follows: the shortest path and vehicle model matching, a path planned by the terminal is shown in FIG. 15a. Under a same condition (for example, a same departure place and a same destination), if the planning requirements selected by the user are sorted in descending order of priorities as follows: the shortest path and driving feature matching, a path planned by the terminal is shown in FIG. 15b. It can be learned that, when navigation planning requirements are different, planned navigation paths planned according to a same departure place and a same destination may be different, so as to provide a planned navigation path that meets a personalized requirement of the user.

In some embodiments of this application, after receiving correction information of the electronic map, the terminal may re-determine a planned navigation path based on the correction information of the electronic map, a destination, and information such as the navigation assistance information.

Figure 16:
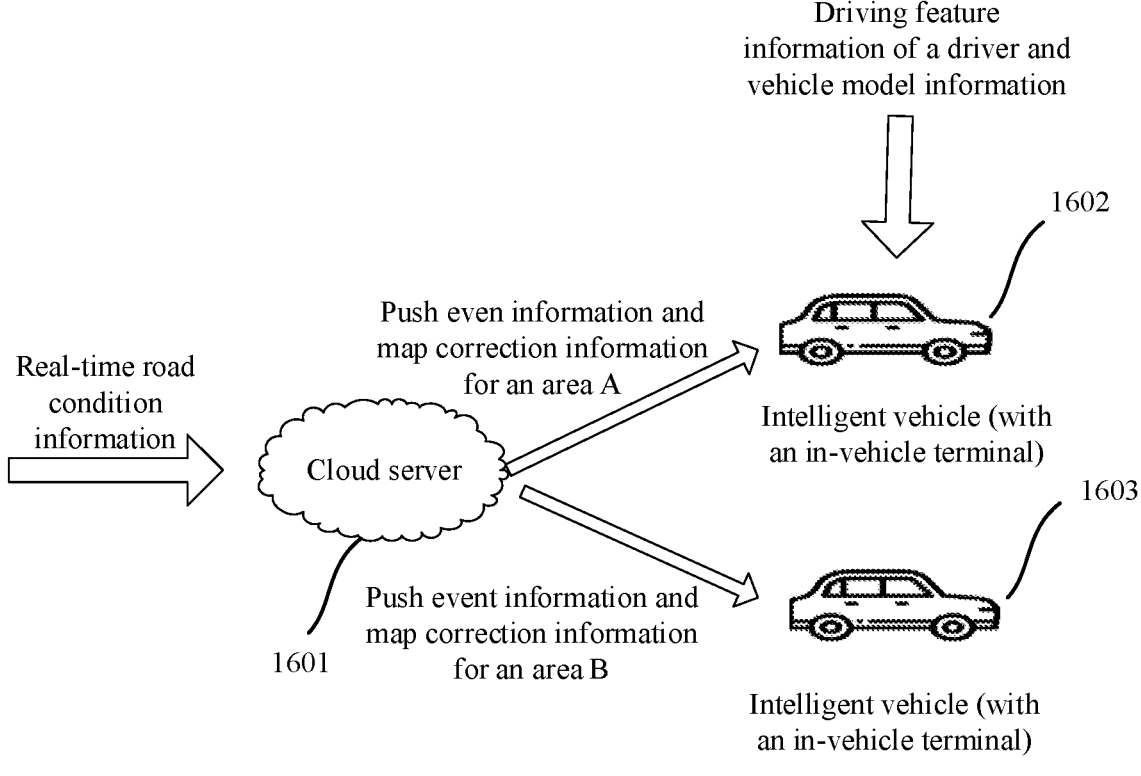
FIG. 16 is a schematic diagram of pushing, by a server, a corrected electronic map and related information to a terminal to improve accuracy of navigation planning of the terminal according to an embodiment of this application.

FIG. 16 is an example of a schematic diagram of pushing, by a server, a corrected electronic map and related information to a terminal, to improve accuracy of navigation planning of the terminal. As shown in the figure, a cloud server 1601 corrects an electronic map based on traffic statistics (such as a navigation planning adoption rate and vehicle traveling information of each road section) and real-time road condition information (such as a road congestion status and a traffic emergency), and further sets information associated with a related road section. The cloud server 1601 pushes, based on a location of an intelligent vehicle 1602, traffic event information, map data, set road section association information, and the like of an area A in which the intelligent vehicle is located to an in-vehicle terminal (the in-vehicle terminal has a map application) of the intelligent vehicle 1602. The cloud server 1601 pushes, based on a location of the intelligent vehicle 1603, traffic event information, map data, set road section association information, and the like of an area B to an in-vehicle terminal (the in-vehicle terminal has a map application) of the intelligent vehicle 1603. The in-vehicle terminals of the intelligent vehicle 1602 and the intelligent vehicle 1603 may perform navigation path planning based on information such as received electronic map data and road section association information, and further output related prompt information in a navigation process, so as to improve accuracy and effectiveness of navigation planning, and meet a personalized requirement of a driver, thereby improving driving experience of a user.

Based on a same technical concept, an embodiment of this application further provides a server.

Figure 17:
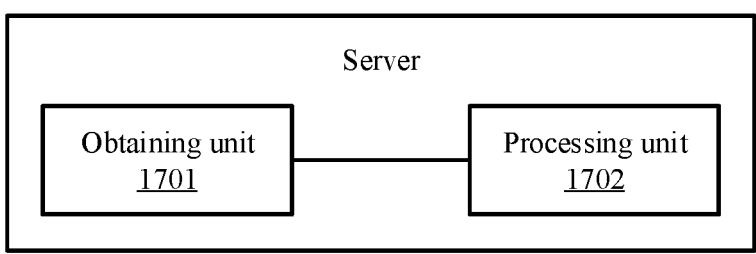
FIG. 17 is a schematic diagram of a structure of a server according to an embodiment of this application.

FIG. 17 is a schematic diagram of a structure of a server according to an embodiment of this application. As shown in the figure, the server may include an obtaining unit 1701 and a processing unit 1702.

The obtaining unit 1701 is configured to obtain a navigation planning adoption rate of a first road section and vehicle traveling information of the first road section, where the navigation planning adoption rate of the first road section is used to represent a relationship between a first quantity of times and a second quantity of times, the first quantity of times is a quantity of times that the first road section is planned as a navigation planning road section in a first statistics time period, the second quantity of times is a quantity of times that vehicles travel into or do not travel into the first road section in accordance with the navigation planning, and the vehicle traveling information of the first road section includes statistics of the vehicles traveling into the first road section in the first statistics time period.

In some embodiments, the processing unit 1702 is configured to: determine, based on the navigation planning adoption rate of the first road section and the vehicle traveling information of the first road section, whether traveling attribute information of the first road section on an electronic map is accurate; and correct the traveling attribute information of the first road section on the electronic map if it is determined that the traveling attribute information of the first road section is inaccurate.

In some other embodiments, the processing unit 1702 is configured to set information associated with the first road section based on the navigation planning adoption rate of the first road section and the vehicle traveling information of the first road section, where the information associated with the first road section is used to indicate a traveling attribute of the first road section, and the information associated with the first road section is used for navigation path planning or for providing prompt information in a vehicle driving process.

In some other embodiments, the processing unit 1702 is configured to: determine, based on the navigation planning adoption rate of the first road section and the vehicle traveling information of the first road section, whether traveling attribute information of the first road section on an electronic map is accurate; and correct the traveling attribute information of the first road section on the electronic map if it is determined that the traveling attribute information of the first road section is inaccurate; and set information associated with the first road section based on the navigation planning adoption rate of the first road section and the vehicle traveling information of the first road section, where the information associated with the first road section is used to indicate a traveling attribute of the first road section, and the information associated with the first road section is used for navigation path planning or for providing prompt information in a vehicle driving process.

It should be noted herein that the server provided in this embodiment of this application can implement all method steps implemented by the server in the foregoing method embodiments, and can achieve a same technical effect. A part and a beneficial effect of this embodiment that are the same as those of the method embodiments are not specifically described herein again.

Based on a same technical concept, an embodiment of this application further provides a terminal.

Figure 18:
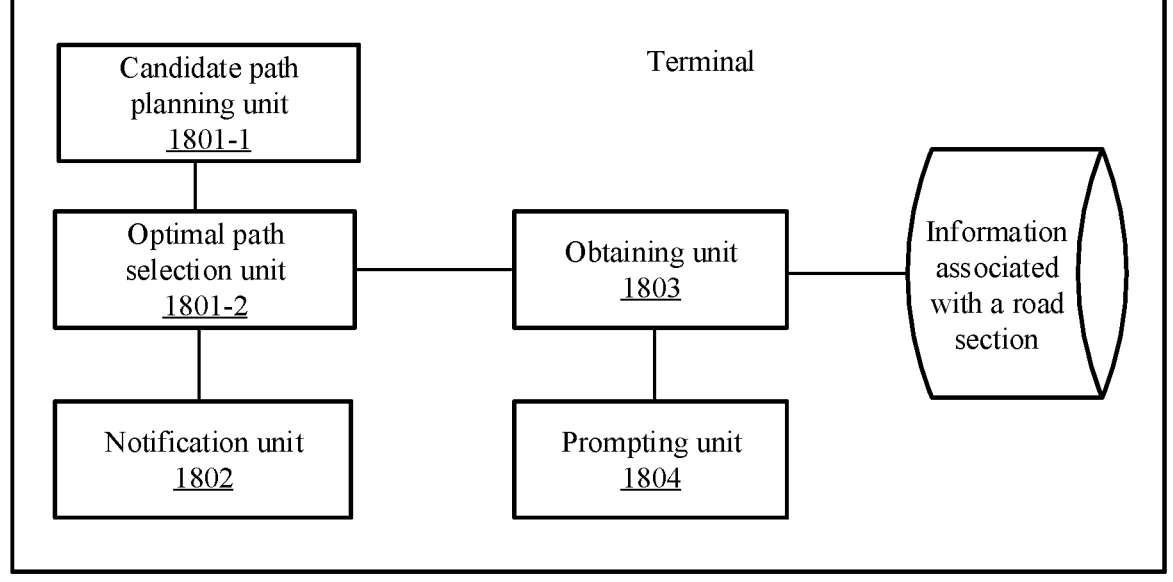
FIG. 18 and FIG. 19 are schematic diagrams of structures of terminals according to embodiments of this application.

FIG. 18 is a schematic diagram of a structure of a terminal according to an embodiment of this application. As shown in the figure, the terminal may include a candidate path planning unit 1801-1 and an optimal path selection unit 1801-2.

The candidate path planning unit 1801-1 is configured to determine at least one candidate planned navigation path according to a departure place and a destination.

The optimal path selection unit 1801-2 is configured to select an optimal path from the at least one candidate planned navigation path as a planned navigation path according to navigation assistance information, where the navigation assistance information includes at least one of information associated with a first road section and driving feature information of a driver, the first road section is one road section in the at least one candidate planned navigation path, and the first road section is a road section in the at least one candidate planned navigation path. For a method for setting the information associated with the first road section, refer to the foregoing embodiments.

Further, the terminal may further include: a notification unit 1802, configured to: when a vehicle does not travel into the first road section in accordance with the planned navigation path, send a notification to a server, where the notification carries first indication information, and the first indication information is used to indicate that the vehicle does not travel into the first road section in accordance with the planned navigation path.

Further, the notification unit 1802 may be further configured to send second indication information to the server, where the second indication information is used to indicate a second road section, the second road section is a road section into which the vehicle actually travels when the vehicle does not travel into the first road section in accordance with the planned navigation path, and the second road section is determined by the terminal based on a location reported by the vehicle.

Further, the terminal may further include an obtaining unit 1803 and a prompting unit 1804. The obtaining unit 1803 is configured to: in response to that a first road section in a planned navigation path enters a specified range of a vehicle traveling direction and/or that a vehicle travels into the first road section in accordance with the planned navigation path, obtain information associated with the first road section. The prompting unit 1804 is configured to output the information associated with the first road section. Optionally, the obtaining unit 1803 may detect, based on the planned navigation path planned by the candidate path planning unit 1801-1, whether the first road section in the planned navigation path enters the specified range of the vehicle traveling direction and/or whether the vehicle travels into the first road section in accordance with the planned navigation path.

Optionally, the obtaining unit 1803 may obtain the information associated with the first road section in at least one of the following manners:

obtaining the information associated with the first road section on an electronic map;

querying at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section, where each of the foregoing lists is stored in the terminal; and sending, to the server, a query request used to obtain the information associated with the first road section, and receiving a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

Optionally, the prompting unit 1804 may be specifically configured to: output the information associated with the first road section by using a voice; and/or display the information associated with the first road section on an electronic map interface.

Further, the candidate path planning unit 1801-1 may further obtain, in response to a first user operation based on an interface for entering a navigation planning requirement, a navigation planning requirement entered by the user, so as to determine a candidate planned navigation path according to the navigation planning requirement; or obtain, in response to a first user operation based on an interface for entering a navigation planning requirement, a navigation planning requirement entered by a user, so as to determine an optimal planned navigation path according to the navigation planning requirement.

It should be noted herein that the terminal provided in this embodiment of this application can implement all method steps implemented by the terminal in the foregoing method embodiments, and can achieve a same technical effect. A part and a beneficial effect of this embodiment that are the same as those of the method embodiments are not specifically described herein again.

Based on a same technical concept, an embodiment of this application further provides a terminal.

Figure 19:
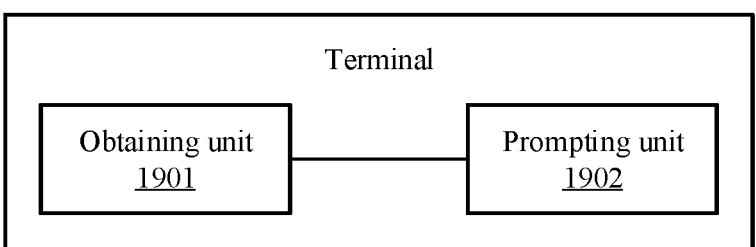

FIG. 19 is a schematic diagram of a structure of a terminal according to an embodiment of this application. As shown in the figure, the terminal may include an obtaining unit 1901 and a prompting unit 1902.

The obtaining unit 1901 is configured to: in response to that a first road section in a planned navigation path enters a specified range of a vehicle traveling direction and/or that a vehicle travels into the first road section in accordance with the planned navigation path, obtain information associated with the first road section, where the information associated with the first road section is obtained based on the foregoing embodiments.

The prompting unit 1902 is configured to output the information associated with the first road section.

Optionally, the prompting unit 1902 is specifically configured to: output the information associated with the first road section by using a voice; and/or display the information associated with the first road section on an electronic map interface.

Optionally, the obtaining unit 1901 is specifically configured to obtain the information associated with the first road section in at least one of the following manners:

obtaining the information associated with the first road section on an electronic map;

querying at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section, where each of the foregoing lists is stored in the terminal; and sending, to the server, a query request used to obtain the information associated with the first road section, and receiving a query result sent by the server, where the query result includes the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

Based on a same technical concept, an embodiment of this application further provides an electronic device. The electronic device may have a structure shown in FIG. 20. The electronic device may be a server, or may be a chip or a chip system that can support a server in implementing the foregoing method.

Figure 20:
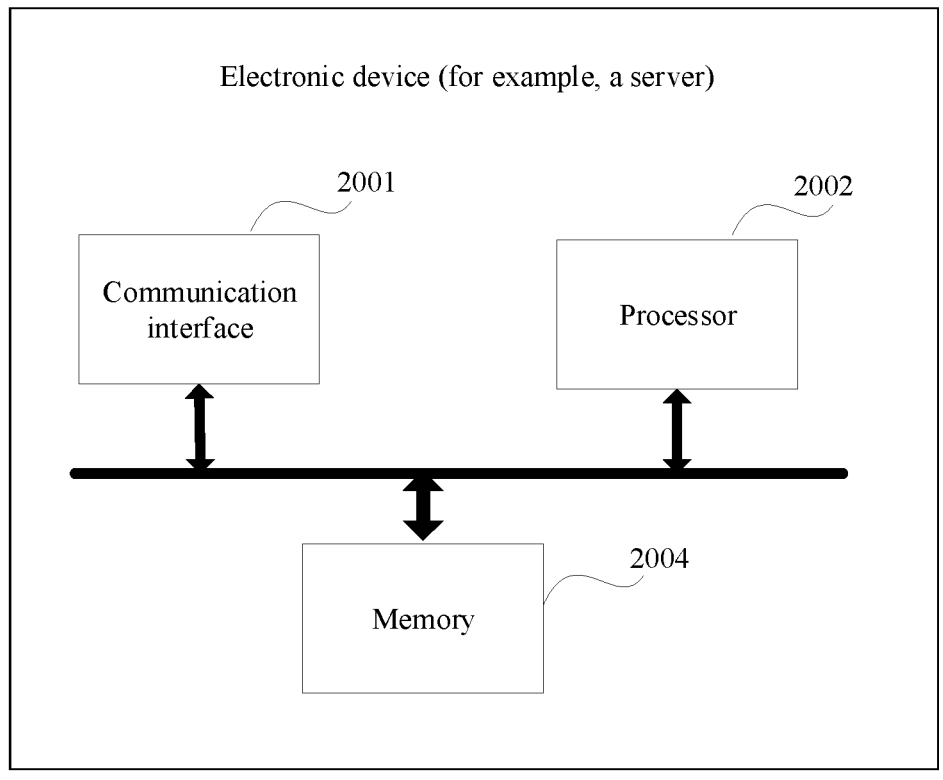
FIG. 20 and FIG. 21 are schematic diagrams of structures of electronic devices according to embodiments of this application.

The electronic device shown in FIG. 20 may include at least one processor 2002. The at least one processor 2002 is configured to be coupled to a memory, and read and execute instructions in the memory, so as to implement the steps performed by the server in the methods provided in the foregoing embodiments of this application. Optionally, the electronic device may further include a communication interface 2001, configured to support the electronic device in receiving or sending signaling or data. The communication interface 2001 in the electronic device may be configured to implement interaction with another electronic device. The processor 2002 may be used by the electronic device to implement the steps in the method shown in any one of FIG. 2, FIG. 6, FIG. 7, FIG. 8, FIG. 9, and FIG. 10. Optionally, the electronic device may further include a memory 2004, where the memory 2004 stores a computer program and instructions. The memory 2004 may be coupled to the processor 2002 and/or the communication interface 2001, and is configured to support the processor 2002 in invoking the computer program and the instructions in the memory 2004, so as to implement the steps related to the server in the methods provided in embodiments of this application. In addition, the memory 2004 may be further configured to store data in the method embodiments of this application, for example, configured to store data and instructions that are used for supporting the communication interface 2001 in implementing interaction, and/or configured to store configuration information that is used for the electronic device to perform the methods in embodiments of this application.

Based on a same technical concept, an embodiment of this application further provides an electronic device. The electronic device may have a structure shown in FIG. 21. The electronic device may be a terminal (for example, an in-vehicle terminal or a mobile terminal), or may be a chip or a chip system that can support a terminal in implementing the foregoing method.

Figure 21:
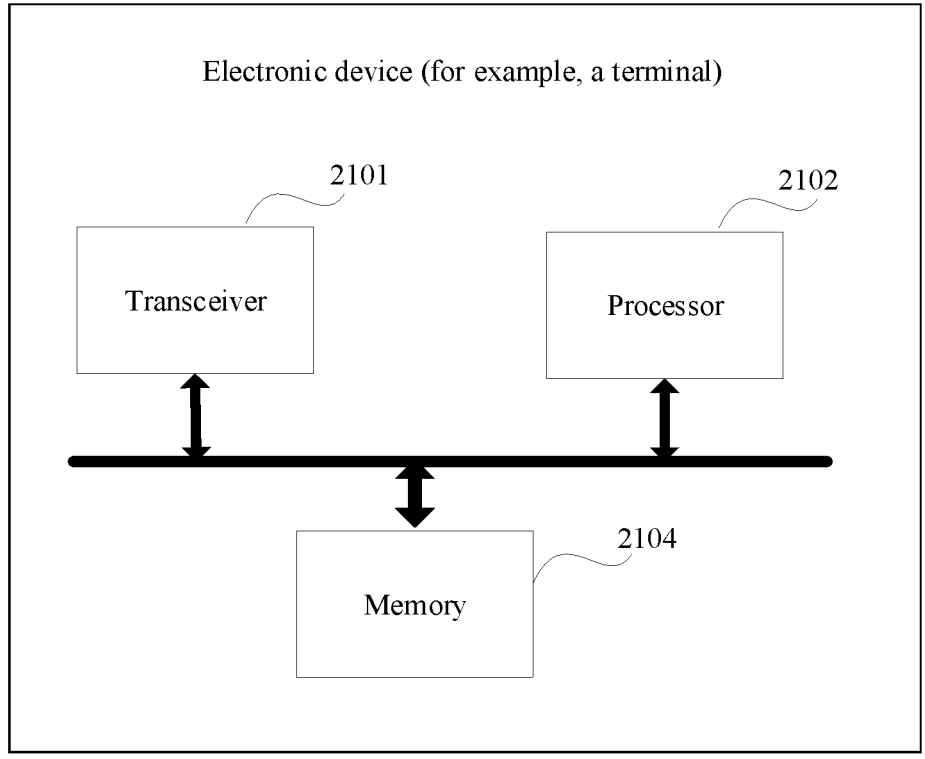

The electronic device shown in FIG. 21 may include at least one processor 2102. The at least one processor 2102 is configured to be coupled to a memory, and read and execute instructions in the memory, so as to implement the steps performed by the terminal in the methods provided in the foregoing embodiments of this application. Optionally, the electronic device may further include a transceiver 2101, configured to support the electronic device in receiving or sending signaling or data. The transceiver 2101 in the electronic device may be configured to implement interaction with another electronic device. The processor 2102 may be used by the electronic device to perform the steps in the method in the schematic diagram shown in FIG. 11 or FIG. 12. Optionally, the electronic device may further include a memory 2104, where the memory 2104 stores a computer program and instructions. The memory 2104 may be coupled to the processor 2102 and/or the transceiver 2101, and is configured to support the processor 2102 in invoking the computer program and the instructions in the memory 2104, so as to implement the steps related to the server in the methods provided in embodiments of this application. In addition, the memory 2104 may be further configured to store data in the method embodiments of this application, for example, configured to store data and instructions that are used for supporting the transceiver 2101 in implementing interaction, and/or configured to store configuration information that is used for the electronic device to perform the methods in embodiments of this application.

Based on a same concept as that of the foregoing method embodiments, an embodiment of this application further provides a computer-readable storage medium. The computer-readable storage medium stores some instructions. When these instructions are invoked and executed on a computer, the computer is enabled to implement the method in the foregoing method embodiments and any possible design in the foregoing method embodiments. In this embodiment of this application, the computer-readable storage medium is not limited. For example, the computer-readable storage medium may be a RAM (random-access memory) or a ROM (read-only memory).

Based on a same concept as that of the foregoing method embodiments, this application further provides a computer program product. When being invoked and executed by a computer, the computer program product can implement the methods in the foregoing method embodiments and any possible design in the foregoing method embodiments.

Based on a same concept as that of the foregoing method embodiments, this application further provides a chip. The chip may include a processor and an interface circuit, to complete the methods in the foregoing method embodiments and any possible implementation of the foregoing method embodiments. "Coupling" means that two components are directly or indirectly combined with each other. The combination may be fixed or movable, and the combination may allow communication of flowing fluid, electricity, an electrical signal, or another type of signal between two components.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of the present application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or other programmable logical apparatuses, a discrete gate or transistor logic, a discrete hardware component, or a design of any combination thereof. The general-purpose processor may be a microprocessor. Optionally, the general-purpose processor may be any conventional processor, controller, microcontroller, or state machine. The processor may alternatively be implemented by a combination of computing apparatuses, for example, a digital signal processor and a microprocessor; a plurality of microprocessors; one or more microprocessors and a digital signal processor core; or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to the processor, so that the processor may read information from the storage medium and may write information to the storage medium. Optionally, the storage medium may alternatively be integrated into the processor. The processor and the storage medium may be disposed in an ASIC, and the ASIC may be disposed in a terminal device. Optionally, the processor and the storage medium may be alternatively disposed in different components of a terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and embodiments thereof, it is clear that various modifications and combinations may be made to them without departing from the scope of the present application. Correspondingly, the specification and accompanying drawings are merely example descriptions of the present application defined by the appended claims, and are considered as any or all modifications, variations, combinations or equivalents that cover the scope of the present application. It is clear that a person skilled in the art can make various modifications and variations to the present application without departing from the scope of the present application. The present application is intended to cover these modifications and variations provided that they fall within the scope of protection defined by the claims of the present application and their equivalent technologies.

What is claimed is:

1. An electronic map correction apparatus, comprising at least one processor and at least one non-transitory memory, wherein the at least one non-transitory memory stores program instructions, and the at least one processor is coupled to the at least one memory to execute the instructions to:

obtain a navigation planning adoption rate of a first road section and vehicle traveling information of the first road section, wherein the navigation planning adoption rate of the first road section represents a relationship between a first quantity of times and a second quantity of times, the first quantity of times is a quantity of times that the first road section is planned as a navigation planning road section in a first statistics time period, the second quantity of times is a quantity of times that vehicles one of travel into or do not travel into the first road section in accordance with the navigation planning, and the vehicle traveling information of the first road section comprises statistics of the vehicles traveling into the first road section in the first statistics time period;

obtain traffic violation tickets generated by the vehicles on the first road section in a second statistics time period;

set fourth information associated with the first road section, if it is determined, based on a quantity of the traffic violation tickets, that a specified condition is met, wherein the fourth information is used to indicate one of that the first road section is a road section prone to a traffic violation, or that the first road section is a road section prone to a traffic violation and a type of the traffic violation that may occur on the first road section, wherein the specified condition comprises:

a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, wherein N is preset, and N is an integer greater than or equal to 1;

determine, based on the navigation planning adoption rate of the first road section and the vehicle traveling information of the first road section, whether traveling attribute information of the first road section on an electronic map is accurate; and correct the traveling attribute information of the first road section on the electronic map if it is determined that the traveling attribute information of the first road section is inaccurate.

2. The apparatus according to claim 1, wherein the at least one processor is coupled to the at least one memory to execute the instructions to:

determine, based on the navigation planning adoption rate of the first road section and the vehicle traveling information of the first road section, whether the first road section is travelable; and correct the electronic map, so that the first road section on the electronic map is one of marked as non-travelable or is deleted, if it is determined that the first road section is non-travelable.

3. The apparatus according to claim 2, wherein the at least one processor is coupled to the at least one memory to execute the instructions to:

determine that the first road section is non-travelable, if a ratio of the second quantity of times that vehicles do not travel into the first road section in accordance with the navigation planning to the first quantity of times is greater than a first threshold, and it is determined, based on the vehicle traveling information of the first road section, that a vehicle traveling volume of the first road section in the first statistics time period is less than a third threshold.

4. The apparatus according to claim 1, wherein the at least one processor is coupled to the at least one memory to execute the instructions to:

determine, based on the navigation planning adoption rate of the first road section and the vehicle traveling information of the first road section, whether a traveling direction of the first road section on the electronic map is accurate; and if it is determined that the traveling direction of the first road section on the electronic map is inaccurate, correct the traveling direction of the first road section on the electronic map.

5. The apparatus according to claim 1, wherein the at least one processor is coupled to the at least one memory to execute the instructions to perform one of:

obtain the navigation planning adoption rate of the first road section and the vehicle traveling information of the first road section according to a specified period, wherein the first statistics time period is a latest period; or obtain the navigation planning adoption rate of the first road section and the vehicle traveling information of the first road section, when a map correction condition is met, wherein the first statistics time period is a time period from a last time period in which the map correction condition is met, wherein the map correction condition comprises at least one of the following:

a quantity of vehicles that do not travel in accordance with a planned navigation path is greater than a sixth threshold; and a quantity of times of vehicles that do not travel in accordance with a planned navigation path is greater than a seventh threshold.

6. A navigation information setting apparatus, comprising at least one processor and at least one non-transitory memory, wherein the at least one non-transitory memory stores program instructions, and the at least one processor is coupled to the at least one memory to execute the instructions to:

obtain a navigation planning adoption rate of a first road section and vehicle traveling information of the first road section, wherein the navigation planning adoption rate of the first road section represents a relationship between a first quantity of times and a second quantity of times, the first quantity of times is a quantity of times that the first road section is planned as a navigation planning road section in a first statistics time period, the second quantity of times is a quantity of times that vehicles one of travel into or do not travel into the first road section in accordance with the navigation planning, and the vehicle traveling information of the first road section comprises statistics of the vehicles traveling into the first road section in the first statistics time period, wherein the information associated with the first road section further comprises:

fourth information, used to indicate that the first road section is a road section prone to a traffic violation, or used to indicate that the first road section is a road section prone to a traffic violation and a type of the traffic violation that may easily occur on the first road section; and the at least one processor is coupled to the at least one memory to execute the instructions to:

obtain traffic violation tickets generated by the vehicles on the first road section in a second statistics time period; and set the fourth information associated with the first road section, if it is determined, based on the quantity of the traffic violation tickets, that a specified condition is met, wherein the specified condition comprises one of:

a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, wherein N is preset, and N is an integer greater than or equal to 1; and set information associated with the first road section based on the navigation planning adoption rate of the first road section and the vehicle traveling information of the first road section, wherein the information associated with the first road section is used to indicate a traveling attribute of the first road section, and the information associated with the first road section is used for navigation path planning or for providing prompt information in a vehicle driving process.

7. The apparatus according to claim 6, wherein the information associated with the first road section comprises at least one of the following:

first information, used to indicate that a traveling direction allowed by the first road section is uncertain;

second information, used to indicate a vehicle model feature of vehicles that are at least one of suitable for traveling and not suitable for traveling on the first road section; and third information, used to indicate that the first road section has a forked intersection that may be entered by mistake.

8. The apparatus according to claim 7, wherein the vehicle model feature comprises at least one of a vehicle model, a vehicle height, a vehicle width, a vehicle length, or a turning radius.

9. The apparatus according to claim 7, wherein the at least one processor is coupled to the at least one memory to execute the instructions to:

if the following conditions are met, setting the first information associated with the first road section:

a ratio of the second quantity of times that vehicles do not travel into the first road section in accordance with the navigation planning to the first quantity of times is greater than a first threshold;

it is determined, based on the vehicle traveling information of the first road section, that the vehicle traveling volume of the first road section in the first statistics time period is greater than or equal to a third threshold; and it is determined that a vehicle traveling direction obtained from the vehicle traveling information of the first road section is different from a planned traveling direction of the first road section, wherein the first road section is not located in a traffic monitoring area.

10. The apparatus according to claim 7, wherein the at least one processor is coupled to the at least one memory to execute the instructions to:

if the following conditions are met, setting the second information associated with the first road section:

the ratio of the second quantity of times that vehicles do not travel into the first road section in accordance with the navigation planning to the first quantity of times is less than or equal to the first threshold and is greater than or equal to a second threshold, wherein the second threshold is less than the first threshold; and a ratio of a quantity of vehicles having a same vehicle model feature to a quantity of the vehicles that do not travel into the first road section in accordance with the navigation planning is greater than a fourth threshold.

11. The apparatus according to claim 7 wherein the at least one processor is coupled to the at least one memory to execute the instructions to:

if the following conditions are met, setting the third information associated with the first road section:

the ratio of the second quantity of times that vehicles do not travel into the first road section in accordance with the navigation planning to the first quantity of times is less than or equal to the first threshold and is greater than or equal to a second threshold, wherein the second threshold is less than the first threshold;

a ratio of a quantity of vehicles having a same vehicle model feature to a quantity of the vehicles that do not travel into the first road section in accordance with the navigation planning is less than or equal to a fourth threshold; and the first road section comprises a forked intersection, and an included angle between road sections corresponding to the forked intersection is less than a specified angle.

12. A navigation apparatus, applied to a terminal having a vehicle navigation function, and comprising at least one processor and at least one non-transitory memory, wherein the at least one non-transitory memory stores program instructions, and the at least one processor is coupled to the at least one memory to execute the instructions to:

determine at least one candidate planned navigation path according to a departure place and a destination; and select an optimal path from the at least one candidate planned navigation path as a planned navigation path according to navigation assistance information, wherein the navigation assistance information comprises information associated with a first road section, the first road section is one road section in the at least one candidate planned navigation path, the first road section is a road section in the at least one candidate planned navigation path, wherein the information associated with the first road section further comprises:

fourth information, used to indicate that the first road section is a road section prone to a traffic violation, or used to indicate that the first road section is a road section prone to a traffic violation and a type of the traffic violation that may easily occur on the first road section; and the at least one processor is coupled to the at least one memory to execute the instructions to:

obtain traffic violation tickets generated by the vehicles on the first road section in a second statistics time period; and set the fourth information associated with the first road section, if it is determined, based on the quantity of the traffic violation tickets, that a specified condition is met, wherein the specified condition comprises one of:

a quantity of the traffic violation tickets generated by the vehicles on the first road section in the second statistics time period is greater than a fifth threshold; or after the road sections are sorted in descending order of the quantities of the traffic violation tickets generated by the vehicles in the second statistics time period, the first road section is ranked in the first N place, wherein N is preset, and N is an integer greater than or equal to 1.

13. The apparatus according to claim 12, wherein the planned navigation path comprises the first road section, and the at least one processor is coupled to the at least one memory to execute the instructions to:

send a notification to a server, when a vehicle does not travel into the first road section in accordance with the planned navigation path, wherein the notification carries first indication information, and the first indication information is used to indicate that the vehicle does not travel into the first road section in accordance with the planned navigation path.

14. The apparatus according to claim 13, wherein the at least one processor is coupled to the at least one memory to execute the instructions to:

send second indication information to the server, wherein the second indication information is used to indicate a second road section, the second road section is a road section into which the vehicle actually travels when the vehicle does not travel into the first road section in accordance with the planned navigation path, and the second road section is determined by the terminal based on a location reported by the vehicle.

15. The apparatus according to claim 12, wherein the planned navigation path comprises the first road section, and the at least one processor is coupled to the at least one memory to execute the instructions to:

obtain information associated with the first road section, in response to at least one of that a first road section in a planned navigation path enters a specified range of a vehicle traveling direction and that a vehicle travels into the first road section in accordance with the planned navigation path; and output the information associated with the first road section.

16. The apparatus according to claim 15, wherein the at least one processor is coupled to the at least one memory to execute the instructions to:

obtain the information associated with the first road section on an electronic map;

query at least one of a list of road sections with to-be-determined traveling directions, a list of road sections corresponding to a first vehicle model feature, a list of road sections with multi-forked intersections, or a list of road sections with frequent traffic violations, to obtain the information associated with the first road section; and send, to the server, a query request used to obtain the information associated with the first road section, and receiving a query result sent by the server, wherein the query result comprises the information associated with the first road section, and the query result is obtained by the server by querying at least one of the list of road sections with to-be-determined traveling directions, the list of road sections corresponding to the first vehicle model feature, the list of road sections with multi-forked intersections, or the list of road sections with frequent traffic violations.

17. The apparatus according to claim 15, wherein the outputting information associated with the first road section comprises at least one of the following:

outputting the information associated with the first road section by using a voice; or displaying the information associated with the first road section on an electronic map interface.

18. The apparatus according to claim 12, wherein the navigation assistance information further comprises a navigation planning requirement; and the at least one processor is coupled to the at least one memory to execute the instructions to:

obtain, in response to a first user operation that is based on an interface for entering a navigation planning requirement, a navigation planning requirement entered by a user.

\* \* \* \* \*